United States Patent [19]
Moroto et al.

[11] Patent Number: 5,612,881
[45] Date of Patent: Mar. 18, 1997

[54] MAP DISPLAY SYSTEM

[75] Inventors: Syuzo Moroto, Nagoya; Koji Sumiya, Nishio; Yasunobu Ito, Okazaki; Kunihiro Yamada, Anjo; Mitsuhiro Nimura; Takeshi Yano, both of Okazaki, all of Japan

[73] Assignee: Aisin AW Co., Ltd., Japan

[21] Appl. No.: 356,891

[22] Filed: Dec. 15, 1994

[30] Foreign Application Priority Data

Dec. 27, 1993 [JP] Japan ................................. 5-332822
Dec. 27, 1993 [JP] Japan ................................. 5-332825
Dec. 29, 1993 [JP] Japan ................................. 5-351322
Jan. 25, 1994 [JP] Japan ................................. 6-006144

[51] Int. Cl.⁶ ............................................. G06F 165/00
[52] U.S. Cl. ........................ 364/449.3; 340/990; 340/995
[58] Field of Search .................................. 364/443, 444, 364/449; 73/178 R; 340/988, 990, 995

[56] References Cited

U.S. PATENT DOCUMENTS 5,117,363  5/1992  Akiyama et al. .................. 364/449
5,369,588  11/1994 Hayami et al. .................... 364/449
5,400,254  3/1995  Fujita ................................. 364/443
5,448,485  9/1995  Ishibashi et al. .................. 364/449
5,544,060  8/1996  Fujii et al. ......................... 364/444

FOREIGN PATENT DOCUMENTS 5-323872  12/1993  Japan .

*Primary Examiner*—Gary Chin
*Attorney, Agent, or Firm*—Lorusso & Loud

[57] ABSTRACT

A vehicle navigation system includes a simulated run mode along with a normal navigation mode. In the simulated run mode, a simulated present position is calculated to move in accordance with simulated motion so that route guidance information is presented to the viewer in the same manner as during actual navigation. The simulated motion may be increased or decreased, may be stepped or continuous, and/or may be controlled in accordance with stored speed information on the roads of the route.

19 Claims, 60 Drawing Sheets

FIG.4a
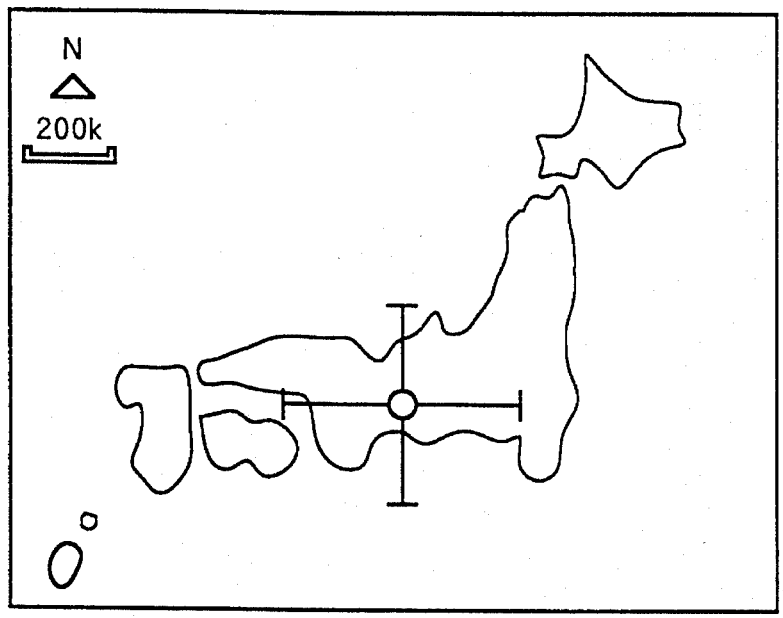
MAP DISPLAY SCREEN OF ENTIRE AREA
CONTAINED IN DATA BASE
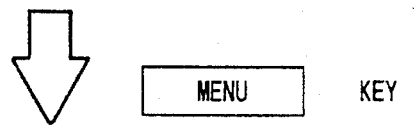
FIG.4b
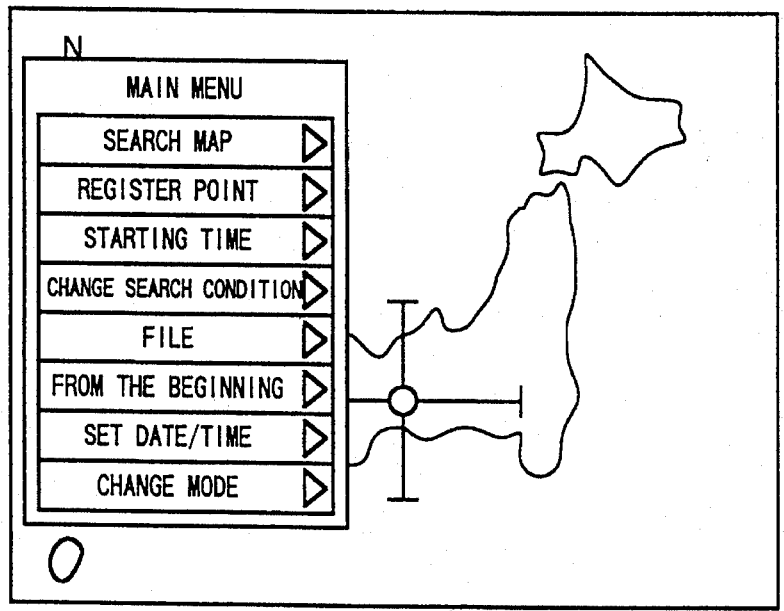
MAIN MENU DISPLAY SCREEN
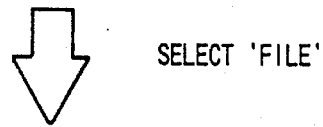
SELECT 'FILE'

FINAL MENU DISPLAY SCREEN

SELECT 'CALL'

| No. | DATE OF REGISTRATION | ROUTE |
|---|---|---|
| | FILE CALLING | |
| 1 | AUG. 31 | IN & AROUND FUJII-CHO, ANJO-CITY ↕ IN & AROUND WAKAYAMA-CITY |
| 2 | JUL. 29 | IN & AROUND FUJII-CHO, ANJO-CITY ↕ IN & AROUND MATSUMOTO-CITY |
| 3 | JUL. 29 | ●●●●● ↕ ●●●●● |

FILE CALLING LIST DISPLAY SCREEN

FIG.18

| No. | DATE OF REGISTRATION | ROUTE |
|---|---|---|
| | | FILE CALLING |
| 1 | AUG. 31 | IN & AROUND FUJII-CHO ANJO-CITY ~ IN & AROUND WAKAYAMA-CITY |
| 2 | JUL. 29 | IN & AROUND FUJII-CHO ANJO-CITY ~ IN & AROUND MATSUMOTO-CITY |
| 3 | JUL. 29 | ●●●●● ~ ●●●●● |

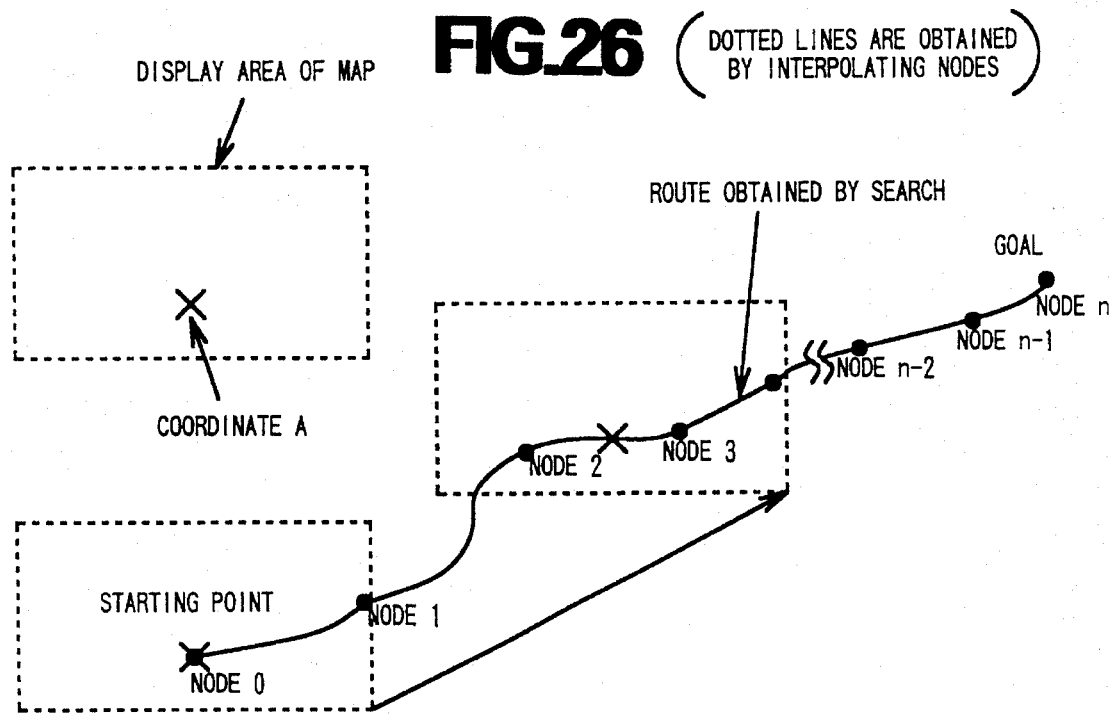
FIG.26 (DOTTED LINES ARE OBTAINED BY INTERPOLATING NODES)
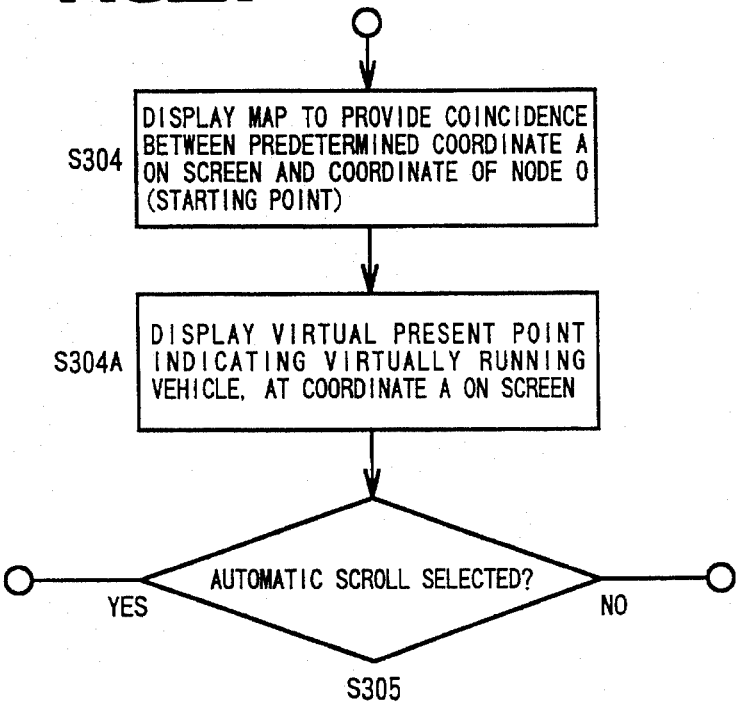
FIG.27

FIG.29

| MAGNIFICATION | ×1 | ×1.5 | ×2 | ×3 | ×4 | ×5 | ×8 | ×16 | ×32 | ×64 | ×128 | ×256 |
|---|---|---|---|---|---|---|---|---|---|---|---|---|
| ACTUAL RUN FOR 1 HOUR | 100km | 150km | 200km | 300km | 400km | 500km | 800km | 1600km | 3200km | 6400km | 12800 km | 25600 km |
| ACTUAL RUN AT 100Km/H | 60 MIN. | 40 MIN. | 30 MIN. | 20 MIN. | 15 MIN. | 12 MIN. | 8 MIN. | 4 MIN. | 2 MIN. | 1 MIN. | 0.5 MIN. | 0.25 MIN. |
| Map of 1/10,000 | Low | Mid | High | | | | | | | | | |
| Map of 1/20,000 | | Low | Mid | High | | | | | | | | |
| Map of 1/40,000 | | | Low | Mid | High | | | | | | | |
| Map of 1/80,000 | | | | Low | Mid | High | | | | | | |
| Map of 1/160,000 | | | | | Low | Mid | High | | | | | |
| Map of 1/320,000 | | | | | | Low | Mid | High | | | | |
| Map of 1/640,000 | | | | | | | Low | Mid | High | | | |
| Map of 1/1,280,000 | | | | | | | | Low | Mid | High | | |
| Map of 1/2,560,000 | | | | | | | | | Low | Mid | High | |
| Map of 1/5,120,000 | | | | | | | | | | Low | Mid | High |

| NODE No. | ROAD No. | ROAD KIND | SET VALUE OF VEHICLE SPEED |
|---|---|---|---|
| 0-1 | ① | I | $x_1$ |
| 1-2 | ② | I | $x_2$ |
| 2-3 | ③ | II | $y_1$ |
| ⋮ | ⋮ | ⋮ | ⋮ |
| (n-1)-n | Ⓝ | III | $z_1$ |

| NODE No. | ROAD No. | ROAD KIND |
|---|---|---|
| 0-1 | ① | I |
| 1-2 | ② | I |
| 2-3 | ③ | II |
| ⋮ | ⋮ | ⋮ |
| (n-1)-n | Ⓝ | III |

| ROAD KIND | SET VALUE OF VEHICLE SPEED |
|---|---|
| I | $V_I$ |
| II | $V_{II}$ |
| III | $V_{III}$ |
| IV | $V_{IV}$ |
| ⋮ | ⋮ |

FIG.42

| ROAD KIND | LEGAL MAX. SPEED (Km/h) OF ROAD | AVERAGE SPEED (Km/h) |
|---|---|---|
| ROAD KIND | 100 | 85 |
|  | 80 | 70 |
|  | 60 | 50 |
| NATIONAL ROAD | 60 | 40 |
|  | 50 | 35 |
|  | 40 | 30 |
| OTHER GENERAL ROADS | 50 | 30 |
|  | 40 | 20 |
|  | 30 | 15 |

FIG.59a    ROAD DATA

| NO. OF ROADS | |
|---|---|
| INFORMATION OF ROAD 1 | NO. OF NODES (n) |
| | ROAD KIND |
| | LAYER NO. |
| | NODE COORDINATES($x_0$, $y_0$) |
| | ⋮ |
| | NODE COORDINATES($x_{n-1}$, $y_{n-1}$) |
| ROAD 2 | NO. OF NODES (m) |
| | ROAD KIND |
| | ⋮ |

FIG.59b

LAYER NO. -SEARCH DISTANCE CORRESPONDING TABLE

| LAYER NO. | DISTANCE | MAIN ROAD |
|---|---|---|
| 0 | OVER 100km | EXPRESSWAY |
| 1 | 70~100km | URBAN ROAD |
| 2 | 50~70km | TOLL ROAD |
| 3 | 20~50km | NATIONAL ROAD |
| 4 | 5~20km | PREFECTURAL ROAD |
| 5 | 2~5km | LOCAL MAIN ROAD |
| 6 | 1~2km | GENERAL ROAD |
| 7 | 0~1km | LANE |

FIG.61a
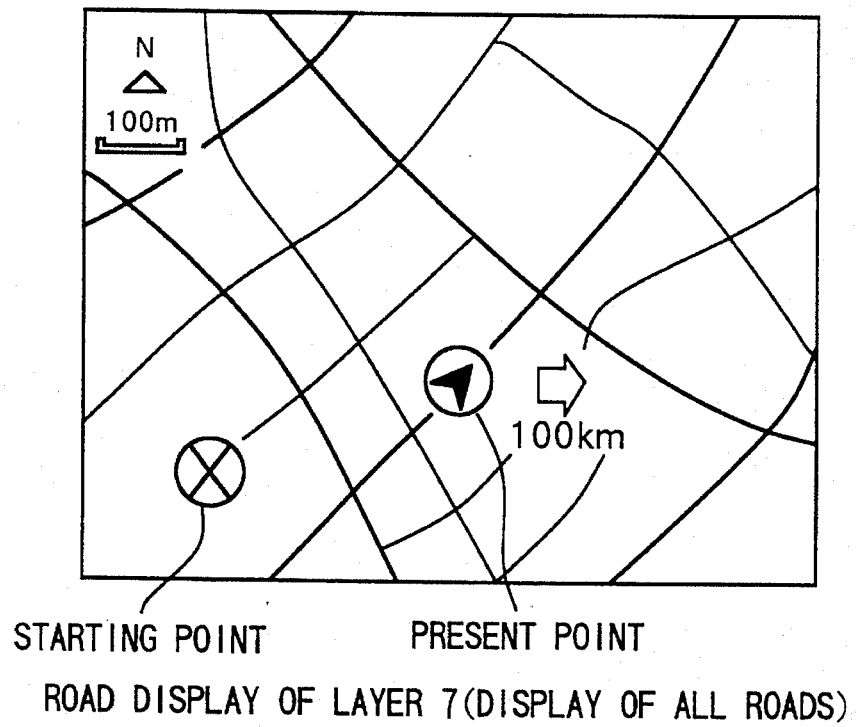
ROAD DISPLAY OF LAYER 7 (DISPLAY OF ALL ROADS)
FIG.61b POINT AT 50KM TO GOAL AT THE TIME OF RUNNING ON ROAD OF LAYER 3
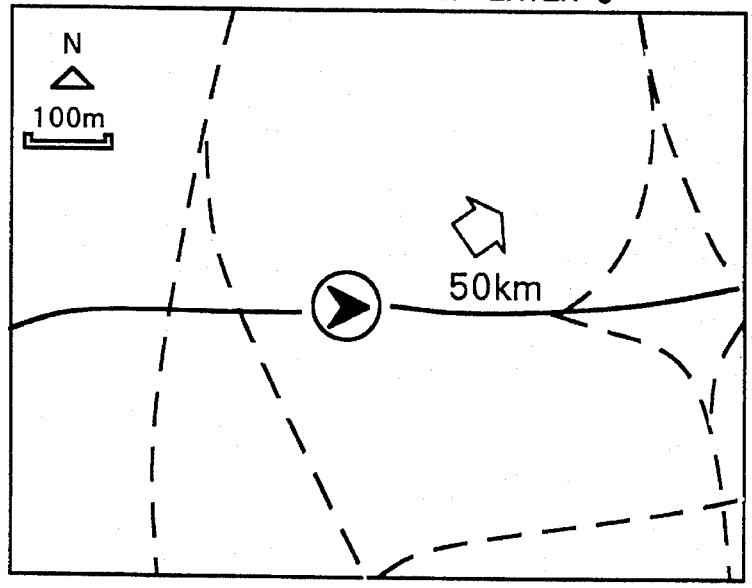
EMPHASIZED DISPLAY OF ROADS OF LAYERS 3 OR LOWER

AT 50KM TO GOAL,
ROAD OF LAYER 4→ROAD OF LAYER 5

EMPHASIZED DISPLAY OF ROADS OF
LAYERS 5 OR LOWER

AT OR AROUND GOAL

ROAD DISPLAY TO LAYER 7
(DISPLAY OF ALL ROADS)

MAP DISPLAY SYSTEM

BACKGROUND OF THE INVENTION

1. Field of the Invention

The present invention relates to a map display system suited for setting a route from an arbitrary starting point (or present point) to a goal (destination) and for easily designing the route to the goal.

2. Related Art

Navigation systems with map displays function to search the optimum route to the to thereby provide guidance to the destination along the searched route. For this function, there have been proposed a variety of systems for displaying the searched route on a map screen.

The navigation system of the prior art designs the route in accordance with the input, but its starting point is always determined by the information coming from the global positioning system (GPS), i.e., the present location.

To assist setting the destination, one navigation system allows manually scrolling of the map, by referring to lists of different genres or by calling up a point registered in advance. At the reception of the GPS signal at the vehicle, the direction and straight distance from the present location to the destination are then calculated and displayed. With reference to this display, the user selects the road and direction to be followed to the destination. In the VNS system having a searching function, on the other hand, if the destination is registered as above, an optimum route from the present location is automatically determined by a search to provide guidance to the destination by voice and picture. A navigation system of this type is disclosed in Japanese Patent Laid-Open No. 66131/1993, for example.

However, the system of the prior art cannot design a route while imagining an arbitrary starting point, i.e., a virtual starting point. In other words, the conventional system cannot design a route to the destination in advance by utilizing, as a starting point, a point apart from the present location. Thus, the route cannot be planned on the basis of an input arbitrary starting point and destination, i.e., two arbitrary points freely input.

In the prior art, moreover, an optimum route can be displayed, but the screen has to be manually scrolled along a road to be observed, when it is desired to confirm the route before the start of driving. The manual scroll sequentially moves the ahead screen in the selected direction while the button or joy stick of a controller or any of (generally) eight direction touch switches of the display is operated. However, manipulation of the controller or the like while watching the movement of the map displayed on the screen is troublesome.

In either case, the information is the straight distance, direction or recommended route from the present position, as detected from the GPS received information or the sensor information received at the vehicle, so that such systems are inconvenient for use when the route is to be planned from one arbitrary point to another arbitrary point.

Calculation of the required travel time may utilize intrinsic average speed data for various types of roads such as expressways or typical national roads with determination of the distances on the individual types of roads on the set route or route determined by search of the map data. Since, however, the aforementioned method is provided with only the average vehicle speed data intrinsic to the individual kinds of roads, the average speed may differ with the various conditions such as the number of intersections per unit distance, the number of lanes, the days of the week, the time of day, the degree of business activity and the number of curves, even for the same road such as an expressway or a trunk national road. This is a disadvantage in that the estimated travel time may significantly differ from the actual travel time.

SUMMARY OF THE INVENTION

An object of the present invention is to provide a map display system which can easily design a route from an arbitrary starting point to a destination.

In order to achieve the object, according to a first aspect of the present invention, there is provided a map display system which comprises: point setting means for setting at least two arbitrary points; route setting means for setting a route between the two set points; display means for displaying the set route; scroll instructing means for scrolling the display screen displayed on said display means along the set route; and scroll control means for scrolling the display screen along the set route in response to the instruction of said scroll instructing means.

According to the present invention, the map display system described above may also have any of the following features:

(1) vehicle position display means for displaying the position of a vehicle on the route, to effect the scrolling with the vehicle position being fixed on the map display screen;

(2) calculation means for calculating the time period required for travel between the two points input by said point setting means, wherein said display means displays the calculated time period required for travel between the two points;

(3) input means for inputting a starting time; and (4) calculation means for calculating elapsed time from the starting point input by said point setting means to the vehicle position on the route, wherein said display means displays the elapsed time period to the vehicle position on the route on the basis of the starting time.

According to an aspect of the present invention, there is provided a map display system which comprises: point setting means for setting at least two arbitrary points; route setting means for setting a route between the two set points; display means for displaying the set route; scroll instructing means for scrolling the display screen displayed on said display means along the set route; and scroll control means for scrolling the display screen along the set route in response to the instruction of said scroll instructing means, wherein said map display system has a navigation mode, in which information necessary for the navigation of a vehicle is detected to guide the vehicle along the set route, and a virtual run mode in which a virtual run is made for the set route by scrolling the map with the vehicle position being fixed.

According to the first aspect, the route setting means sets the route between at least the two arbitrary points set by the point setting means, e.g., between the virtual present point and the destination, and displays the set route on the map screen. In the case of a virtual run along the set route, if the instruction is made by the scroll instructing means, the display screen scrolls along the set route to simulate the vehicle running the route.

Since, the scrolling is accomplished with the vehicle position being fixed on the route on the map display screen, the map scrolling reference point is cleared to make the display screen more easily read.

In the display of the route information on the screen in the virtual runmode, on the other hand, the required travel time and the covered distance of the actual run can be accurately estimated to aid in selecting whether to take a route having toll roads or a route having general roads.

According to yet another aspect of the present invention, the system can be transported between the home and the vehicle. The designed course information is stored in the recording medium, and this medium can be read in advance, so that the drive plan may be made in advance while enjoying a simulated journey at home and can be easily used in the vehicle during actual driving.

BRIEF DESCRIPTION OF THE DRAWINGS

FIGS. 4a, 4b, 4c and 4d show startup screens;

FIG. 18 shows a file calling display screen for selecting a file from the main menu;

FIG. 26 is an explanatory diagram illustrating display of map data;

FIG. 27 is a flow chart of a display subroutine for display of present position in the virtual run mode at Step S304 of FIG. 22;

FIG. 29 is a table of map scales correlated with speed magnifications (multiplication factors);

FIG. 42 is a table of average speed data correlated with individual road types;

FIG. 52b is a flow chart of a subroutine for executing a search as illustrated in FIG. 52a;

FIG. 53b is a flow chart of a subroutine for execution of a search as illustrated in FIG. 53a;

FIG. 54b is a flow chart of a subroutine for automatic setting of the search area shown in FIG. 54a;

FIGS. 59a and 59b are diagrams showing organization of road data in storage;

FIGS. 61a, 61b, 61c and 61d illustrate a progression of screen displays in transit between the starting point and the destination;

DESCRIPTION OF THE PREFERRED EMBODIMENTS

Figure 1:
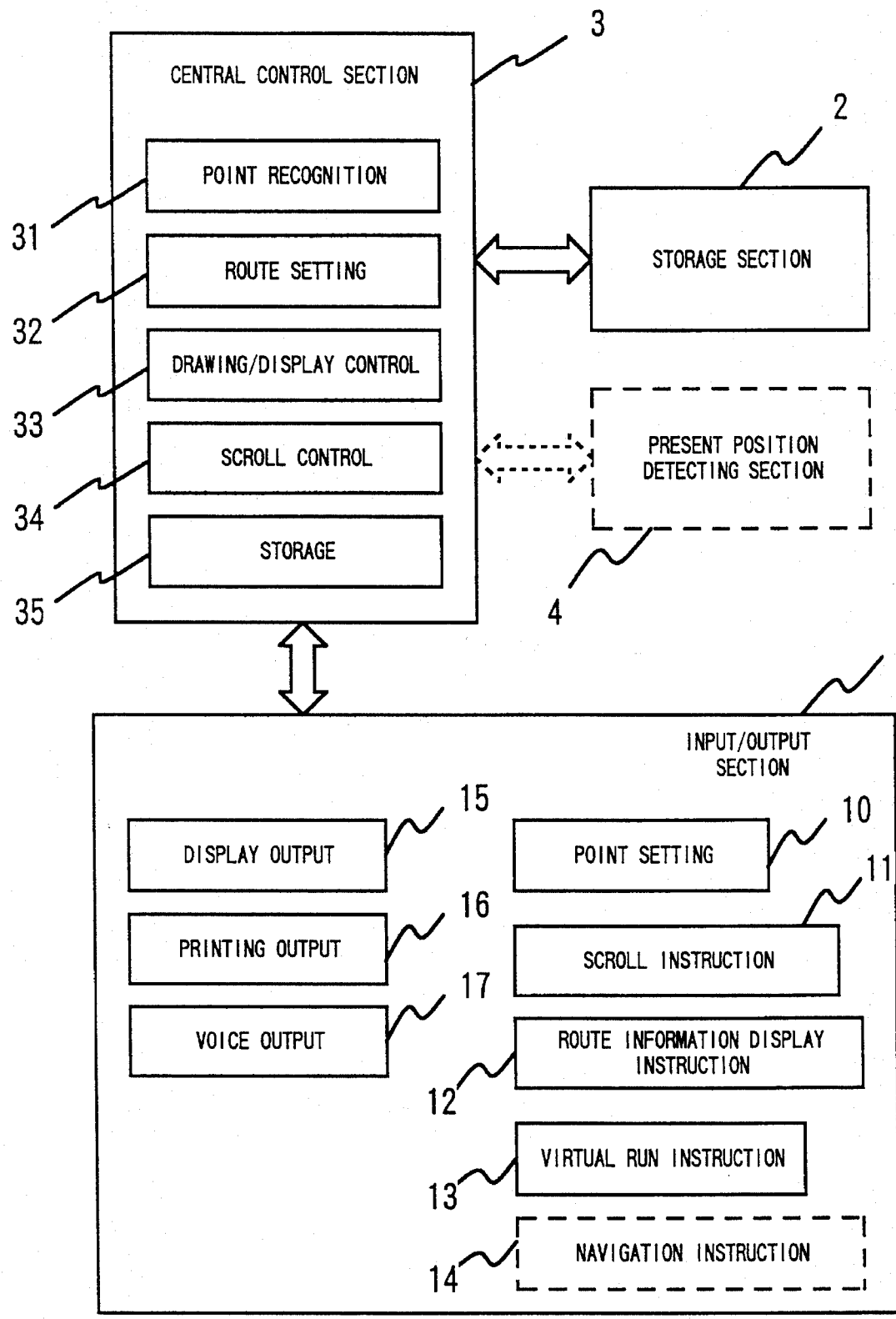
FIG. 1 is a block diagram of a map display system according to the present invention.
Figure 2:
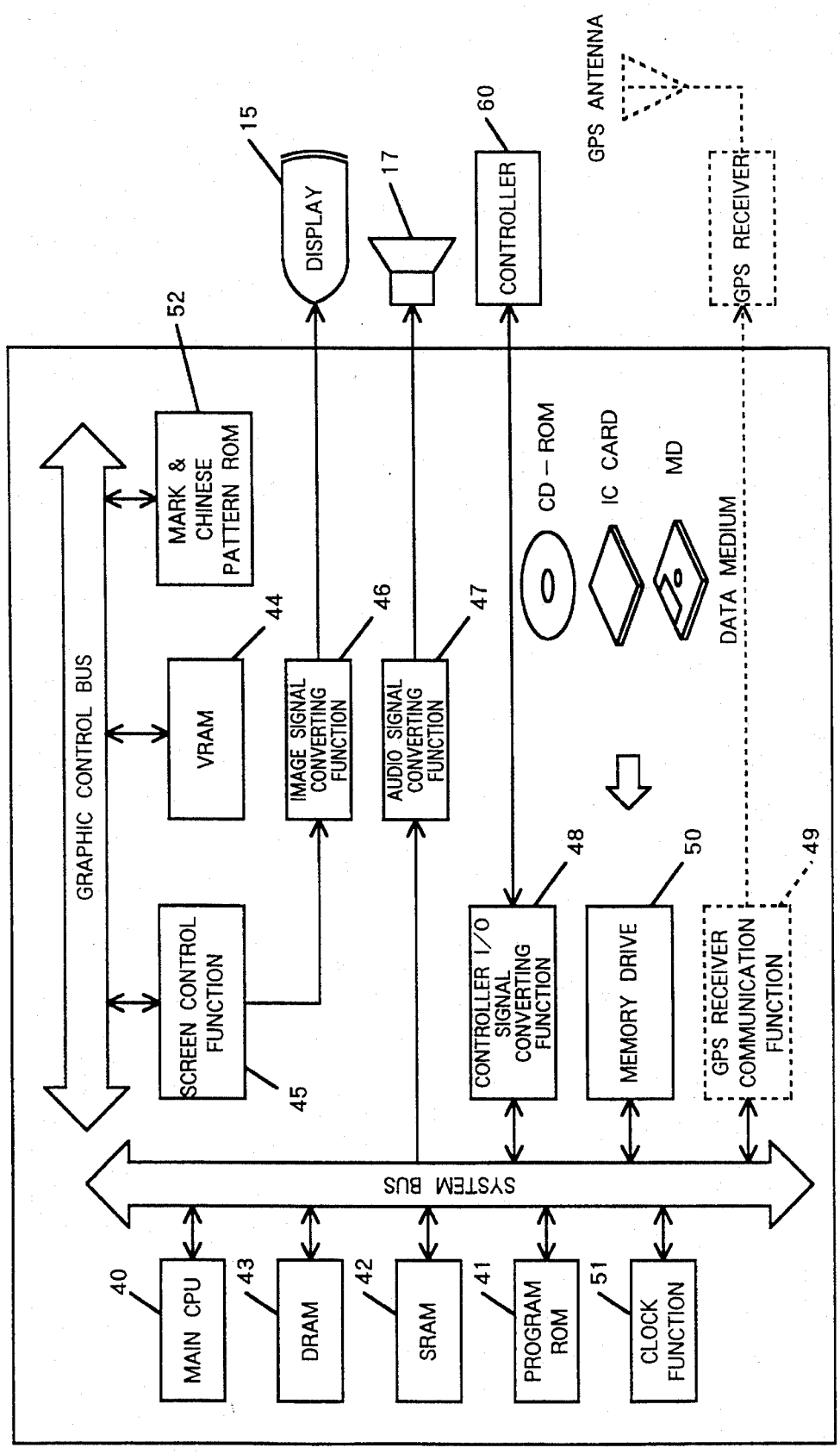
FIG. 2 is a block diagram of hardware of the map display system according to the present invention.

FIG. 1 illustrates an embodiment of the map display system of the present invention and FIG. 2 shows that embodiment incorporated into an EPU system. The elements represented by dotted lines in FIG. 1 are necessary when the system is used as a navigation system, but are optional in the home use mode.

The embodiment of FIG. 1 is a home type map display system for aiding in confirming a route to a destination in advance or in designing the route in a place, such as the home, other than in the vehicle, but can also be used as a navigation system mounted on the vehicle to guide travel along a designed (searched) route. Thus, the map display system of this embodiment has a simulated or virtual running function (hereinafter called the "virtual run mode") for virtually running on the display screen along the route determined by search (designed) and a navigation function (hereinafter called the "navigation mode") for guiding travel on the basis of navigation information such as the present location, speed and forward direction of the vehicle.

As shown in FIG. 1, the map display system includes: an input/output section 1 for inputting/outputting the information necessary for operation in the virtual run mode and in the navigation mode; a data medium or media (storage section) 2 stored with map data necessary for determining the route and data necessary for confirming the route; and a central control section 3 for executing the route search for searching for a route between at least two points and the operations in the two modes to thereby control the entire system.

The input/output section 1 is composed of: point setting means 10 for inputting at least two points, e.g., a starting point and a destination, the transit point and the destination; scroll instructing means 11 for instructing the scrolling of the display screen along the designed route; route information display instructing means 12 for instructing the display of route information; virtual run instructing means 13 for instructing the virtual run on the basis of the searched route; navigation instructing means 14 for instructing the navigation on the basis of the searched route; display means 15 for displaying the designed route and the route information on the screen; printing output means 16 for outputting the data necessary for guiding, confirming and designing the route, the route information and the map screen to a printer; and voice output means 17 made of a speaker for voice guidance along the route.

In order that the above-described system may output the route information by voice or screen display, when desired by the user, may instruct scrolling of the screen displayed along the designed route or may display a peripheral map of a certain point on the screen, the central control section 3 can be instructed to display the map in accordance with the will of the user, and the processed data or the like can be output to the printer, spoken from the speaker or output to the display by the printing output means 16.

The point setting means 10 is composed of control switches for inputting the starting point (or present location) and the destination in terms of their addresses, telephone Nos. or coordinates and for requesting the route confirmation. The display means 15 is composed of a color CRT or a color liquid crystal display for displaying in color all the screens that are necessary for both navigation and virtual running, such as the point setting screen, a route guiding screen, the section screen or the intersection screen, on the basis of the map data and guide data processed by the central control section 3. The route guiding screen is equipped to display at least the entire route map, the route information and the vicinity map.

The point setting or screen controlling means is composed of a display having a touch switch (or soft switch) for emitting, when a function button displayed on the screen, a signal corresponding to the function, a controller having a push button switch (or hard switch) arranged on the panel for emitting signal corresponding to the function when operated, or a remote control.

On the other hand, the output means is composed of: a display for displaying a screen pursuant to a request by the user or automatic route guidance; a printer for printing the data processed by the central control section and the data stored in the storage medium; and a speaker for outputting the route guidance in the navigation mode, the route confirmation in the virtual run mode, background music in the virtual run mode, sound effects and voice output of major guidance information. The sound effects are exemplified by a running sound having its tone changed with the vehicle speed, or a blinker sound indicating a turn to the left or right. Moreover, the major guidance information might include the name of an interchange (IC) to be passed, a toll road or the route number.

The global positioning system (GPS) receiver enables acquisition of the present location by mounting the system as a navigation system on the vehicle and a virtual run by registering the home position, for example, to use the home as the starting point.

The storage medium may be a CD-ROM, IC card or magneto-optic disc and is stored with all the data necessary for route guidance and route design such as the maps, intersections, nodes, roads, photographs, destination points, guide points, detailed destinations, road names, branches, display guides, voice guides and speed limits for the roads. Moreover, the auxiliary information may include destination information and the tariffs of the toll roads.

The central control section 3 includes: point recognizing means 31 for judging whether or not the present system can recognize at least two points which are inputted; route setting means 32 for setting the route on the basis of the recognized points; drawing/display control means 33 for drawing a map to display the set route on the display and for displaying the map concerning the route information designated by the user or the processed data on the screen; scroll control means 34 for controlling the screen in a virtual run designated by the user at the time of executing the virtual run mode; and storage means 35 stored with all the data necessary for the navigation mode and the virtual run mode.

The aforementioned central control section 3 is exemplified by the EPU system, as shown in FIG. 2. Specifically, the EPU system includes: a main CPU 40 for executing arithmetic procedures; a program ROM 41 stored with the program for searching the route, the program for controlling the display necessary for the route guidance and the voice output control necessary for the voice guidance, and the data necessary for executing the programs; a SRAM 42 for storing the information for guidance along the set route and the data being arithmetically processed; a DRAM 43 stored with the display information data necessary for route guidance and map display; a VRAM 44 for storing the image data to be used for the display; an image control section 45 for writing the image data in the VRAM in response to the command from the CPU and for sending the display data from the VRAM to an image signal converting part 46; an image signal converting section 46 for converting the RGB digital signal to be output from the image control section into an RGB analog signal or video signal in conformity to the specifications of the display; a GPS receiver communication section 49 for converting the electric signals of communication data such as the positional information sent from the GPS receiver so that the data can be read out by the main CPU; a controller input/output signal converting section 48 for converting the signal to be transferred to an external controller; a memory driver 50 constituting a reader for the stored data; a clock 51 for providing the date and time in the internal diagnostic information; and a ROM 52 stored with marks and kanji patterns to be used for displaying the route information.

The controller 60 is equipped with a variety of function button switches necessary for controlling the point setting and the screen controls from a remote location so that the functions of setting the point, selecting the reduced map scale, displaying the map and displaying the menu can be accomplishing by key input.

The present system is so constructed that the driver can select the screen display and/or the voice output for the route guidance.

Figure 3:
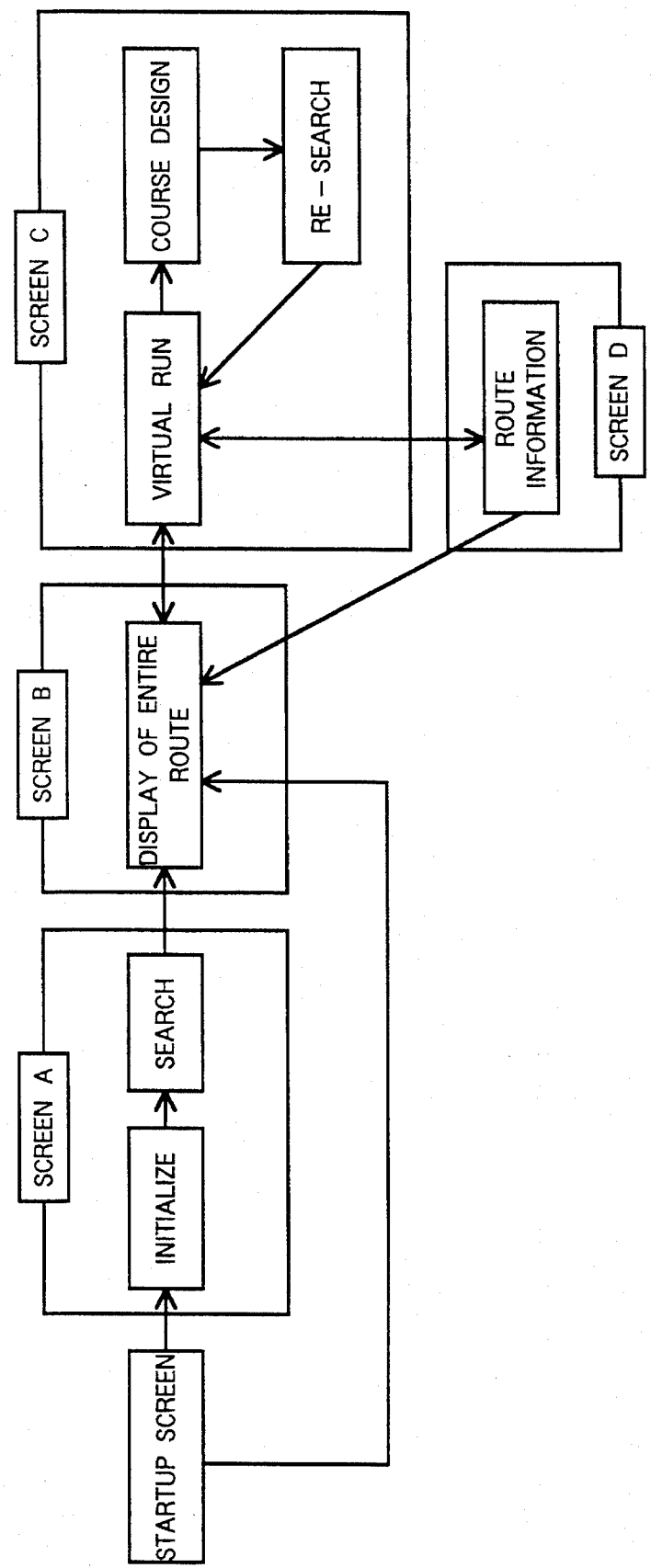
FIG. 3 is a flow chart of an operating procedure and screen transition of the map display system according to the present invention.

FIG. 3 shows a routine for the virtual run mode of the map display system according to an embodiment of the present invention. When the power of the present system is turned ON, the start screen is first displayed showing a menu for selecting how the route of the virtual run mode is to be set. In the case of a prepared file, the entire route display screen is displayed by designating the corresponding file while omitting the route search. In the absence of corresponding file, on the other hand, the point setting screen is displayed, showing a window for a sub-menu for setting a point such as the destination or starting point, and the route search is executed by designating and (initially) setting the point in the sub-menu. When this route search is ended, the entire route is displayed on the screen.

When the execution key (or start button) is operated from the entire route display screen, the virtual run screen is opened to display the vehicle on the route, generally at the center. With the vehicle being shown at the center of the screen, the map display is scrolled past the vehicle to simulate the vehicle running along the route. For scrolling the map screen in the virtual running mode, the map is scrolled with the vehicle pointed upward on the screen or, so to speak, headed up, or the map is scrolled by turning the vehicle 360 degrees with the azimuth such as north N being fixed upward of the screen.

While the virtual run mode is being executed on the virtual run screen, the course can be designed in advance with a detour to a point off the route, a change in the route and/or a rest at some place. Especially in case where the route is to be changed, the search is again executed ("re-searched"), and the virtual run mode is again executed along the re-searched (redesigned) route. When the virtual run is to be interrupted to acquire the route information, on the other hand, the route information screen can be opened to view the route information such as major points on the route, the express highway, the name of the interchange (IC), the national route No. the inter-point distance, the time or the toll of the express highway. This route information makes it possible to confirm the details of the designed route other than by resort to the map. After this, the mode can be returned to the virtual run mode to design the route and confirm the route. When the present system is mounted as a navigation system on the vehicle, the navigation mode can be started on the basis of the route confirmation or route designed in the virtual run mode.

Here will be described display screens utilized in the virtual run mode. FIGS. 4a–4d show one example of the layout of startup screens (i.e., screen A of FIG. 3). The initial startup screen, FIG. 4a, displays the entire area map contained in the data bus, and the second and later screens display the screen at the previous ending time. Next, the main menu is displayed, FIG. 4b, and the key "FROM THE BEGINNING" is selected. Then, the stored information relating to the virtual run is initialized, and a point on the map is set from the beginning to search the route so that the virtual run is executed along the searched route. If instead the key "FILE" is operated and then "CALL" is selected in the submenu of FIG. 4c, it is possible to use a set route which has been prepared in advance filed in storage.

In case the key "FROM THE BEGINNING" is selected, the cursor is positioned at an arbitrary point selected from the wide area map containing all the regions of the data base displayed as the initial screen, and the point setting menu is displayed by operating the set key so that the starting point (or present location), the transit point, the destination and so on are designated and set from that menu. Next, by the search condition setting menu, search conditions, such as whether or not a toll road is preferred and whether or not the transit point is to be used, are set.

Figure 4C:
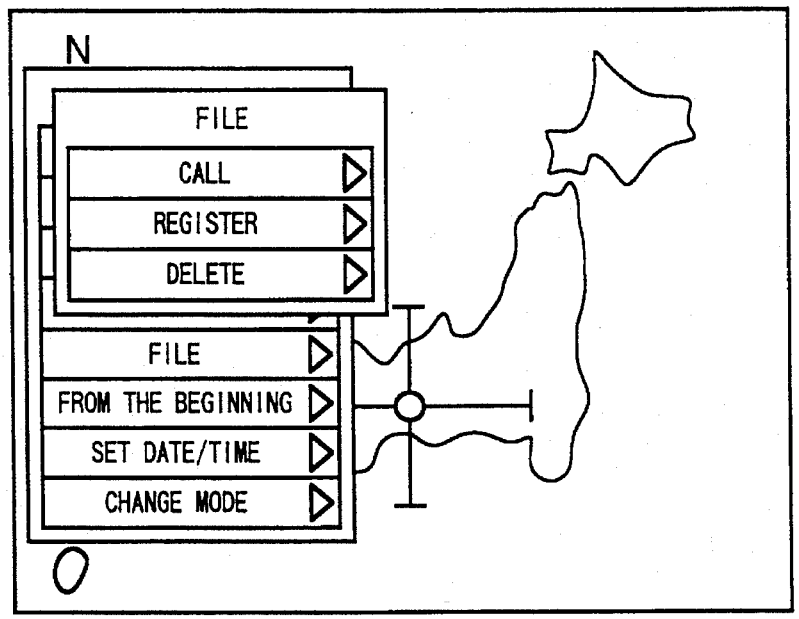
Figure 4D:

If the keys "FILE" and "CALL" are selected, the file calling display screen, FIG. 4d, is displayed listing files in order of their Nos. along with the individual routes, their dates of registration and the contents of routes. If a file No. is designated from this list, the entire route display screen (i.e., screen B) based upon that route is displayed.

Figure 5:
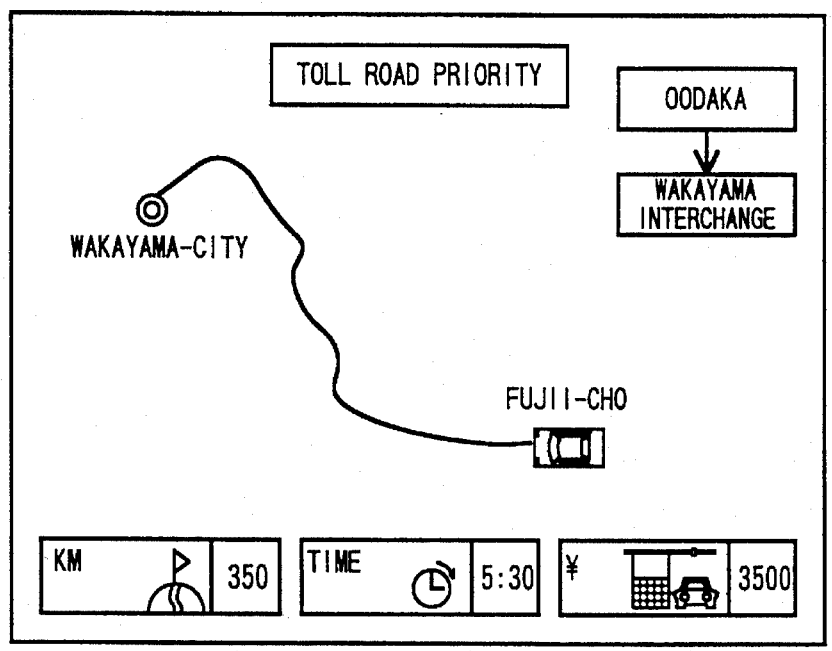
FIG. 5 illustrates one example of an entire route display screen.

In FIG. 5 showing one example of the layout of the entire route display screen, the vehicle marker is displayed at the starting point together with the route information for confirming the overall designed route, the toll road information, the distance information, the required travel time information and/or the tariff information. In the illustrated example, the displayed route has been designed by a search executed under the condition preferring toll roads by setting "FUJII-CHO" as the present location or position and "WAKAYAMA CITY" as the destination. The "entrance" IC and the "exit" IC of the toll road on this route are set as "OODAKA" and "WAKAYAMA INTERCHANGE", respectively. Moreover, this route has a distance (KM) of 350 Km, a required travel time (TIME) of 5 hours and thirty minutes, and a toll (¥) of 3,500 yen. If the virtual run mode is selected after the route has been confirmed on this entire route display screen, the virtual run screen (of FIG. 6) is displayed.

Figure 6:
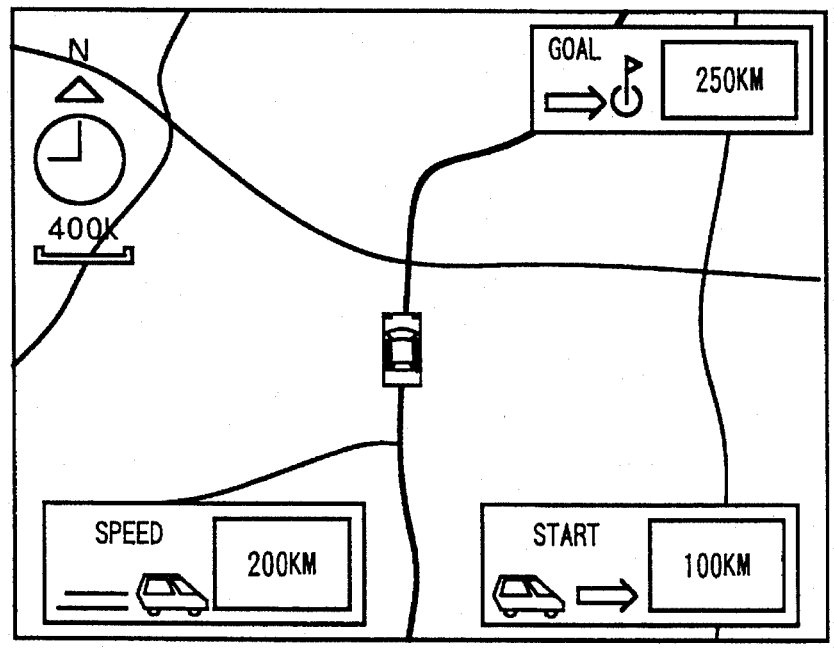
FIG. 6 shows one example of a basic screen of the virtual run mode.

FIG. 6 shows one example of a layout of the virtual run screen. The map on which the vehicle is to run in the upward N direction, is displayed, and the controller is operated to start the vehicle. Specifically, the vehicle appears to advance as if it is running along the route, by fixing the vehicle marker in that position and by scrolling the map on the screen past the vehicle marker. In the present example, the situation of the periphery of the virtual present location is easily found because the vehicle is displayed as fixed at the center of the display screen.

The route information to be displayed while the vehicle is running on the route includes the distance remaining to the destination, the distance travelled from the starting point and the speed of the vehicle. In the illustrated example: the remaining distance to the destination (to GOAL) is 250 Km; the covered distance is 100 Km; and the present speed is 200 Km/hr. In this virtual run mode, the vehicle speed can be selected to have a speed magnification or increase according to the reduced scale of the map by the controller. If the detail of the route is acquired at the virtual running time, a route information screen (of FIG. 7) is opened.

Figure 7:
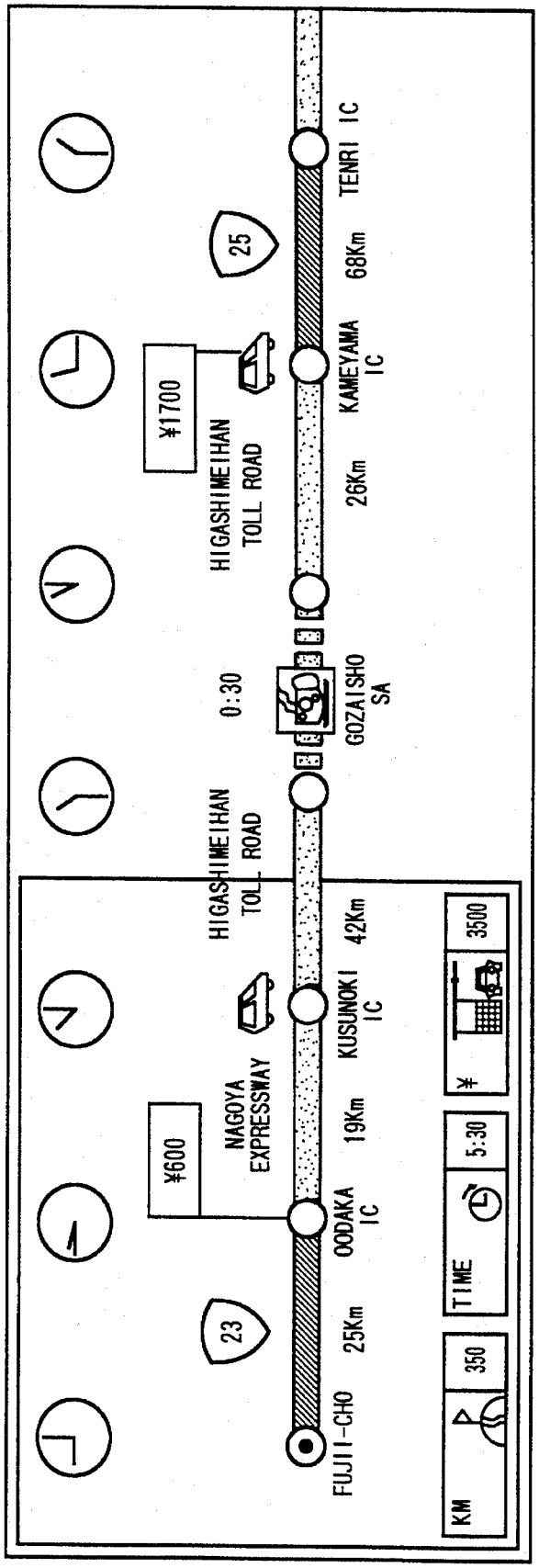
FIG. 7 shows one example of a route information screen.

In FIG. 7 showing one example of a layout of the route information screen, the route is drawn straight in the horizontal direction on the screen. On this route, there is displayed route information such as the road name, the major point names, the distance between the major points, and/or the scheduled times of arrival at the major points. This display screen can be horizontally scrolled. Here, the portion enclosed by a frame at the lefthand side of the drawing is displayed in the route information screen. In the shown example, the vehicle runs 25 Km on National Road 23 from "FUJII-CHO" to "OODAKA IC" of Nagoya Expressway and 19 Km on Nagoya Expressway from "OODAKA IC" and enters Higashimeihan Toll Road at "KUSUNOKI IC". The virtual present location in the virtual run is displayed as located at Kusunoki IC.

The upper portion of the screen displays the scheduled times of arrival at the individual points. Specifically, the starting time is displayed for Fujii-cho, and the times of transition are displayed at Oodaka IC and Kusunoki IC. Moreover, the tariffs displayed are those to be consumed between the interchanges having toll gates. For example, the toll of "600 yen" is displayed at Oodaka IC between Oodaka IC and Kusunoki IC. If the virtual run is further executed, the screen is scrolled from the right to the left so that similar route information is displayed.

In addition, since the information as to detours or rest spots is displayed on the route information screen, the detailed route information on what point and how long a rest is to be taken and where and how long the detour is can be confirmed on the screen and reflected in the route design. After the designed route has been confirmed on the route information screen, the search condition can be changed again to execute the route search thereby to effect the virtual run suitably according to the route.

Next, additional screens used in the virtual running mode will be described.

Figure 8:
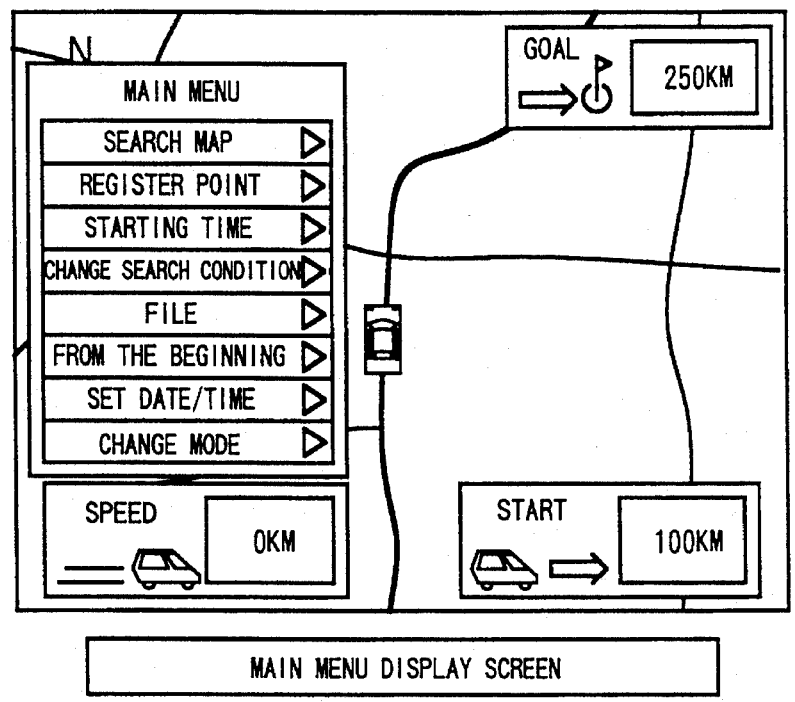
FIG. 8 shows one example of a main menu display screen.

FIG. 8 shows an example of the main menu display screen used in the virtual run mode. This main menu display screen can be opened from any of the other screens, to select a map search, point registration, the setting of starting time, a change in the search conditions, the file procedure and the setting of the date and to display their setting screen to thereby set the conditions for a new route design. In the main menu, the "SEARCH MAP" provides display of an arbitrary point on the map in accordance with a telephone No. or a point name reference. The "REGISTER POINT" key registers an arbitrary point as the home or the memory point. The "STARTING TIME" key sets the time at the starting point so as to calculate the arrival time on the basis of the required travel time. The "CHANGE SEARCH CONDITION" key changes only a search condition (e.g. whether or not the "toll road is preferred" or "the transit point is used") but not the starting point or the destination. The "FILE" key calls the virtual run route from the memory, registers (saves) the route or deletes the route file. The "FROM THE BEGINNING" key initializes all the set items and starts a new virtual run from the setting. The "SET DATE/TIME" key sets the date and the time. The "CHANGE MODE" key can switch, when the GPS receiver is connected, the mode from the virtual run mode to the navigation mode or vice versa.

Figure 9:
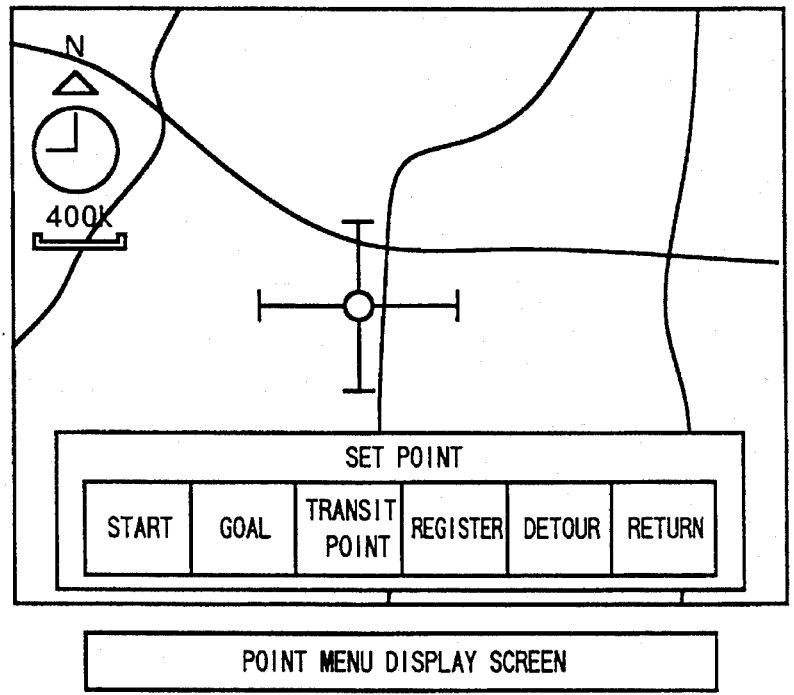
FIG. 9 shows one example of a point setting menu display screen.

FIG. 9 shows an example of the point setting menu display screen. This point setting menu display screen is automatically displayed, when a point is set, with the destination, the present location and the transit point as the selected points. According to this function, it is easy to designate selected points as the set points.

Figure 10:
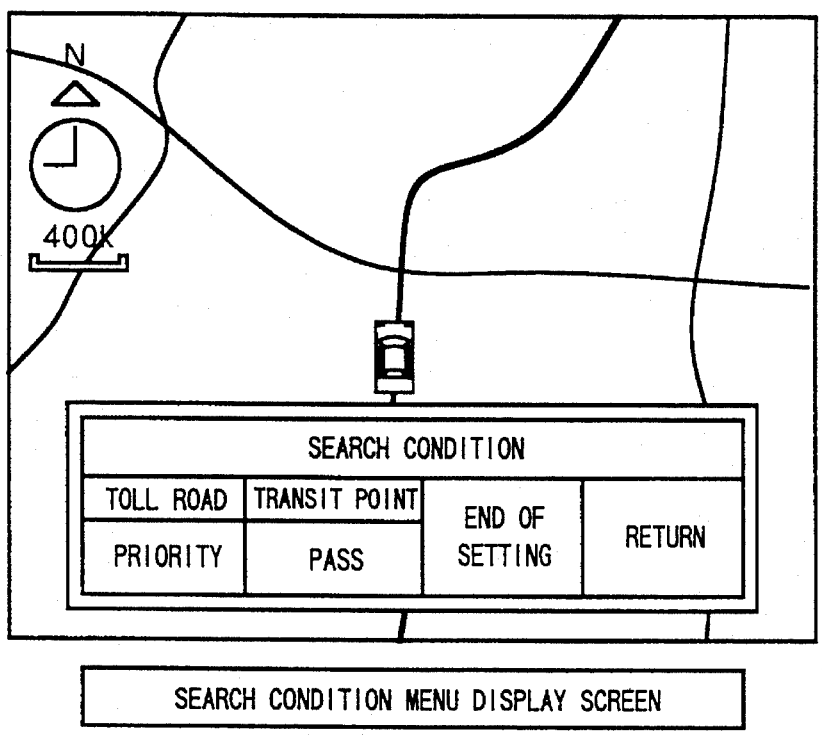
FIG. 10 shows a search condition menu display screen.

FIG. 10 shows an example of the search condition menu display screen. This search condition menu display screen is automatically displayed, when a necessary point is set, and provides for selection of "PRIORITY" or "NOT" for a toll road priority search condition and "PASS" or "NOT" for a transit point each time a transit point is set. This function provides easy selection of the search conditions.

Figure 11:
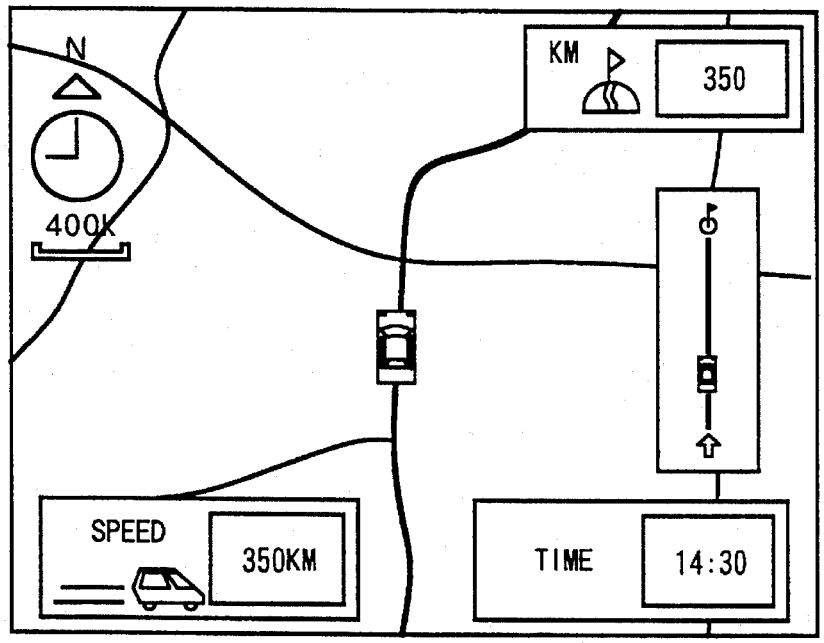
FIG. 11 shows one example of a present position display screen for the entire route.

FIG. 11 shows an example of the screen displayed by operation of the present point key on the controller during the virtual run mode. From this display screen, the time the vehicle has run and/or the distance remaining to be travelled can be determined at a glance by locating the present position on the route. In the present example, the entire route is displayed as a straight bar, on which is displayed the virtual present position marker. Since, according to this function, the position of the virtual present location relative to the entire route is linearly displayed, it is possible to easily confirm where the vehicle is running.

Figure 12:
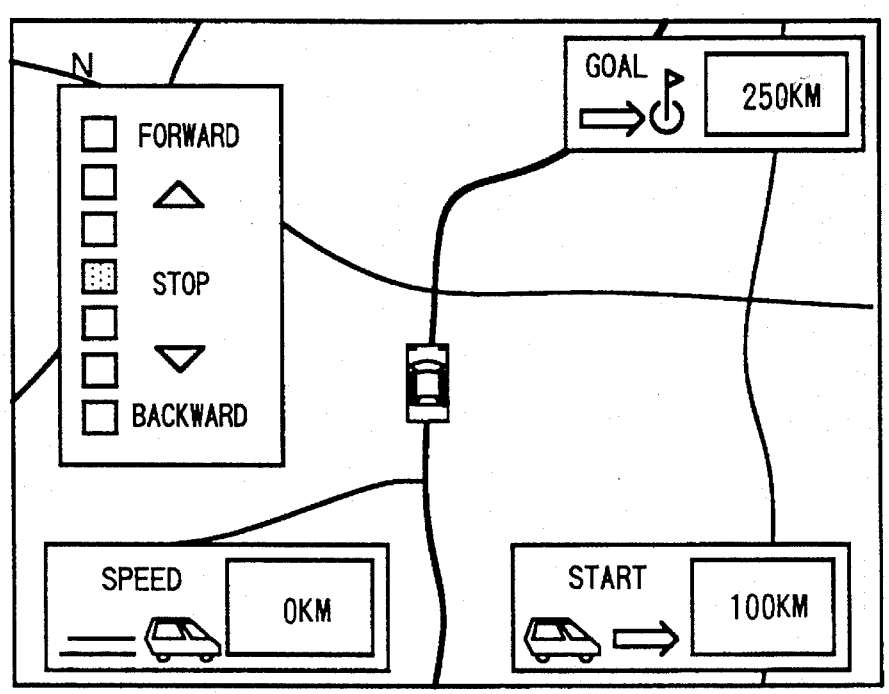
FIG. 12 shows one example of a speed setting screen.

FIG. 12 shows an example of the speed setting screen. This speed setting screen is displayed, when the set key on the controller is operated during a virtual run, so that the virtual running speed can be arbitrarily set by manipulating the joy stick. According to the present function, the set present speed can be found at a glance, when desired, by operating the set key.

In addition to the display screens described above, there are a peripheral list display screen and a re-search display screen, although not shown. The peripheral list is a display of features in the vicinity of the destination such as roads or buildings in the sub-menu, when their details are desired. A guide of registered points provides detailed information for various destinations such as date spots, camping sites or recreation grounds. When the designed route is to be wholly or partially changed after the virtual run of the route, it can be set again if a new point is set and re-searched, to again confirm the portion which has been changed by the virtual run.

Figure 13:
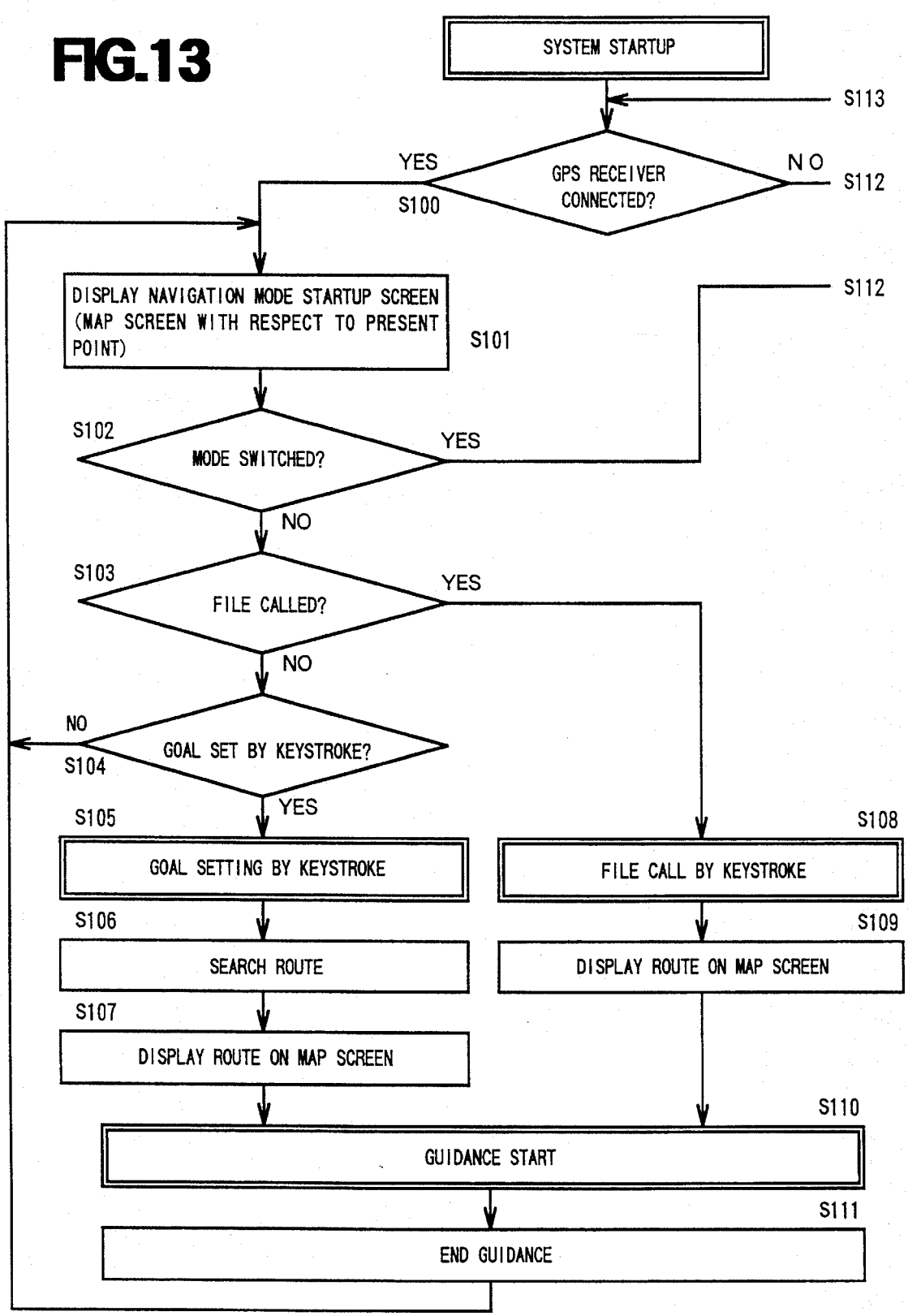
FIG. 13 is a flow chart of the entire operating routine for the system.
Figure 14:
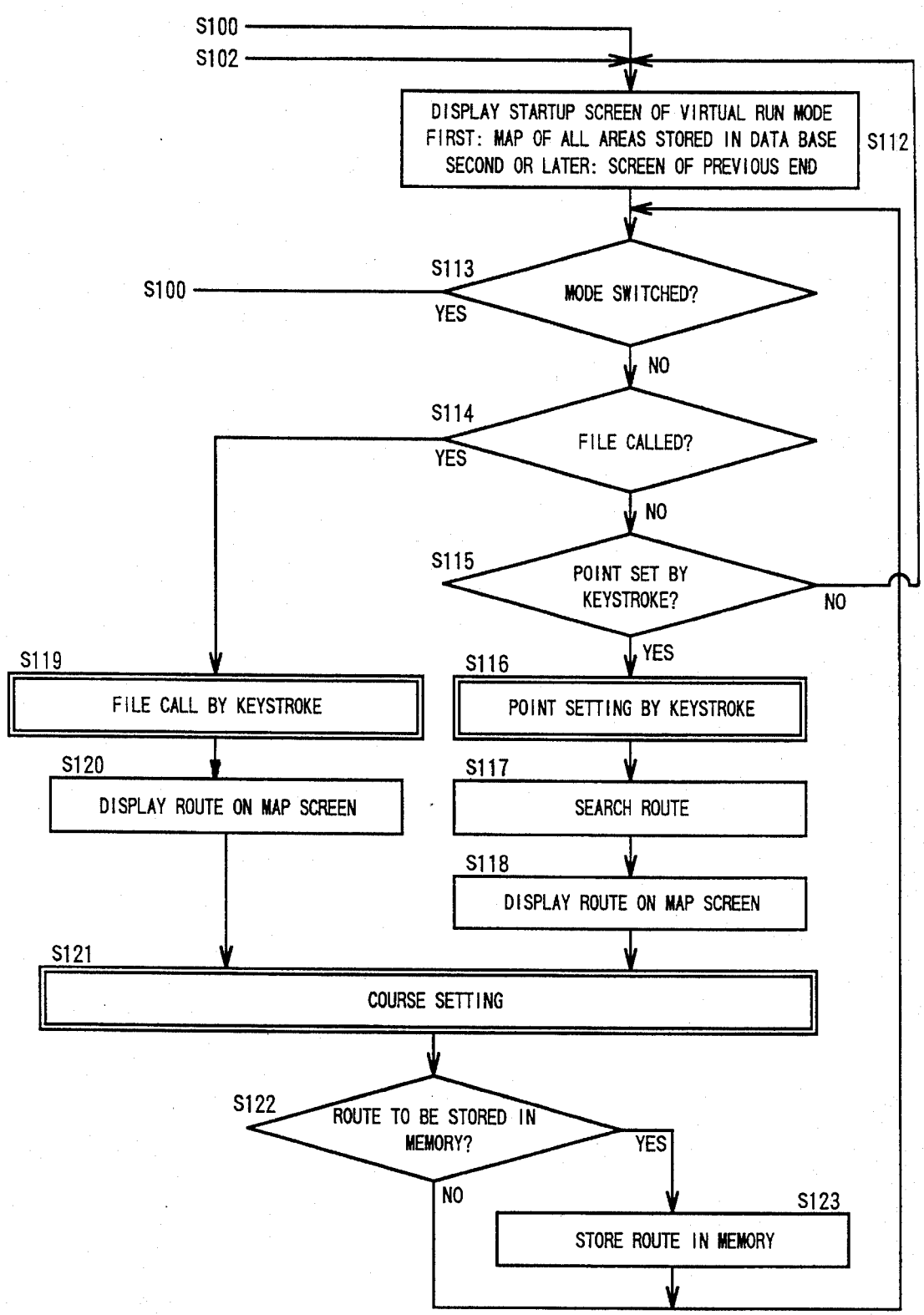
FIG. 14 is a flow chart following the entire processing flow of the system shown in FIG. 13.
Figure 16:
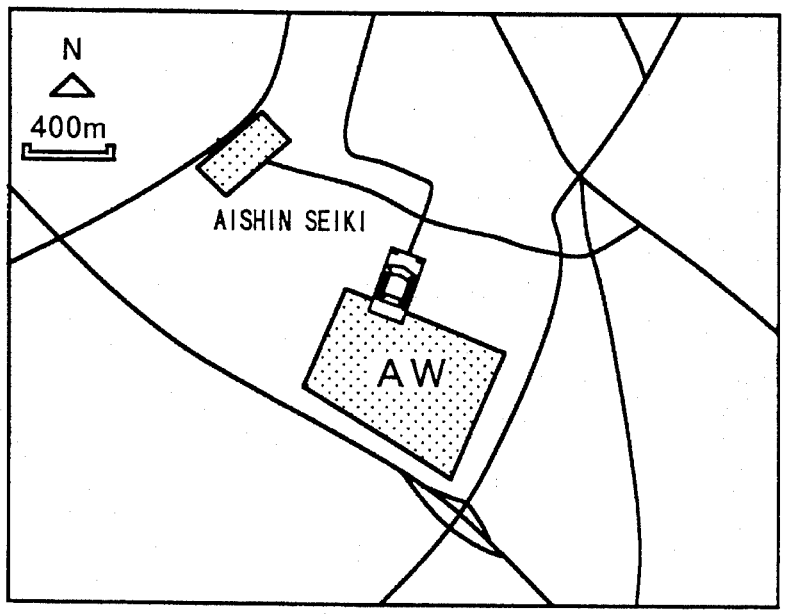
FIG. 16 shows a startup screen in the navigation mode.

Here will be described the entire procedure of the present system. FIGS. 13 and 14 are flow charts of the routine for operation of the above-described embodiment. First of all, when the power of the present system is turned ON to start the system, the connection of the GPS is decided (at S100). In the connected state, the routine comes into the navigation mode to display the startup screen of the navigation mode (at S101), as shown in FIG. 16. FIG. 16 shows the map display screen with the present location. If the GPS is not connected and the system is used as the so-called "home type", the routine provides the virtual run mode which commences with display of the startup screen shown in FIG. 14 (at S112).

When the navigation mode is initiated, it is decided (at S102) whether or not the mode is switched in the screen of FIG. 16. If the answer is NO, it is decided (at S103) whether or not a file has been called. If a file has been called, the routine enters the "FILE CALL BY KEYSTROKE" (at S108), as shown in FIG. 15. Then, the route of the called file is displayed (at S109) on the map screen. Without a file call, on the other hand, it is decided (at S104) whether or not the destination has been set by key operation. If this answer is YES, the routine goes to "GOAL SETTING BY KEYSTROKE" (at S105), as shown in FIG. 15. Then, the route is designed by search (at S106), and the designed route is displayed (at S107) on the map screen. Through Step S107 or S109, the guidance is started (at S110). The routine is returned to Step S101 if it is decided that the operation of Step S104 has not been executed or if the guidance is ended (at S111).

In case it is decided at Step S100 that the GPS is not connected or it is decided at Step S102 that the mode is switched, the routine enters the virtual run mode to display the startup screen of the virtual run mode (at S112, FIG. 14). From this point on, the procedures similar to those of Steps S102 to S109 are executed (at S113 to S120). In case, however, it is decided at Step S113 that the mode is switched, the routine is returned to Step S100. The route design is entered (at S121) through Step S118 or S120. It is decided (at S122) whether or not the designed route is to be stored in the memory. If this answer is YES, the storing operation is executed (at S123). After the end of the storing operation or in case no storage is decided at Step S122, the routine is returned to Step S113.

Figure 15A:
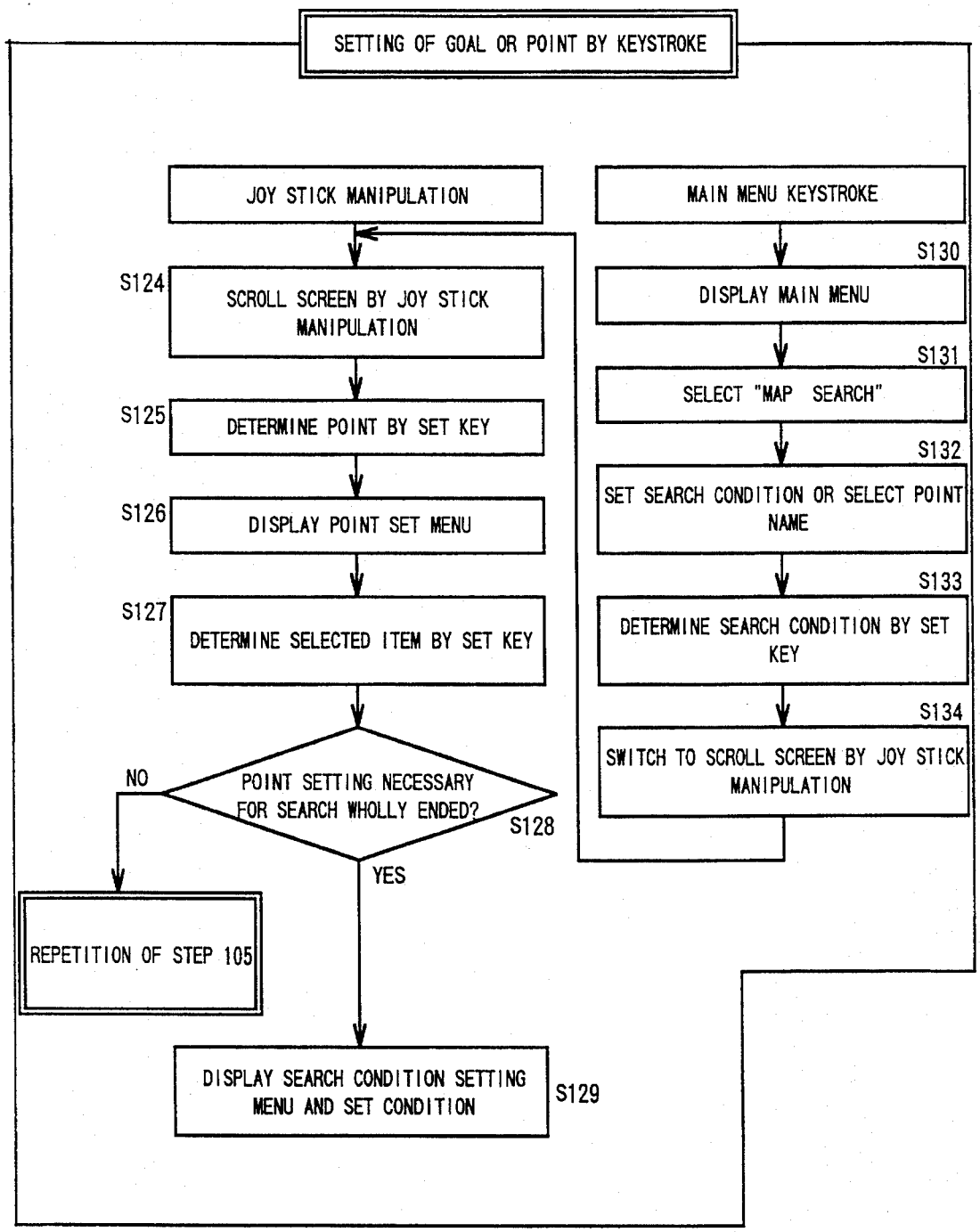
FIG. 15a is a flow chart of a destination setting routine.
Figure 15B:
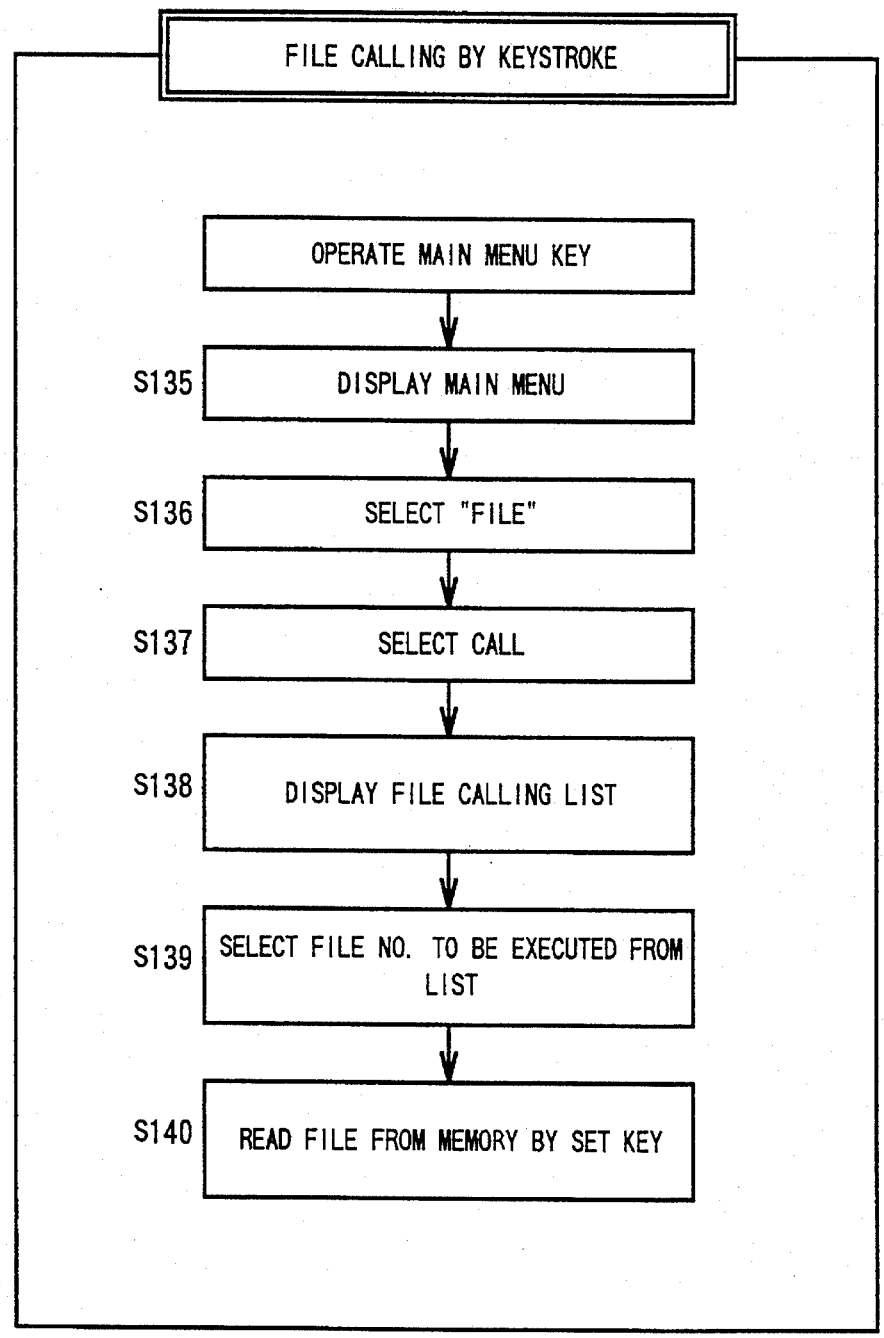
FIG. 15b is a routine for calling a file by key strokes.
Figure 17A:
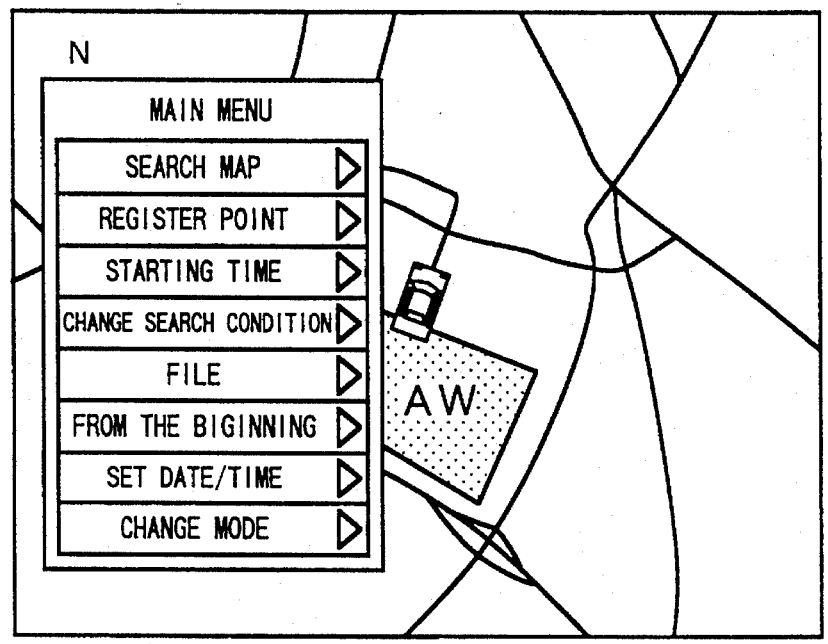
FIGS. 17a and 17b shows a main menu display screens in the virtual running mode.
Figure 17B:
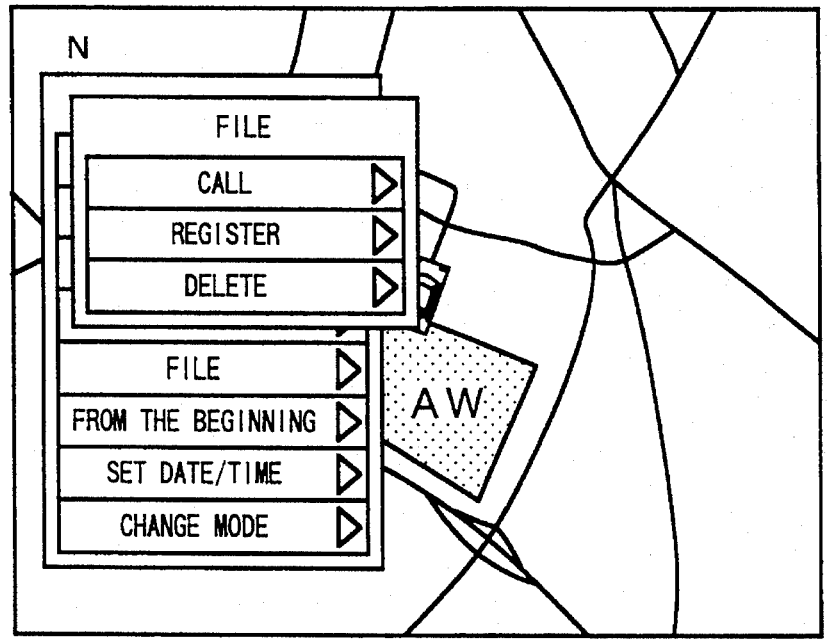

Here, the "FILE CALLING BY KEYSTROKE", as shown in FIG. 15b, is started by operation of the main menu key. First of all, the main menu shown in FIG. 4b or 17a is displayed (at S135) by operating the main menu key to select the "FILE" key (at S136). When the file menu is displayed (as shown in FIGS. 4c or 17b), the "CALL" key is selected (at S137) to display the file calling list (at S138), as shown in FIGS. 4d or 18. The file to be executed is selected (at S139) from the list and is read (at S140) from the memory by the set key. Thus, the operations of Step S108 or S119 are ended to go to the next routine.

On the other hand, the "SETTING OF GOAL OR POINT BY KEYSTROKE", FIG. 15a, is started by operation of the joy stick or the main menu key. By operation of the joy stick, the routine starts screen scrolling (at S124). After the cursor has been moved to an arbitrary point at Step S124, the point is set by the set key (at S125). Subsequently, the point set menu (of FIG. 9) is displayed (at S126), and the the point is designated a starting point, the destination or a transit point by operating the joy stick and the set key (at S127).

It is decided (at S128) whether or not the point setting necessary for the search has been wholly ended. The minimum necessary for the search are the starting point and the destination in the virtual run mode and the destination in the navigation mode. Unless ended, the operation of Step S105 of FIG. 13 is repeated. If ended, the search condition setting menu (of FIG. 10) is displayed, and the condition is selected by the joy stick and determined by the set key (at S129). After the end of the search condition setting, Step S105 or S116 is ended to allow entry into the subsequent routine.

The map screen including an arbitrary point is displayed by making use of the map searching function in the main menu. For this purpose, the main menu key is manipulated to display the main menu (at S130), and the "MAP SEARCH" is selected (at S131). Subsequently, the search condition is set, or the point name is selected (at S132). Here, the search condition is exemplified by the telephone No. and the memory point. Moreover, the point name indicates the method to be executed by displaying the list which is in the data base and classified by genre such as addresses, hotels and stations. If the search condition is decided by the set key (at S133), the map screen around the center is displayed to go into the scroll screen (at S134) by manipulation of the joy stick.

Figure 19:
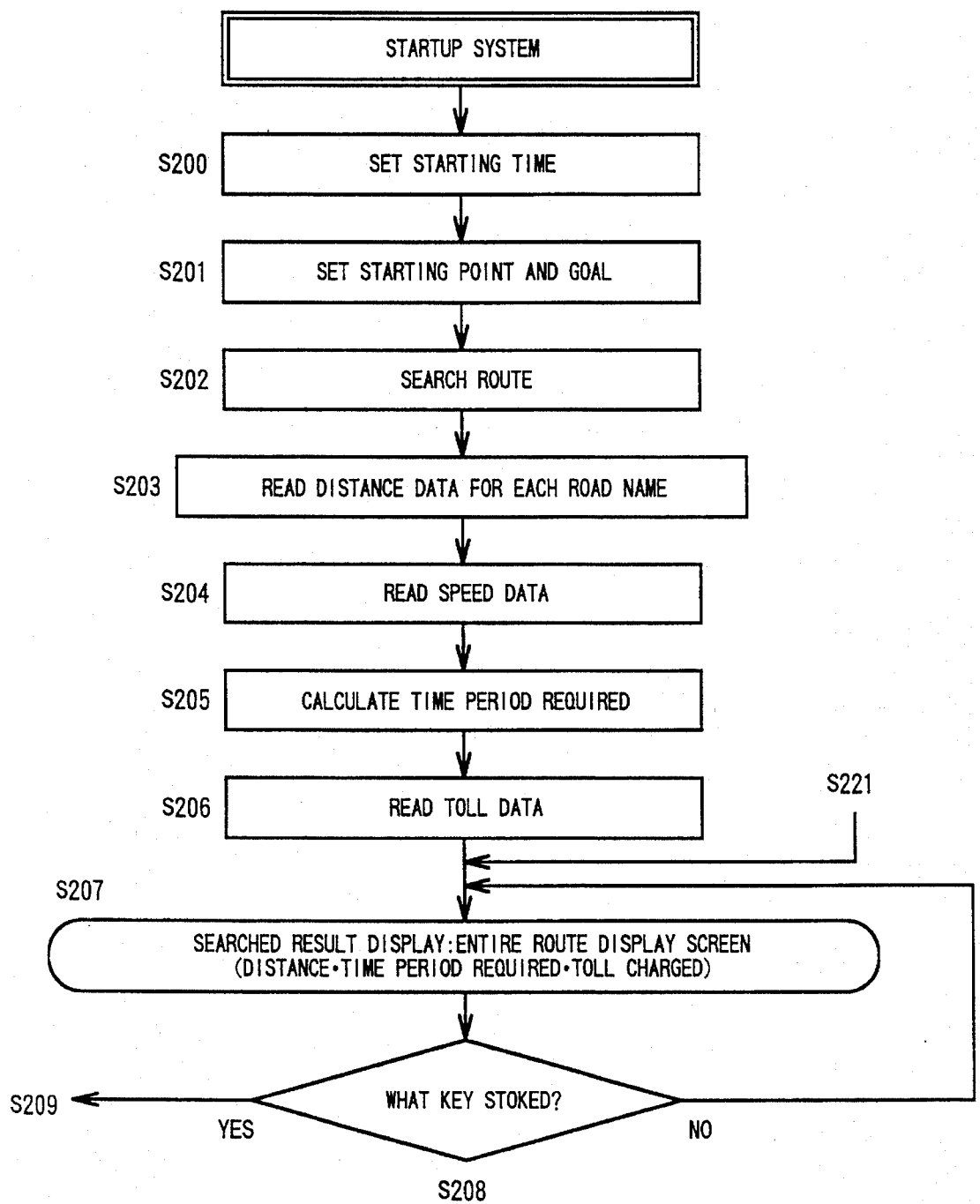
FIG. 19 is a flow chart of the operating routine from the startup of the system to the display of the search results.

The routine for the virtual run mode is illustrated in FIG. 19 which shows processing from the system startup to the display of the search results. After the system has been started up, the starting time is set (at S200) on the route setting screen, and the starting point and the destination are set (at S201) to execute the route search (at S202). In this route searching routine, the distance data (at S203) and the speed data (at S204) for each named road are read to calculate the required travel time (at S205). Then, the toll data for a toll road such as an expressway is read (at S206) to calculate the toll of the toll road on the designed route, and the search results including the route information such as the distance, the required travel time and the required toll is displayed (at S207) on the entire route display screen (as shown in FIG. 6). It is decided (at S208) whether or not any key has been operated on the entire route display screen. If this answer is YES, the routine goes into the virtual run mode.

Figure 20:
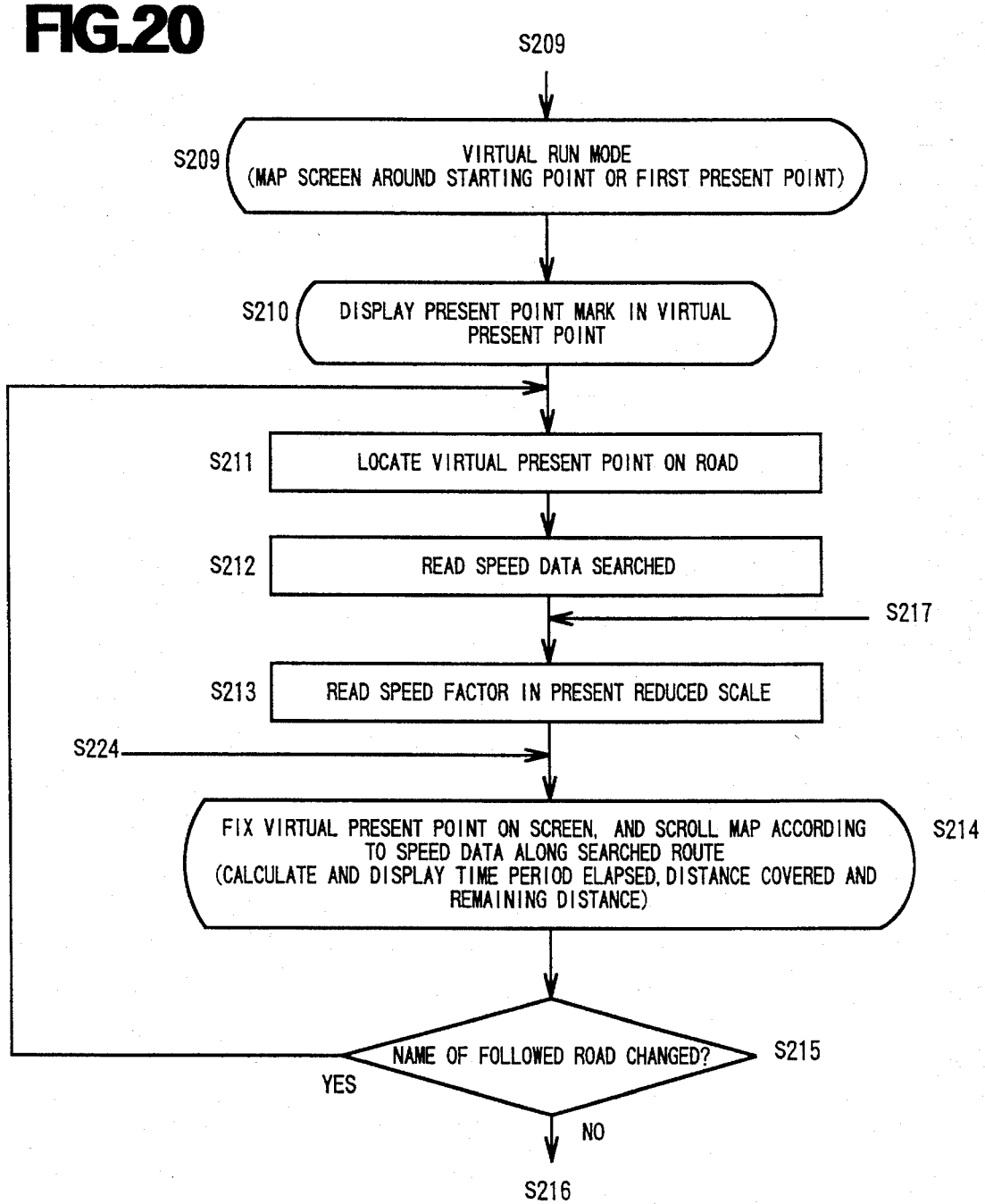
FIG. 20 is a flow chart of the operating routine from a map screen display to map scrolling in the virtual run mode.

When the virtual run mode is entered, as shown in FIG. 20, the map screen displays a map of the area around the starting point or the first present location (at S209). The virtual present location marker (or the vehicle marker) is displayed on this map (at S210). The virtual run screen shown in FIG. 16 is displayed by the procedures of Steps S209 and S210. After recognition (at S211) on which road the virtual present location is located, the speed data searched is read (at S212). Next, the speed factor in the present reduced scale is read (at S213), and the virtual present location is fixed on the screen so that the map is scrolled (at S214) along the designed route according to the speed indicated by the speed data. During the virtual run, the elapsed time, the covered distance and the remaining distance are individually calculated and displayed on the screen. It is decided (at S215) whether or not the type and name of the road being followed has changed. If this answer is YES, the routine returns to Step S211 to determine the type and name of the road. Otherwise, it is decided (at S216)

whether or not the scale of the map shown in FIG. 16 has been changed.

Figure 21:
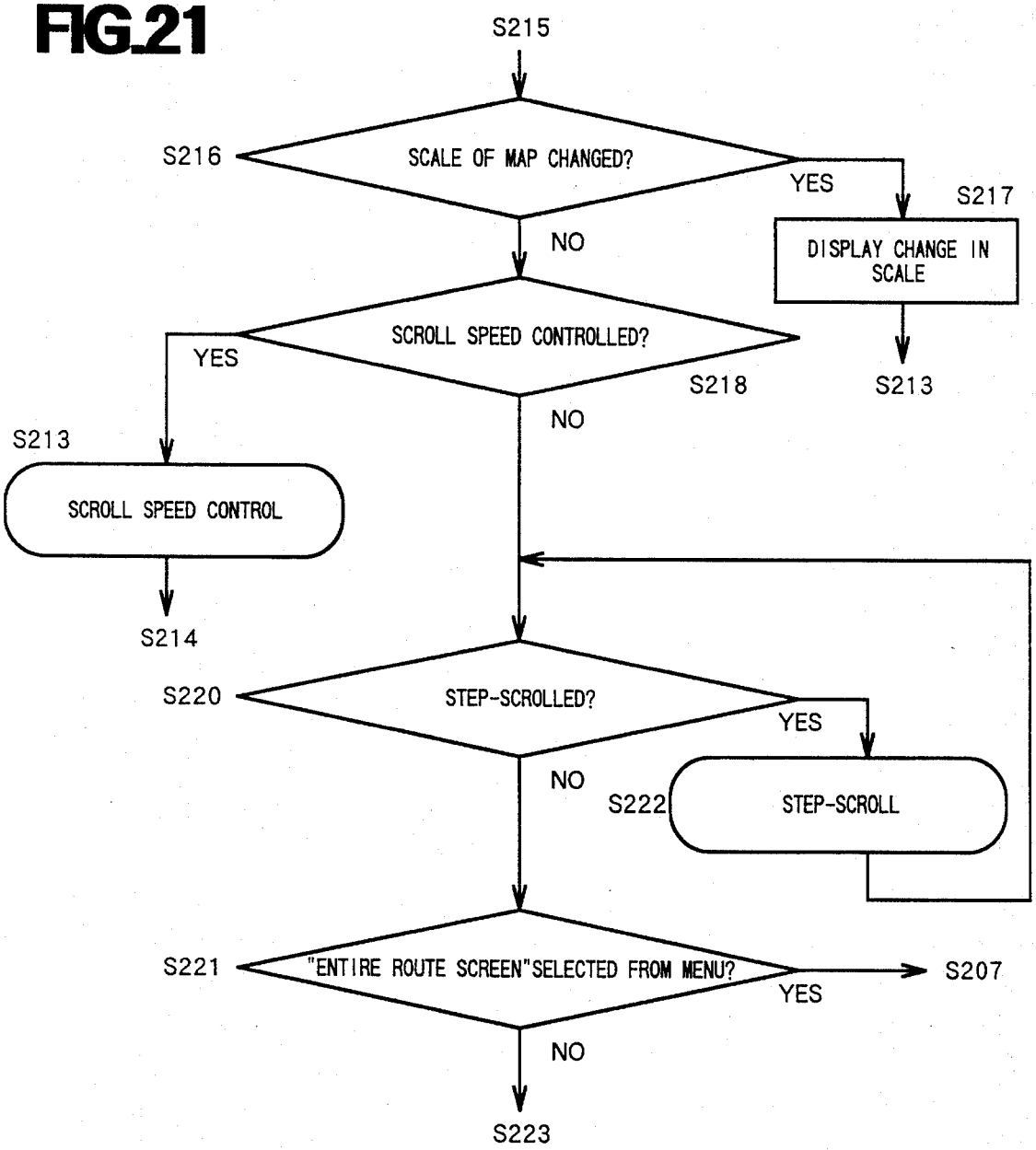
FIG. 21 is a flow chart of the operating routine from decision of map scale to a selection of an entire route screen.

If a change in the map scale is indicated in FIG. 21, it is displayed (at S217), and the routine is returned to Step S213 to determine the present speed factor. The speed can be decelerated to allow making a detailed course design for a certain area or accelerated where the course is merely to be travelled as is without any detailed design or where the vehicle is running through an area requiring no change by the drive such as an expressway between interchanges. It is decided (at S218) whether or not such speed control has been carried out. If this answer is YES, the routine is returned to Step S214 to scroll the map according to the controlled speed. Otherwise, the step-scrolling is decided (at S220). Without any step-scrolling, it is decided (at S221) whether or not the "ENTIRE ROUTE SCREEN" has been selected from the menu. With step-scrolling selected, the step-scrolling is executed (at S222), and the routine returns to Step S220.

Here, the step-scrolling implies that the area around the starting point, which is well known to the driver, is stepwise scrolled at each intersection or service area or at a constant time interval so that the virtual run can be slowly examined and confirmed in detail after reaching point such as an interchange near the destination.

Figure 22:
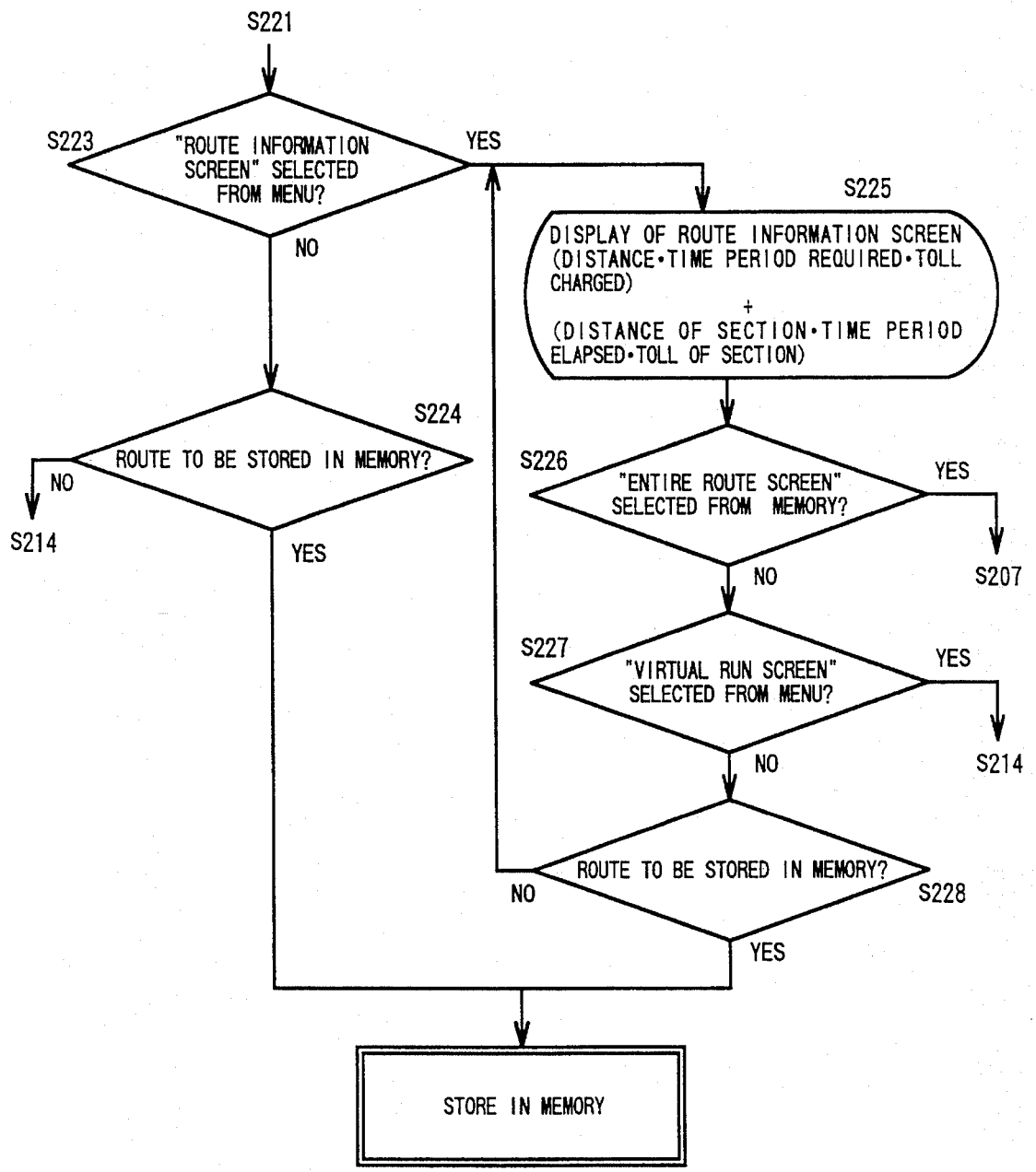
FIG. 22 is a flow chart showing a routine from selection of a routine information screen to storage of a route in memory.

If the entire route screen is not selected at Step S221, the routine shifts to that shown in FIG. 22. Specifically, it is decided (at S223) whether or not the "ROUTE INFORMATION SCREEN" has been selected from the menu. If NOT, it is decided (at S224) whether or not the route is to be stored in the memory. This route, if necessary, is stored in the memory. If the route is unnecessary, the routine is returned to Step S214 to continuously advance the virtual run. If the route information screen is selected at the decision of Step S223, the route information such as the section distance, the elapsed time period and the section toll, in addition to the distance, the required travel time and the required toll are displayed on the route information screen, as shown in FIG. 8. The details of the route information are confirmed on this route information screen.

It is decided at S226 from the route information screen whether or not the "ENTIRE ROUTE SCREEN" has been selected from the menu. If this answer is YES, the entire route display screen is displayed at Step S207. If the entire route screen is not selected, it is decided at (S227) whether or not the "VIRTUAL RUN SCREEN" has been selected. If this answer is YES, the virtual run screen is displayed at Step S214. If this virtual run screen is not selected, it is decided (at S228) whether or not the route is to be stored in the memory. This route, if necessary, is stored in the memory, but otherwise the routine is returned to Step S225.

Figure 23:
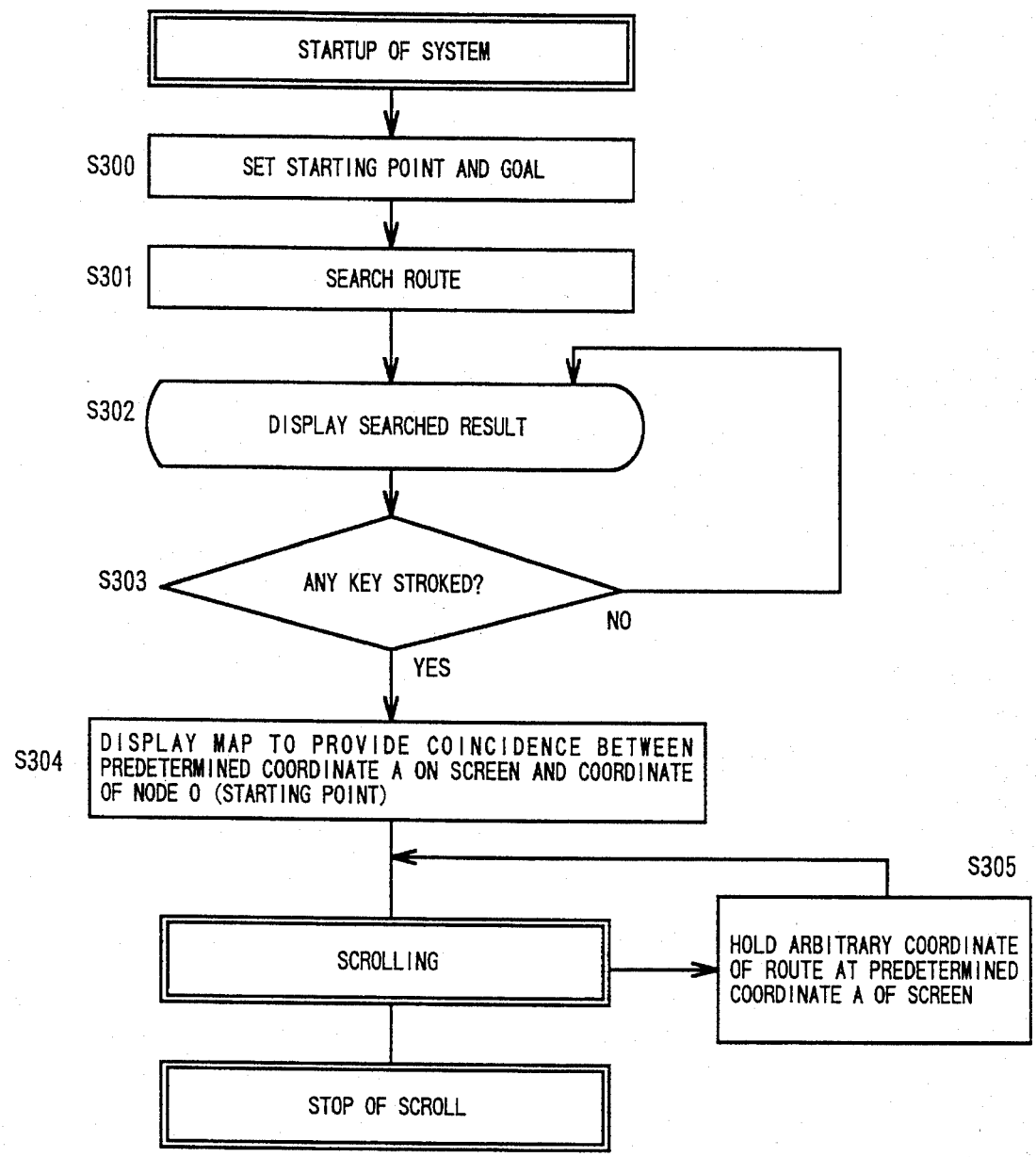
FIG. 23 is a flow chart showing the entire routine of the system including scrolling control.
Figure 24:
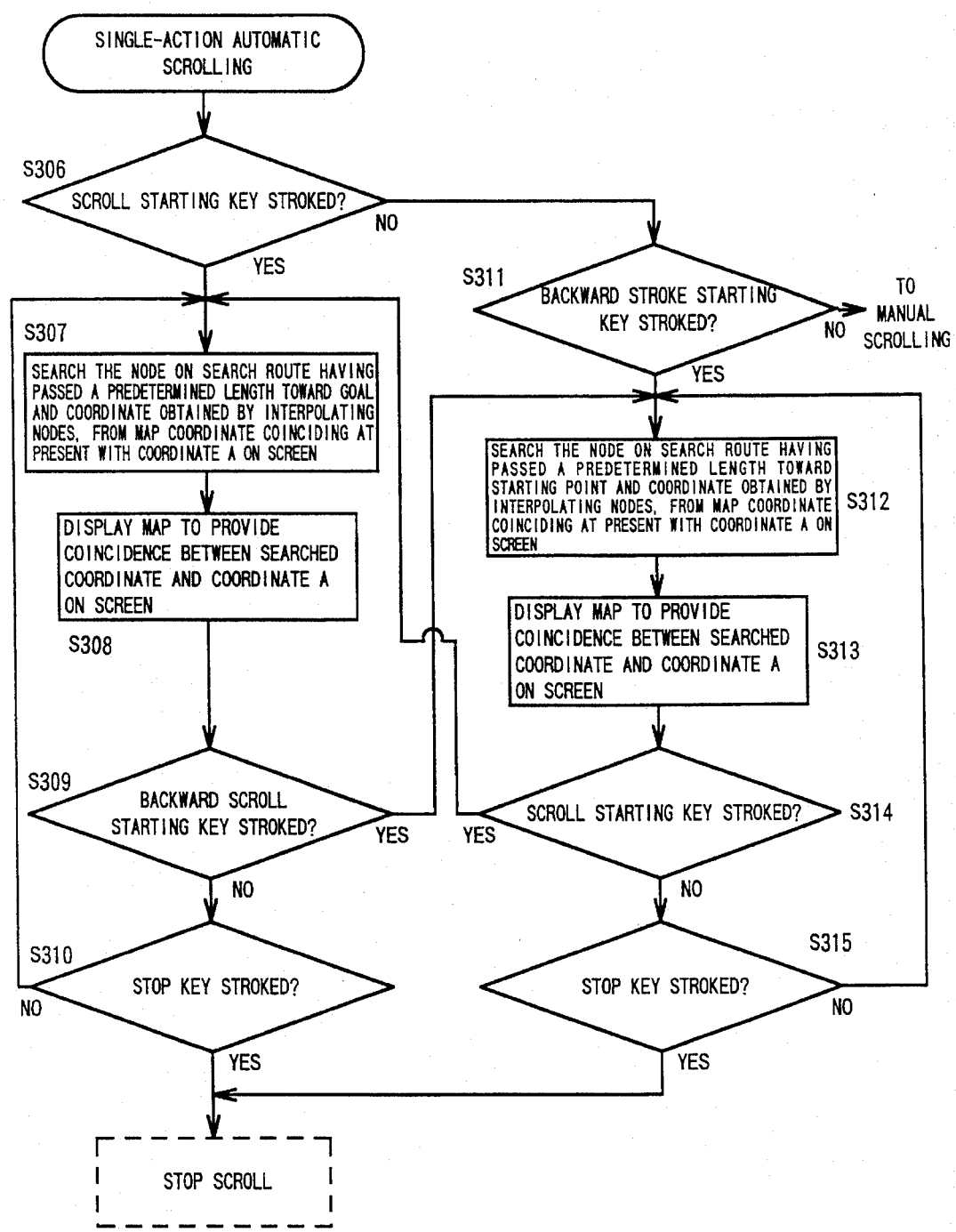
FIG. 24 is a flow chart of a single-action automatic scroll control.
Figure 25:
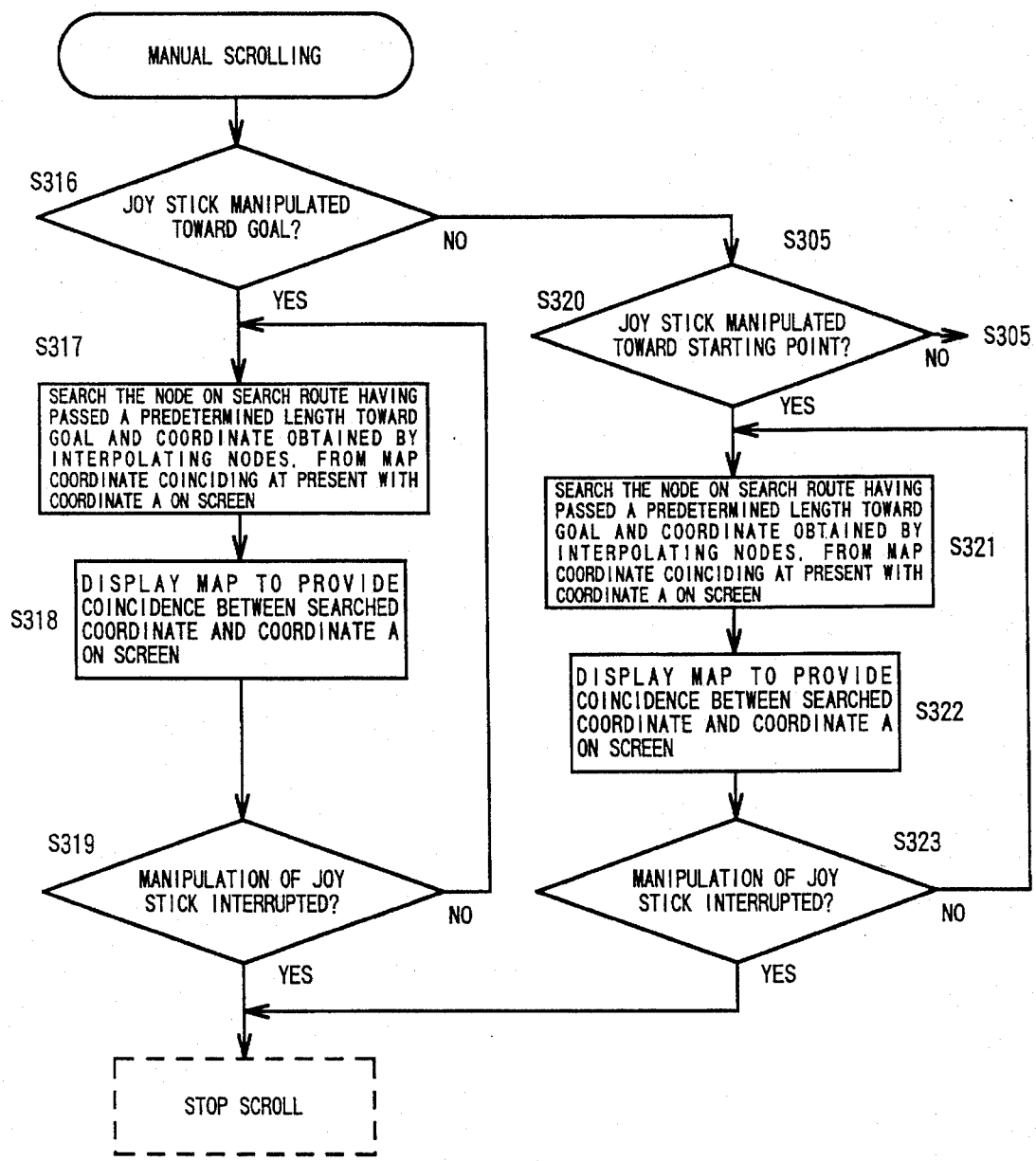
FIG. 25 is a flow chart of a manual scrolling control subroutine.

FIGS. 23 to 25 show a processing routine for the virtual run with scrolling of the screen showing the designed route. In the present example, the route is searched by setting at least two arbitrary points (i.e., the starting point and the destination, "goal") and is displayed, and the display screen is scrolled along the searched route by input of a request for scrolling.

In FIG. 23, the system is started up, and the starting point and the destination are set (at S300) on the route setting screen to execute the route search (at S301). In this route search, the data necessary for the virtual run is processed, and the search result is displayed in the entire route display screen (at S302). It is decided (at S303) whether or not a key has been operated. If this answer is YES, the map is displayed (at S304) with predetermined coordinates A on the screen coinciding with the coordinates of node 0 (i.e., the starting point). Next, the scrolling is executed by a scroll starting key. If neither the scroll starting key nor the backward scroll starting key is operated, arbitrary coordinates on the route are held at the predetermined coordinates A on the screen (at S305).

FIG. 24 shows a single-action automatic scrolling routine. First of all, it is decided (at S306) whether or not the scroll starting key has been operated. If this answer is YES, a search is made at S307 to identify the node on the search route passed at a predetermined distance toward the destination and coordinates obtained by interpolating the nodes, from the map coordinates coinciding at present with the coordinates A on the screen. The map is displayed (at S308) with the coordinates identified by the search coinciding with the coordinates A on the screen. By the operation of Steps S307 and S308, the screen is scrolled as if the vehicle were running along the designed route. During this simulated running, it is decided (at S309) whether or not the backward scroll starting key has been operated. The operation of the stop key is decided (at S310) if the answer is NO, and the strolling is stopped if the answer is YES. If the backward scroll starting key is operated, on the other hand, the backward scrolling at and after Step S312 is executed. If neither the backward scrolling key nor the stop key has been operated, the routine is returned to Step S307 to execute the scrolling continuously.

If the scroll starting key has not been operated at Step S306, it is decided (at S311) whether or not the backward scroll starting key has been operated. If this answer is YES, operations similar to those of Steps S307 and S308 are executed to scroll the screen backward (at S312 and S313). If the scroll starting key is operated (at S314) during the backward scrolling, the routine is returned to Step S307, at which the scrolling is executed. If the stop key is operated (at S315), the scrolling is stopped. By thus switching the scrolling directions between forward and backward, an arbitrary point in the virtual run can be restored many times, and the virtual run can be repeated for detailed examination.

If neither the scroll starting key nor the backward scroll starting key is operated in the single-action automatic scrolling, the manual scrolling is executed. This manual scrolling routine is shown in FIG. 25. First of all, it is decided (at S316) whether or not the joy stick is manipulated toward the destination. If this answer is YES, the node on the search route past a predetermined distance toward the destination and the coordinates obtained by interpolating the nodes are searched (at S317) from the map coordinates coinciding at present with the coordinates A on the screen, as shown in FIG. 26. The map is so displayed (at S318) as to provide a coincidence between the searched coordinates and the coordinates A on the screen. As a result of the operations of these Steps S317 and S318, the screen is scrolled toward the destination as if the vehicle were running along the designed route. In this running situation, the manipulation of the joy stick is decided (at S319), and the scrolling is stopped if the manipulation is interrupted.

If it is decided at Step S316 that the joy stick is not manipulated toward the destination, it is decided (at S320) whether or not the joy stick is manipulated toward the starting point. If this answer is YES, operations similar to those of Steps S317 and S318 are executed to scroll the screen backward (at S321 and S322). This scrolling toward the starting point can involve the operations similar to those of the backward scrolling in the aforementioned automatic scrolling. If an arbitrary point toward the starting point is restored and the manipulation of the joy stick is stopped (at S323), the scrolling is stopped.

In map scrolling according to the present embodiment, at least two arbitrary points (i.e., the starting point and the destination) are set to search the route so that the virtual present location is displayed on the route determined by the search, i.e., the "designed route", the virtual present position is fixed on the display screen by input of a request for scrolling along the designed route. In the example shown in FIG. 16, a line drawing of the vehicle is displayed as the virtual present position marker, which is fixed at the center of the display screen. Especially in the display having the vehicle position fixed at the center of the display screen, the nature of the vicinity of the virtual present location is easy to understand.

The means for displaying the virtual present location marker is exemplified, in the processing routine shown in FIG. 23, by interposing the vehicle position displaying means between Steps S305 and S306. Specifically, after the virtual run mode has been entered to display the map according to the designed route (at S304), the virtual present position marker indicating the virtually running vehicle is displayed (at S304A) at the coordinates A on the screen, as shown in FIG. 27. The display position of coordinates A on the screen are specifically set to the optimum position for widening the displayed vicinity of the virtual present location and the screen of the forward direction of the virtual run. Preferably, the coordinates are set at the center of the screen so that the nature of the vicinity of the virtual present location may be easily observed, and is set with a backward shift from the center of the screen so that the map area forward of the vehicle may be more widely displayed on the screen. The subsequent routine is similar to that of FIG. 23.

Here will be described the scroll controlling operation with reference to FIG. 28 which shows the relationship between the speed control selecting screen displayed responsive to operation of the set key during the virtual run and the speed control key disposed in the controller. This scroll setting screen functions to switch the virtual running speed between three stages and the virtual run between the forward and backward directions.

The setting means in the present example allows control of "forward" run, "stop", "backward" run by using the joy stick. Moving the joy stick to the "+" side steps the run control from "backward" to "stop" or from "stop" to "forward", and moving the joy stick to the "−" side steps the run control form "forward" to "stop" or from "stop" to "backward". Moreover, the forward run and the backward run are individually divided into three speed stages (LOW, MID and HIGH). In the case of the forward run, the speed is accelerated in the order of "STOP"→"LOW"→"MID"→"HIGH" by moving the joy stick to the "+" side and is decelerated in the order of "HIGH"→"MID"→"LOW"→"STOP" by moving the joy stick to the "−" side. The acceleration and deceleration are reversed in the case of a backward run.

The foregoing embodiment has been described as using a joy stick as the speed changing means but, alternatively, can use forward/backward keys and speed changing push keys to switch the running directions and the speeds.

Thanks to the aforementioned scrolling speed control function, the speed can be easily dropped for an area requiring a detailed course design and a course confirmation or raised for another area to improve the operability. Especially, thanks to the forward and backward switching function when the vicinity of a point having already been passed is to be examined again, the virtual run need neither be stopped midway nor repeated from the start, but can be switched backward to restore that point, so that the route can be examined again from that point.

Figures 30, 31, 32:
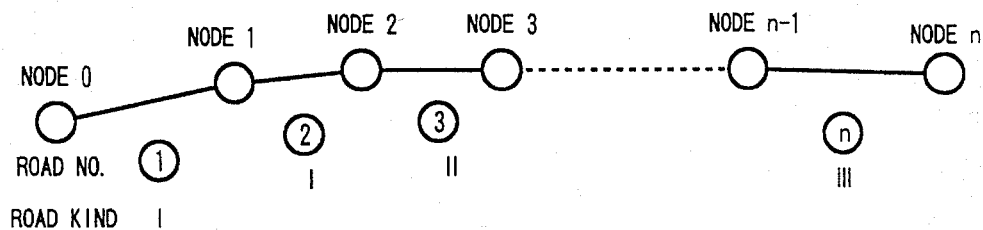
FIG. 30 is a diagram illustrating route design pursuant to a search.
FIG. 31 is a table of one example of set values for vehicle speed correlated with road type between the nodes of a designed route.
FIG. 32 is a table of set vehicle speed values correlated with road type stored independently of the map data for a designed route.

Here will be described the calculation of the running vehicle speed on the route. The route designed by the search is divided at nodes n from the starting point to the destination, as shown in FIG. 30, and has a data structure in which a change of the road No. type are made to correspond to a node. In case the running vehicle speed value is to be calculated, the node No., the road No., the road type and the set vehicle speed value, as shown in FIG. 31, are tabulated and stored in the storage means, and the set vehicle speed value corresponding to the road No. being virtually run is read. According to another method, as shown in FIG. 32, the designed route information may be utilized to store the road type and the vehicle speed value in the storage means, to read the vehicle speed value corresponding to the road type during the virtual run.

Figure 33:
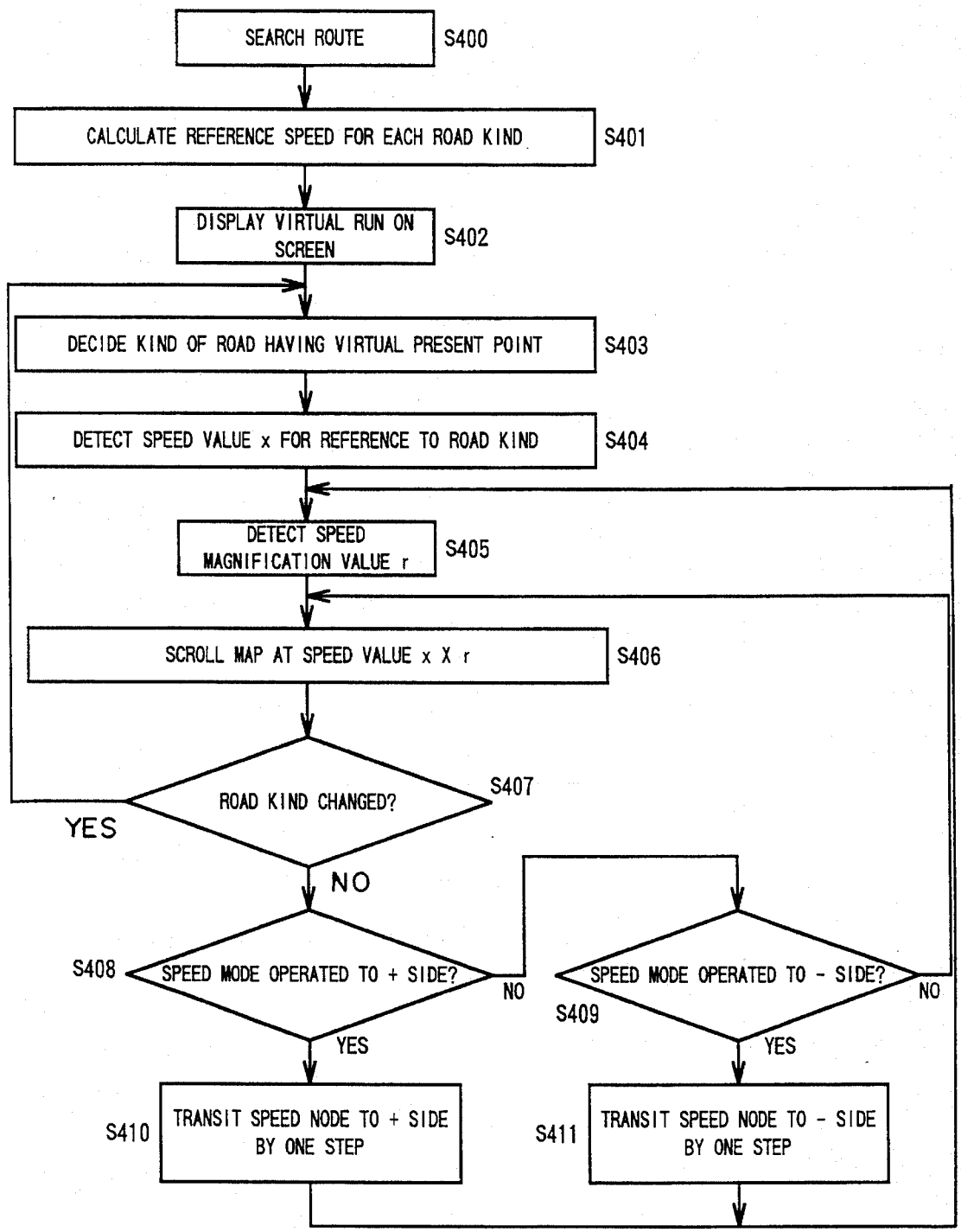
FIG. 33 is a flow chart of a subroutine for scroll control.

FIG. 33 shows a processing routine for the scroll control means. When the route search is ended (at S400), a reference speed for each road type is calculated at (S401), and a virtual run screen corresponding to the speed is displayed (at S402). The type of the road on which the virtual present position is located is decided (at S403), and the speed value x corresponding to the road type is detected from the decision result (at S404). A speed multiplication factor (magnification value) r is detected from the reduced scale of the map (at S405). Here, the "DETECTION" at Steps S404 and S405 reads the speed data obtained by the aforementioned calculation, as to the vehicle speed, and reads the stored data sin correlation with the reduced scale of the map selected and the speed range set by the speed control, as to the multiplication factor of the speed.

The map is scrolled at the product (x×r) of the detected speed value and the speed multiplication factor r. It is then decided (at S407) whether or not the type (or name) of the road being followed has changed. If this answer is YES, the routine is returned to Step S403, at which the type of the road having the virtual present position is decided. If the road type has not changed, it is decided (at S408) whether or the scroll speed control has been executed, that is, whether or not the speed mode has been operated to the "+" side. If this answer is NO, it is decided (at S409) whether or not the speed mode has been operated to the "−" side. If the speed mode has not been changed, the routine is returned to Step S406, at which the scrolling is continued at the speed value (x×r). If the speed mode is operated at Step S408 or S409, the scroll speed control is executed. Specifically, if the speed mode is operated to the "+" side, it is changed by one step to the "+" side, e.g., from LOW to MID (at S410). After this, it is decided (at S409) whether or not the speed mode is operated to the "−" side. If the speed mode is operated to the "−" side, moreover, it is changed by one step to the "−" side (at Step S411), and the routine is returned to Step S405, at which the speed multiplication factor 4 is detected.

Here will be described the speed magnifications for the individual reduced scales of the map. The present example will be described for three steps of speed magnification which can be set for each of reduced scales of the map. FIG. 29 presents an example of the speed multiplication factors in the scale reduction of the map. Here, the controller is equipped with a speed control key for changing the speed magnification. This speed control key is provided with a "+" button for changing the magnification to the "+" side and a "−" button for changing the magnification to the "−" side to shift the speed range by one step each time the "+" button or "−" button is operated, so that the speed range thus set is displayed on the scroll selecting screen.

Figure 28:
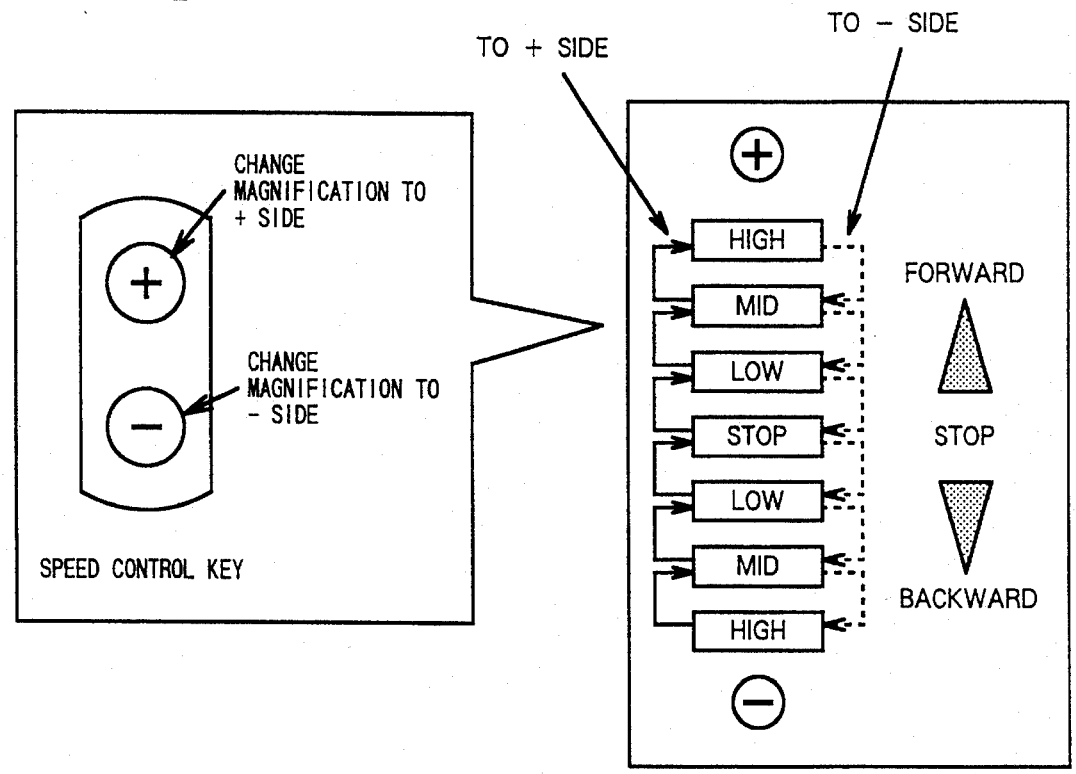
FIG. 28 shows a speed control display screen with a speed control key.

For setting a speed magnification, the "+" button of the speed control key, as shown in FIG. 28, is manipulated to switch the speed range, and the joy stick is brought down to the "+" side for forward running. In this case, in a map of the scale 1/10,000, the speed multiplication factor is set to a scale of 1 time in the Low range so that the distance of 100 Km is taken for an actual run of 1 hour at 100 Km/h. If the range is switched to the Mid range, the speed multiplication factor is increased to 1.5 so that the same distance as that of the Low range can be covered for 40 minutes by the virtual run. In the High range, moreover, the speed multiplication factor is increase to two so that the virtual run is executed at a speed twice as high as that of the Low range. As a result, the same distance can be covered within one half hour by the virtual run.

By thus setting the speed multiplication factors by the scale reductions of the map, the running time period can be shortened for the virtual run in accordance with the map scale reductions. In short, for constant scrolling of the map, the speed of the virtual run can be changed according to the map reduction ratio by changing the map scale. When the route information for each necessary point is to be roughly confirmed, the wide map screen is displayed for the virtual run. If the wide map has a scale reduction of 1/640,000, the virtual run can be achieved at eight times in the Low range, at sixteen times in the Mid range and thirty two times in the High range, as compared to the low range (of one time) for a map of 1/10,000.

The present invention can improve the operability of course design and confirmation by lowering the speed magnification, for the detailed course design and confirmation, to effect the virtual run at a relatively low speed and by raising the speed magnification, for the area requiring no course confirmation or the area such as a detour requiring no course design change, to accelerate the speed. In short, when the detailed map is selected, it is expected that the user intends to observe the vicinity of the virtual present location in detail. Thus, the speed multiplication factor for the detailed map is set to a low value so that a virtual run at a low magnification may be started simultaneously with the change in the scale reduction. In case the wide map is selected, on the other hand, it is expected that the user intends a cursory observation of the route (or to pass without any observation). Thus, the speed multiplication factor for the wide area is set to a high value so that a virtual run with a high magnification may be started simultaneously with the change in the scale reduction.

Figure 34:
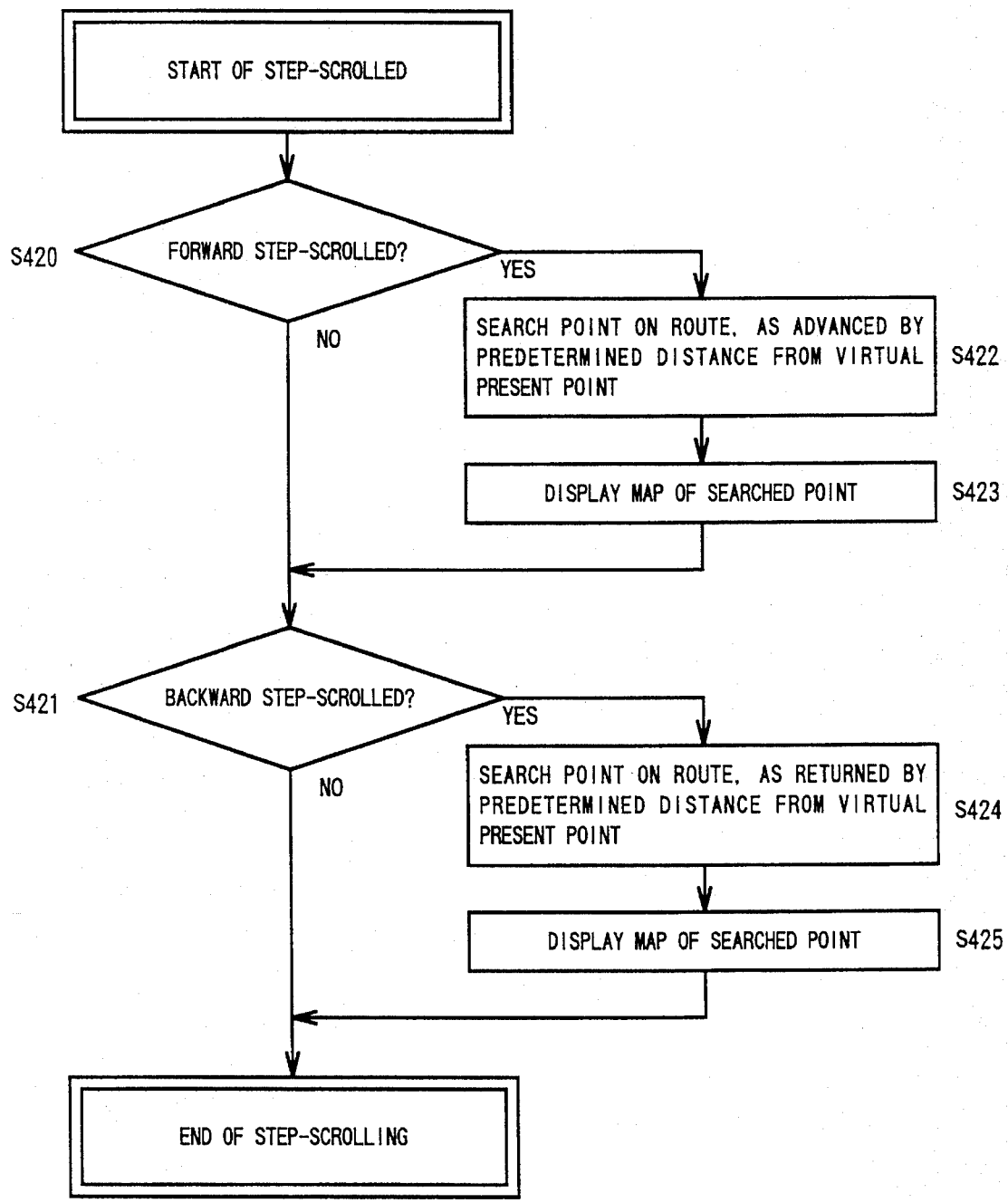
FIG. 34 is a flow chart of a subroutine for step-scrolling, started by operating a step-scrolling key or the like arranged on a controller.

Here will be described step-scroll control in which the route is divided for the virtual run so that given units may be skipped. FIG. 34 shows a step-scrolling routine for a controller equipped with a step-scrolling key or the like for starting the step-scrolling. Here will be described the case of stepping at a predetermined distance.

When the step-scrolling is started, it is decided (at S420) whether or not the step-scrolling has been executed forward. If this answer is NO, it is decided (at S421) whether or not the step-controlling has been executed backward. If neither forward nor reverse scrolling has been executed, the step-scrolling is ended. If it is decided at Step S420 that the forward step-scrolling has been executed, a search is executed (at S422) to locate a point on the route representing advance of a predetermined distance from the virtual present location. The map of the searched point is displayed (at S423). If backward step-scrolling has been executed, on the other hand, operations similar to the aforementioned are executed (at S424 and S425).

According to the present invention, the route design and confirmation can be improved by step-scrolling through an area between the points which is geographically well known, such as the vicinity of the starting point or an area requiring no detailed route examination, at intersections or at intervals of a predetermined distance.

Figure 35:
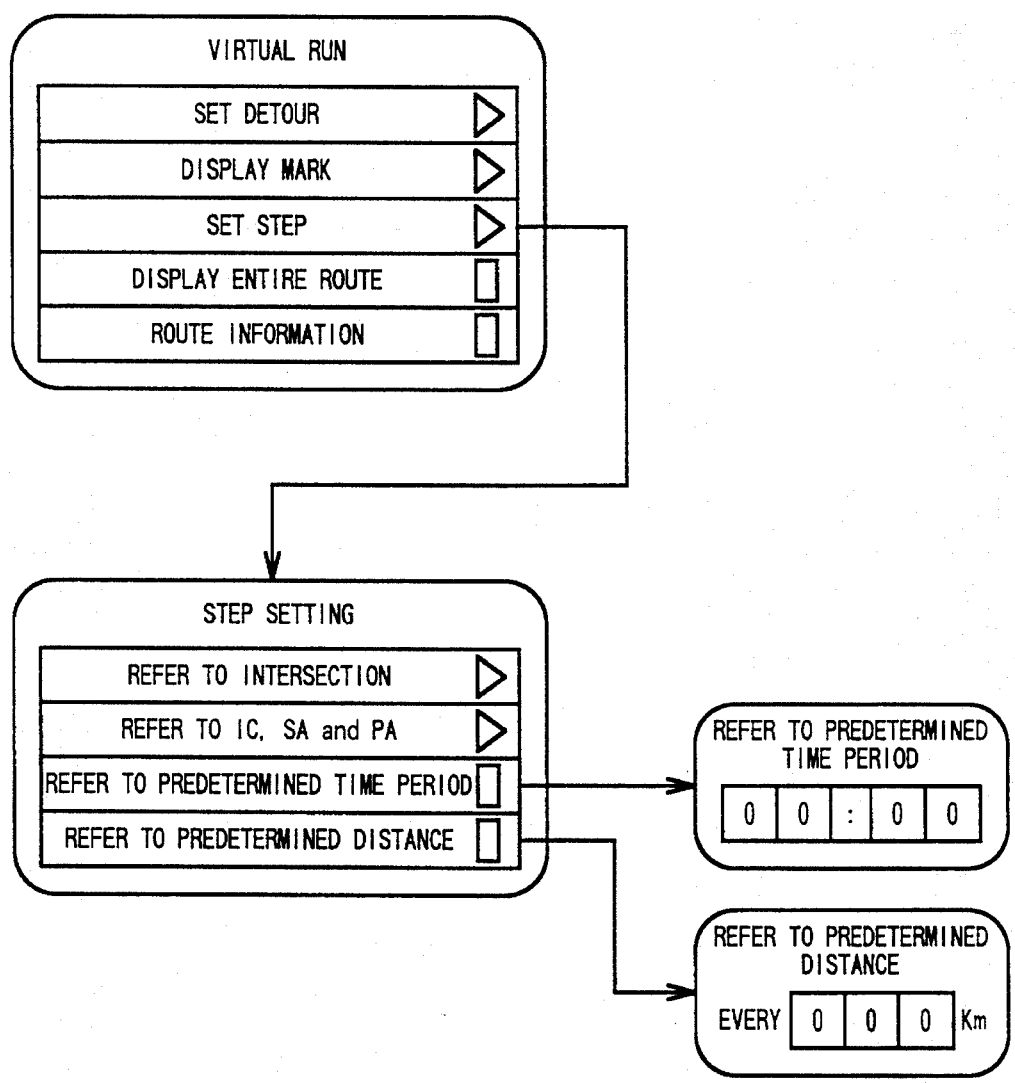
FIG. 35 shows a progression of display screens utilized in setting step scrolling.
Figure 36:
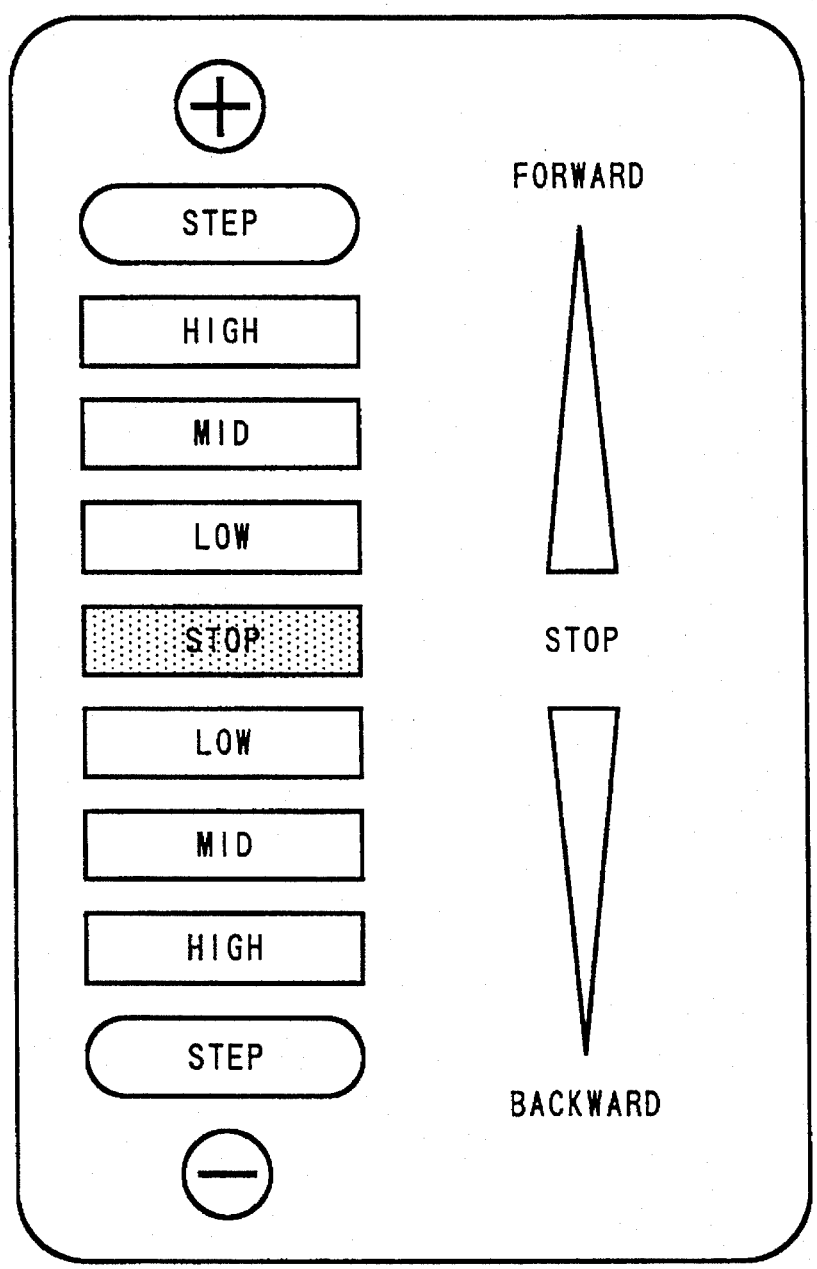
FIG. 36 shows one example of a menu display screen for selecting step scrolling and for speed control.

FIG. 35 shows on example of the step-scrolling setting operation by the menu and the joy stick. In the virtual run screen, displays the sub-menu, from which the "SET STEP" key is selected. Then, the step setting window is displayed to select a step-scrolling reference. In the present example, the selected step can be (1) an intersection, (2) an interchange (IC), a service area (SA) or a parking area (PA), (3) a predetermined time period or (4) a predetermined distance. In case of step-scroll at each predetermined point such as an intersection, interchange, service area or parking area being selected, the nodes ahead of the specified point are searched to display the map of the searched point. If the predetermined time period or the predetermined distance is selected, a window is displayed for inputting those values. FIG. 36 shows one example of the step-scrolling, in which the speed control to be displayed on the screen in the speed control has "STEP" keys for selecting the step-scroll. When this "STEP" key is selected, STEP-SCROLLING" is started in which the virtual present location is moved at the end of each predetermined time period in accordance with the reference set in the menu.

Figure 37:
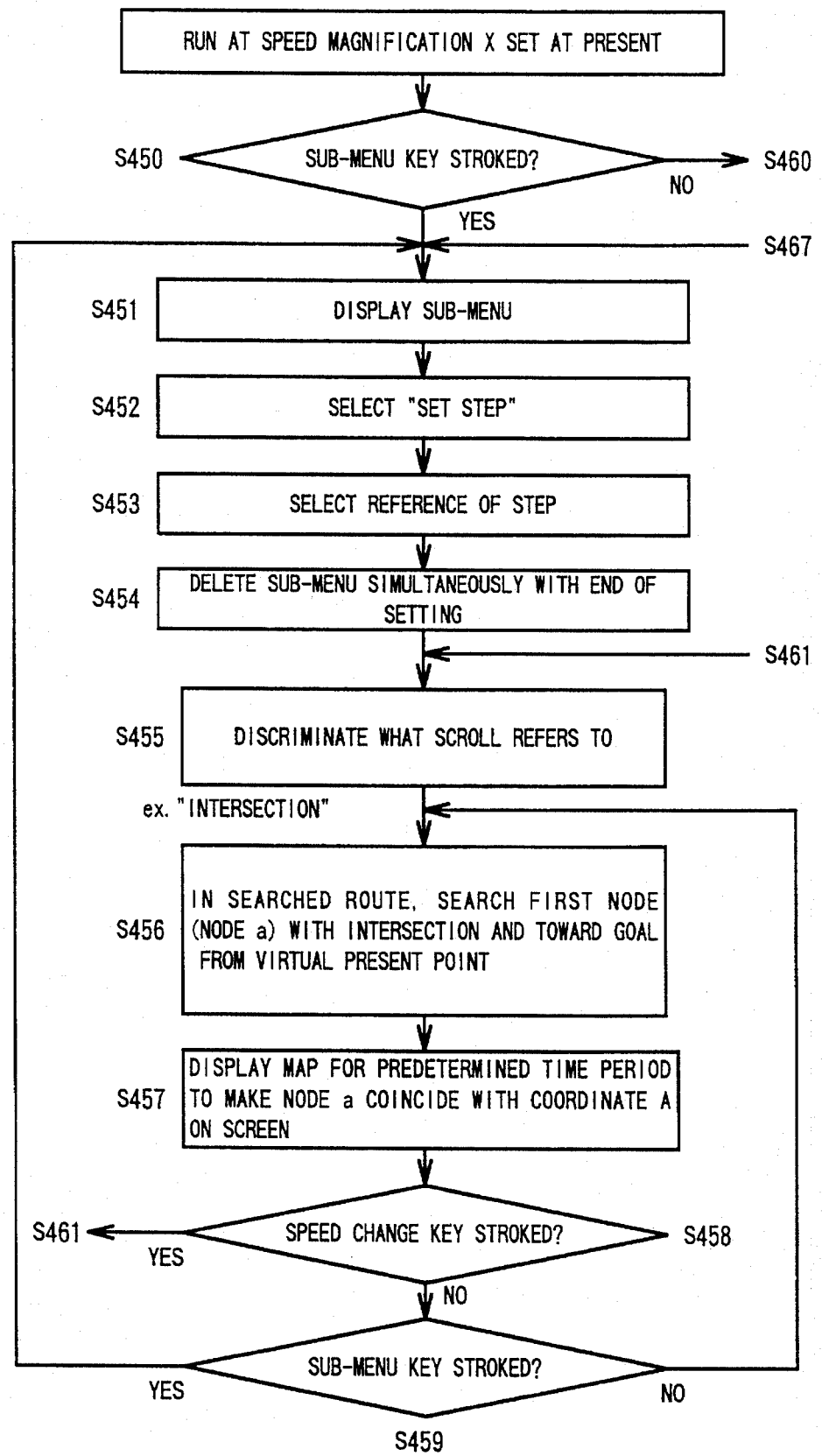
FIG. 37 is a flow chart of the step-scrolling subroutine started by selection from the menu shown in FIG. 35.
Figure 38:
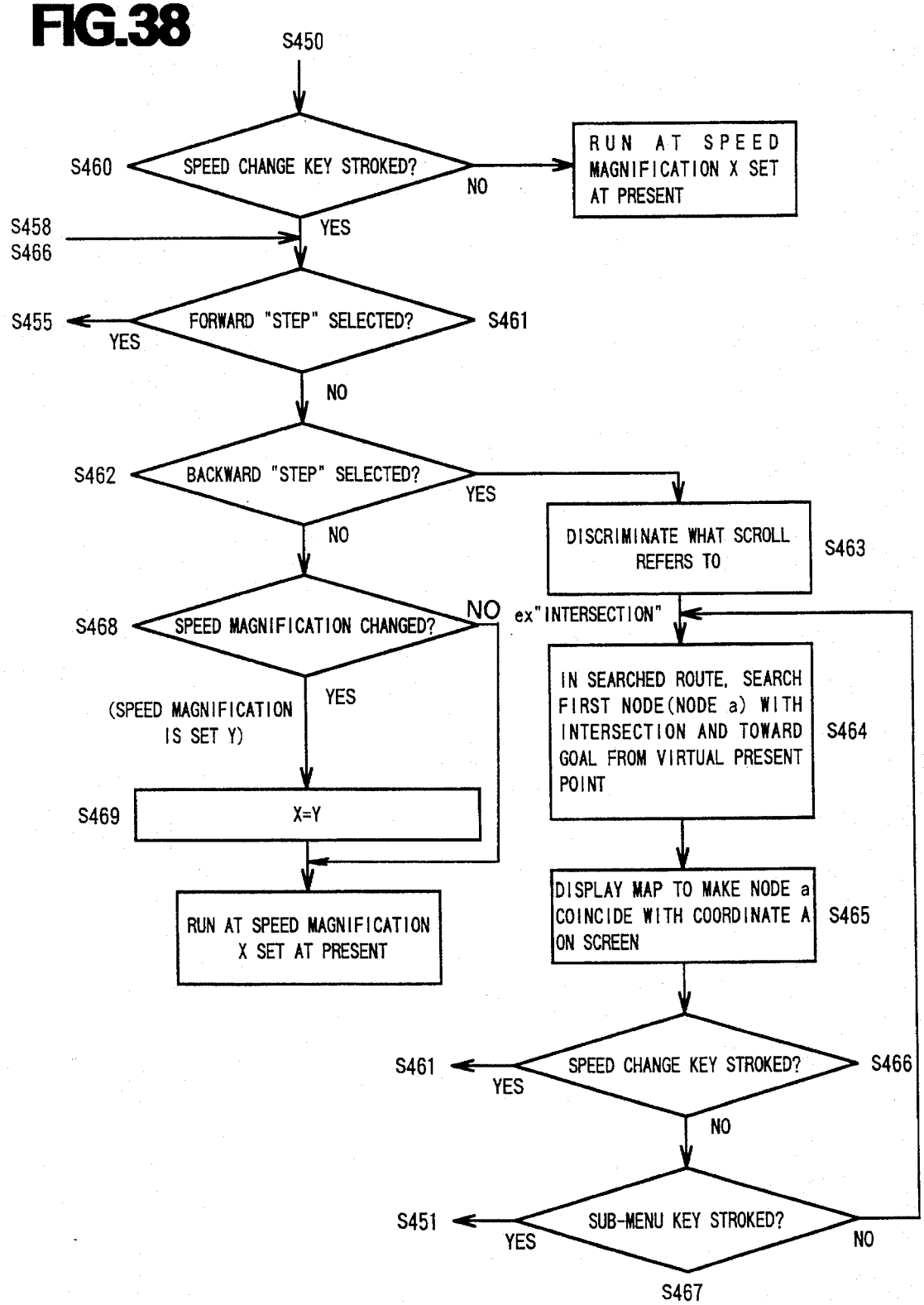
FIG. 38 is a continuation of the flow chart of FIG. 37.

FIGS. 37 and 38 show a routine for step-scrolling utilizing the menu and the joy stick. During the virtual run at a speed magnification x, it is decided (at S450) whether or not a selection has been made from the sub-menu. If this answer is YES, a sub-menu, as shown in FIG. 35, is displayed (at S450). The "SET STEP" key is selected (at S452) from that sub-menu, and the step-scrolling reference is set (at S453). Simultaneously as the selected reference is set up, the sub-menu is deleted (at S454). Then, (at S455) the scrolling reference set by the "SET STEP" key is determined. In the route obtained by the search, the set reference point such as the first node or intersection is searched on the side toward the destination from the virtual present location and is designated "node a" (at S456). The map is displayed for a predetermined time to make the node a coincide with the coordinates A on the screen (at S457).

It is decided (at S458) whether or not the speed change key has been operated, and it is otherwise decided (at S459) whether or not the sub-menu key has been operated. If neither key has been operated, the routine is returned to Step S456, at which the next reference is prepared. If the sub-menu key is operated, the routine is returned to Step S451, at which the selection is made from the sub-menu.

If it is decided at Step S450 of FIG. 37 that the operation of the sub-menu key has not been executed, the routine advances to the routine of FIG. 38. Specifically, if the sub-menu key is not operated, it is decided (at S460) whether or not the speed change key has been operated. If neither key has been operated, the run is continued at the speed magnification set at present. If the speed change key has been operated, the step selection and its direction are decided (at S461). If the forward step has been selected, the scroll reference is determined at Step S455 of FIG. 37 so that the step processing is executed from the result of decision. If the backward step has been selected, on the other hand, operations similar to those of Steps S455 to S457 are executed (at S463 to 467).

When the speed change key is depressed, the routine is returned to Step S461. If no scroll in either direction is selected, it is decided whether or not the speed magnification has been changed. Without any change, the run is continued at the speed magnification x set at present. If the speed magnification is changed to "y", on the other hand, a relationship of x=y is set (at S469) to execute the virtual run with the speed magnification y.

Here will be described the operations for processing the distance, the speed and the required travel time period with reference to FIG. 39 which shows a routine processing the distance, the speed and the required travel time. The present invention can provide a virtual run by scrolling the display screen along the designed route and calculates and displays the desired time period for two points inputted.

Figure 39:
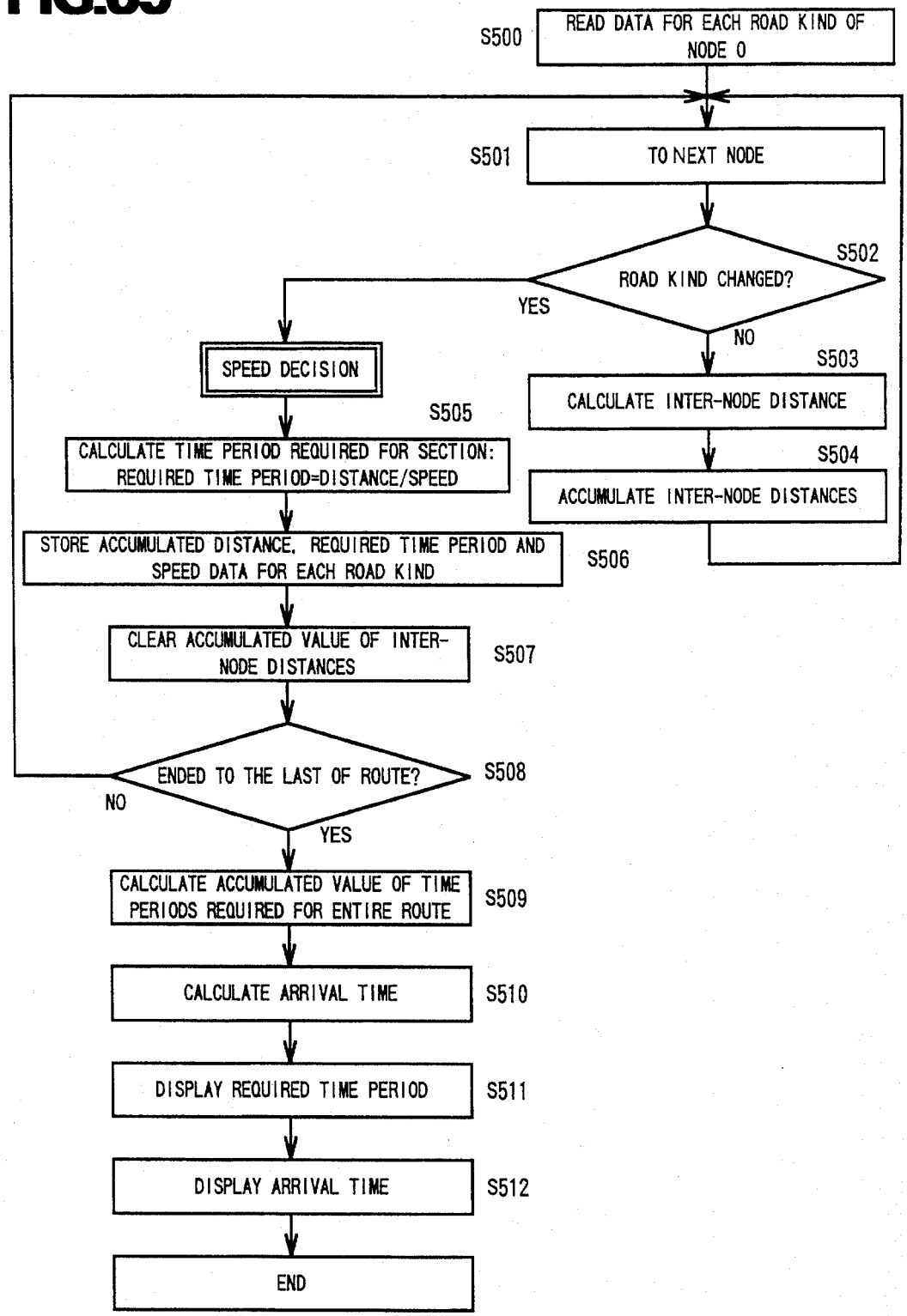
FIG. 39 is a flow chart for display of distance, speed and a required travel time.
Figure 40:
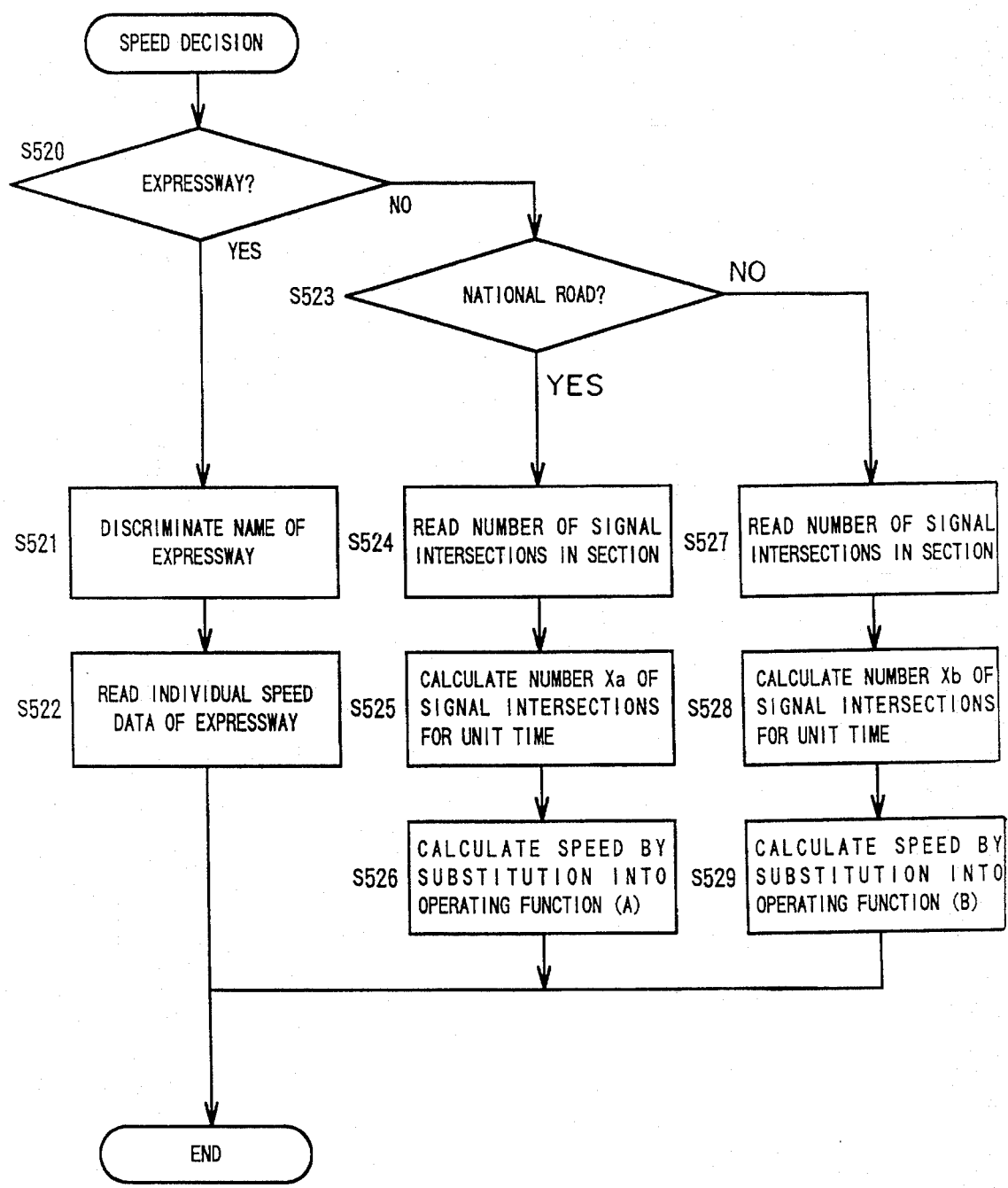
FIG. 40 is a flow chart of a speed setting subroutine.

In FIG. 39, when the virtual run is started, the road type data of node 0 is read (at S500), and the road type data of next node is read (at S501). It is then decided (at S502) from the road type data of the individual nodes whether or not the road type has been changed. If these answers are NO, the distance between the nodes on that road is calculated (at S503), and the calculated values are accumulated (at S504). By repeating these Steps S501 to S504, the sum of the distances over the same road type is calculated. If the road type has changed at a certain node, the speed deciding routine shown in FIG. 40 is started to calculate the speed of the road type at that section. When the speed decision is completed, the time period (distance/speed) for travel of that section is calculated (at S505) on the basis of the calculated speed. After the total distance, the required travel time period and the speed data have been stored for each road type (at S506), the total distance value between the nodes is cleared (at S507). It is then decided (at S508) whether or not a series of those operations have completed. If this answer is NO, the routine is returned to Step S501, at which the data of the subsequent node is processed. When all the operations between the individual nodes on the route are completed, the total distance value (at S509) and the arrival time (at S510) of all the routes are individually calculated the result displayed (at S512).

Here will be described a specific example for deciding the speeds to be assigned to the aforementioned classifications. In this specific example, an average vehicle speed is set for each expressway. For national roads (having different route Nos.), on the other hand, the speed is calculated from a formula (A) wherein a variable Xa represents the number of signal intersections within a predetermined distance. For other general roads, on the other hand, the speed is calculated from a formula (B) wherein a variable Xb represents the number of signal intersections within a predetermined distance:

$f(Xa)=AXa+B;$  Speed Calculating Formula (A)

and $f(Xb)=CXb+D$  Speed Calculating Formula (B).

Figure 41A:
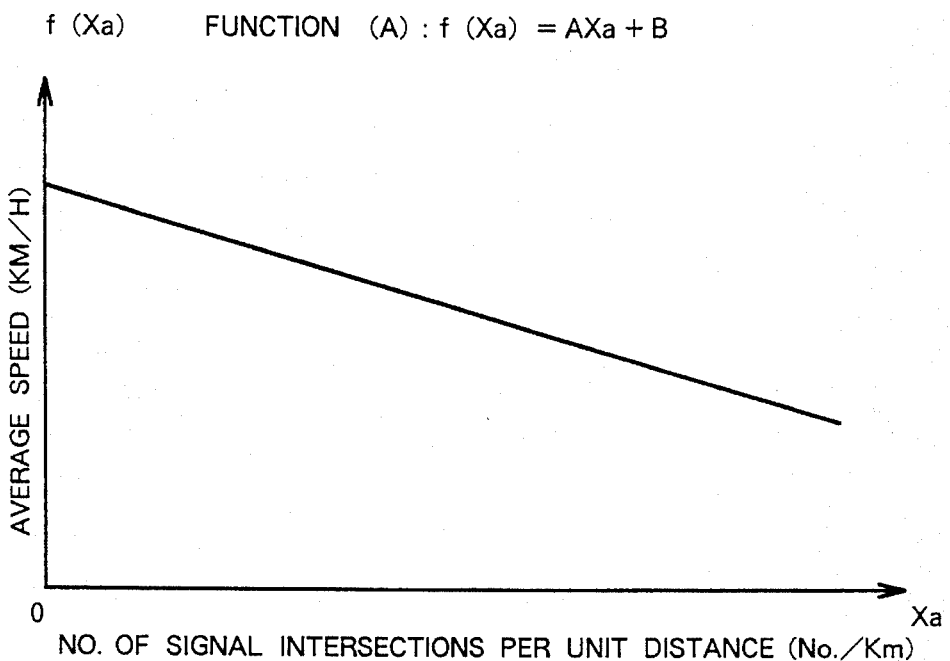
FIGS. 41a and 41b are exemplary graphs showing the relationship between average speeds according to functions (A) and (B) and the number of signal intersections per unit distance.
Figure 41B:
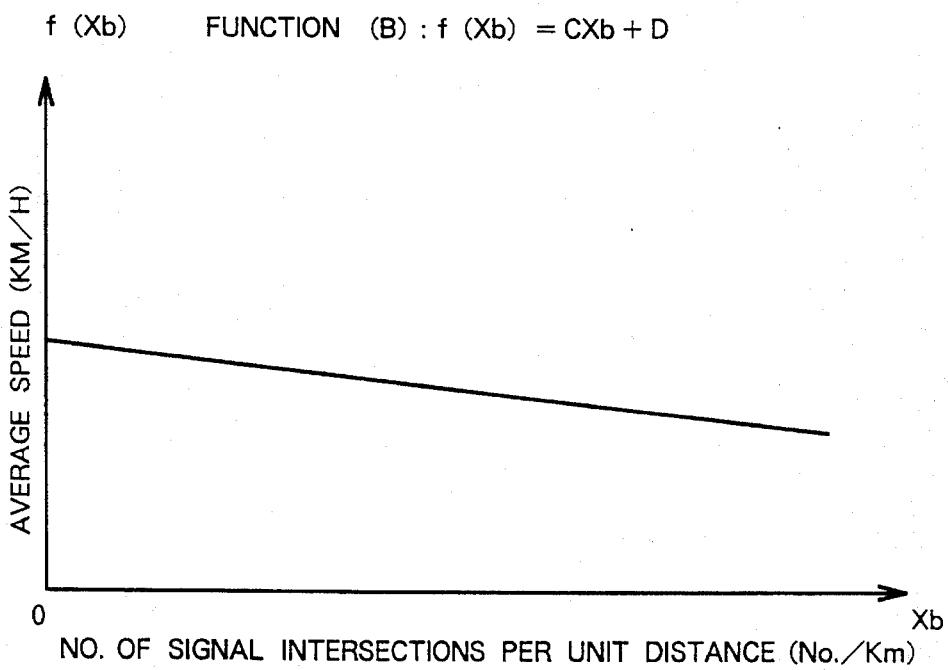

Incidentally, these formulas have their constants set according to various conditions such as the number of lanes or the day of the week. FIGS. 41a and 41b presents relationships, based on the formulas (A) and (B), between the average speed and the number of the signal intersections per unit distance.

FIG. 40 shows one example of the speed deciding method. The road type, if changed, is decided (at S520), and, if changed, this routine is ended by determining the name of an expressway (at S521) and by reading the individual speed data for the expressway (at S522). If the road is not an expressway, it is decided (at S523) whether or not the road is a national road. If this answer is YES, the number of signal intersections in the section is read (at S524), and the number Xa of signal intersections per unit distance within that section is calculated (at S525) and is substituted into the speed calculating formula (A) to calculate the speed (at S526).

In the case of a road other than an expressway or a national road, the road is subjected to operations similar to those for the national road. Specifically, the number of signal intersections within the section is read (at S527), and the number Xb of signal intersections per unit distance within that section is calculated (at S528) and is substituted into the speed calculating formula (B) to calculate the speed (at S529).

According to the method described above, the travel time required for the actual run can be accurately estimated to provide a reference for selecting whether a route giving priority toll roads or a route giving priority to general roads is to be used. Moreover, the desired travel time can be more accurately calculated by changing the vehicle speed data of each for the aforementioned expressways and the individual coefficients A, B, C and D in the formulas (A) and (B) on the basis of the various conditions such as the number of lanes, the day of the week, the time zone and the amount of business traffic.

The average vehicle speed data for each of the aforementioned road types may be set in advance as a table, as shown in FIG. 42. Moreover, the table shown in FIG. 43 may include conditions such as the number of lanes and the day of the week. In addition, the aforementioned two means can be suitably combined to calculate the average speed.

Figure 43:
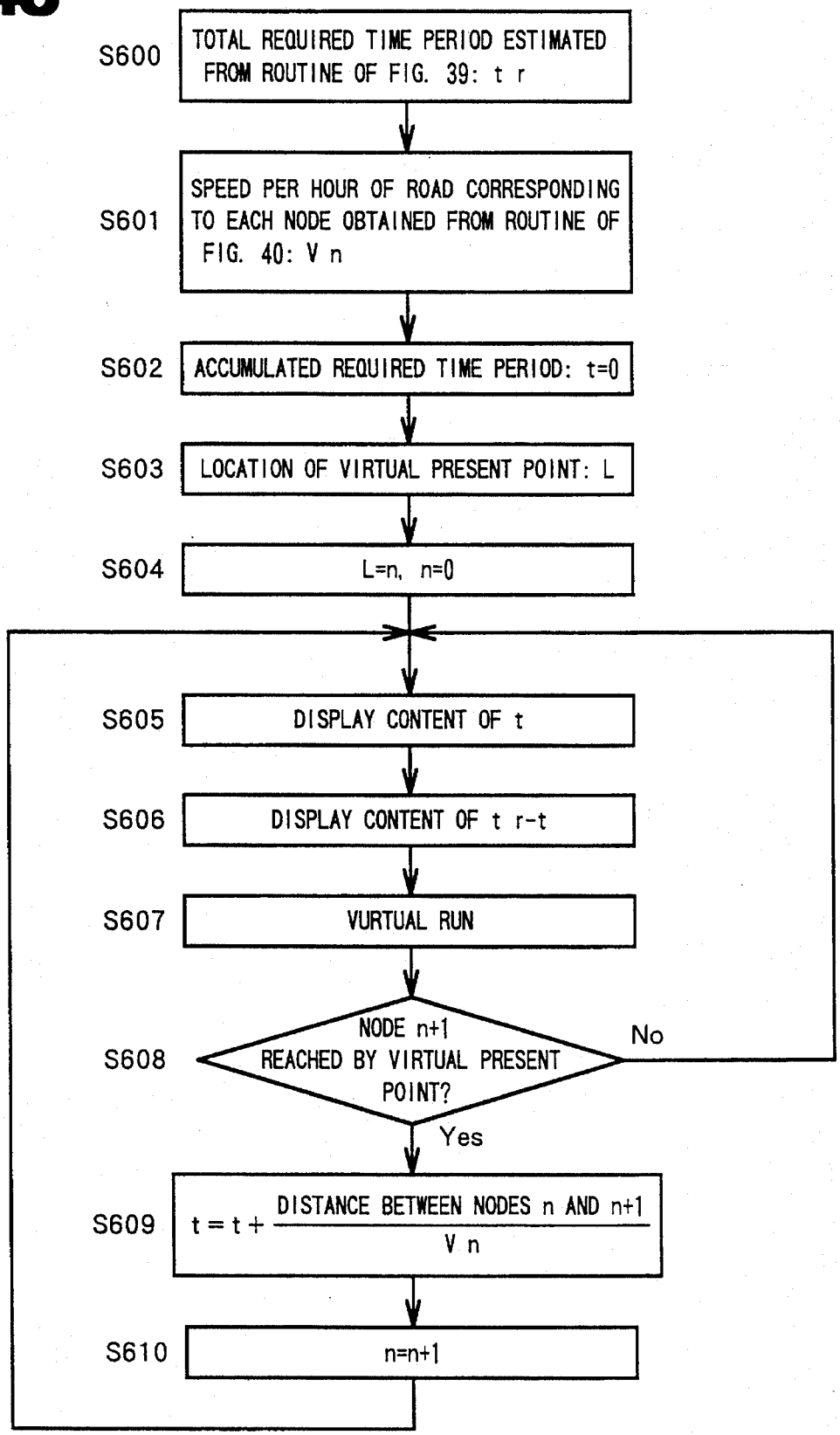
FIG. 43 is a flow chart of a subroutine for display of elapsed time.

FIG. 43 shows an elapsed time displaying routine. The function is to determine and display the elapsed time from the time of transit from the starting point to the present location in a virtual run executed by scrolling the map with the vehicle position being fixed on the map display screen.

Before the start of the virtual run, the total required time period tr (i.e., the time period required for travel of the entire route) estimated by the routine of FIG. 39 and the speed Vn per hour for the road type of each node section are set (at S600 and S601), and the accumulated required time period is set as t=0 (at S602). The location of the virtual present location is defined as L and is set as L=node n, and the starting point (of node 0) is set as n=0 (at S604). The elapsed time t from the starting point and the remaining time period tr−t required to reach the destination are individually displayed (at S605 and S606), to start the virtual run (at S607).

It is decided (at S608) whether or not the virtual present location has reached the node n+1. If this answer is NO, the same elapsed travel time and remaining time are continuously displayed. In short, the display is not changed until reaching the next node. When this next node is reached, the elapsed time period t is calculated by the following Equation (at S609):

$t=t+$(distance between nodes $n$ and $n+1$)$/Vn$.

Then, the increment of n=n+1 is set (at S610). The routine is returned to Step S605 to display the new elapsed travel time t and the remaining travel time tr−t. In this virtual run, the nodes will change at Step S610 as node 0→node 1→node 2→. . . →node n so that the values of t and tr−t are accordingly changed on the display.

The routine of FIG. 43 advances to Step S609 only when the virtual present location crosses over a node. However, because the route on the map is composed of those individual nodes and the lines joining the nodes, the virtual present location may appear, not at a node, but on a line between nodes. In this case, too, a more current time can be displayed by calculating the required time period by an interpolation of L between the node n and n+1 at Step S608.

Figure 44:
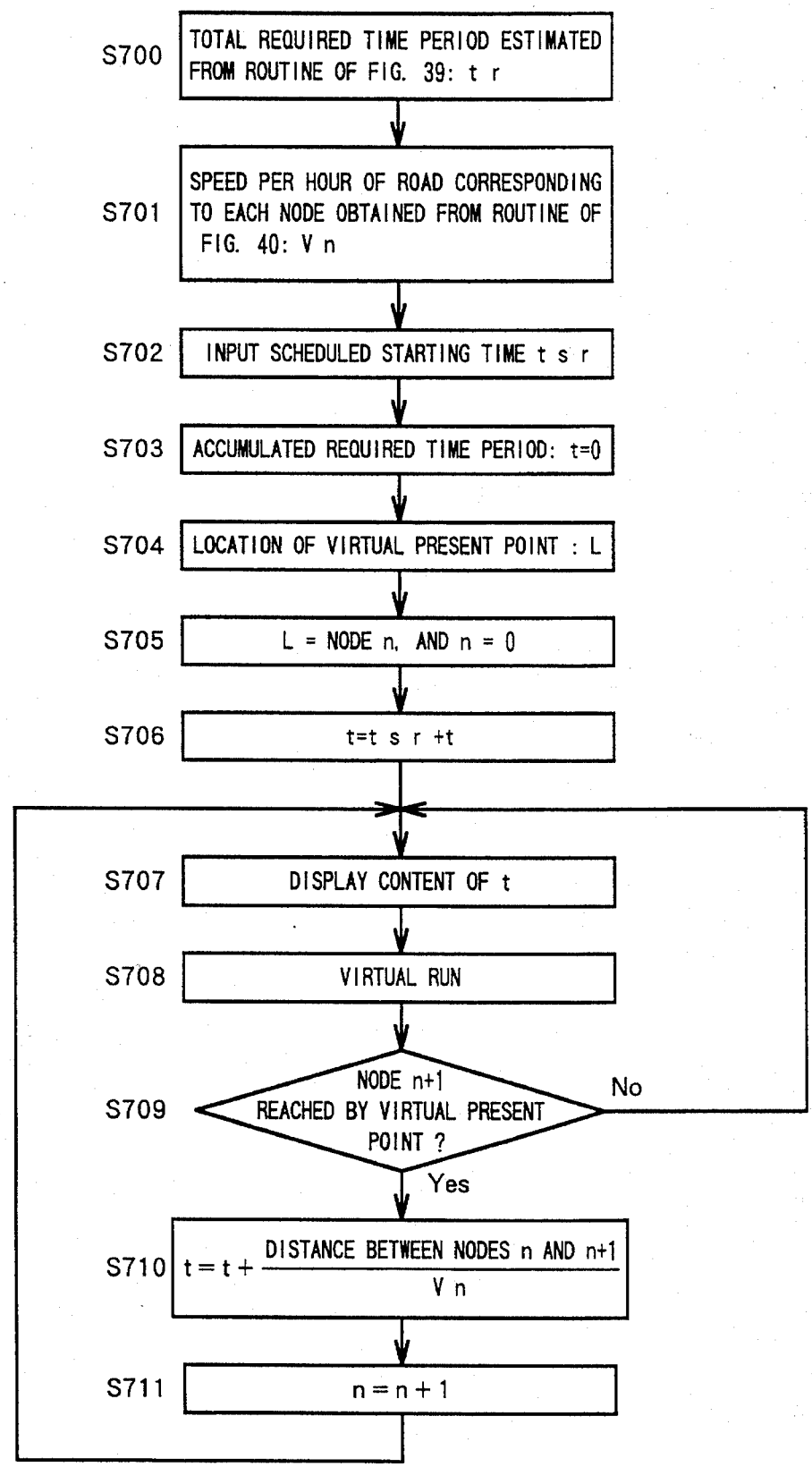
FIG. 44 is a flow chart of a subroutine for display of time elapsed in reaching a present position in a virtual run.

FIG. 44 shows a routine for displaying time at a virtual present location. The function is to display the elapsed time for travel calculated on the basis of the starting time by determining the required time period from the starting point to the vehicle location on the route when a virtual run is executed by scrolling the map with the vehicle position being fixed on the map display screen.

First, at Steps S700 and S701, the total required time period tr estimated by the routine of FIG. 39 and the speed Vn per hour of each road corresponding to a node section are set, and a scheduled starting time tsr at the starting point is input (at S702). Then, the accumulated required time period t=0 and the location L of the virtual present location are set (at S703 and S704) to determine the distance (L=node n, n=0) to the virtual present location and the virtual time (t=tsr+t) at that point (at S705 and S706). The content of the virtual time t determined is displayed (at S707) to continue the virtual run (at S708). It is then decided (at S709) whether or not the virtual present location has reached the node n+1. If the virtual present location is midway between the node n and the node n+1, the routine is returned to Step S707, at which the previous time is displayed. If the node n+1 is reached, the time is updated (at S710) by the following Equation:

$$t=t+(\text{distance between nodes } n \text{ and } n+1)/Vn.$$

Then, the node is updated to the next node (i.e., n=n+1), and the routine is returned to Step S707, at which the time t determined at Step S710 is displayed.

When the present system is installed for use on the vehicle after a schedule has been made at home, the route of the past actual run, and the day and time of the run, and the required time period are stored in the memory means on the basis of the scheduled route planed in advance, so that the file can be called up and displayed for each destination. As a result, the comparison between the required time period calculated by the system and the time period actually required in the past can be made to help plan the next trip over that route. Moreover, the day and time and the required time period of the past run are stored as data so that the past average value can be calculated to deduce the required time period.

Figure 45:
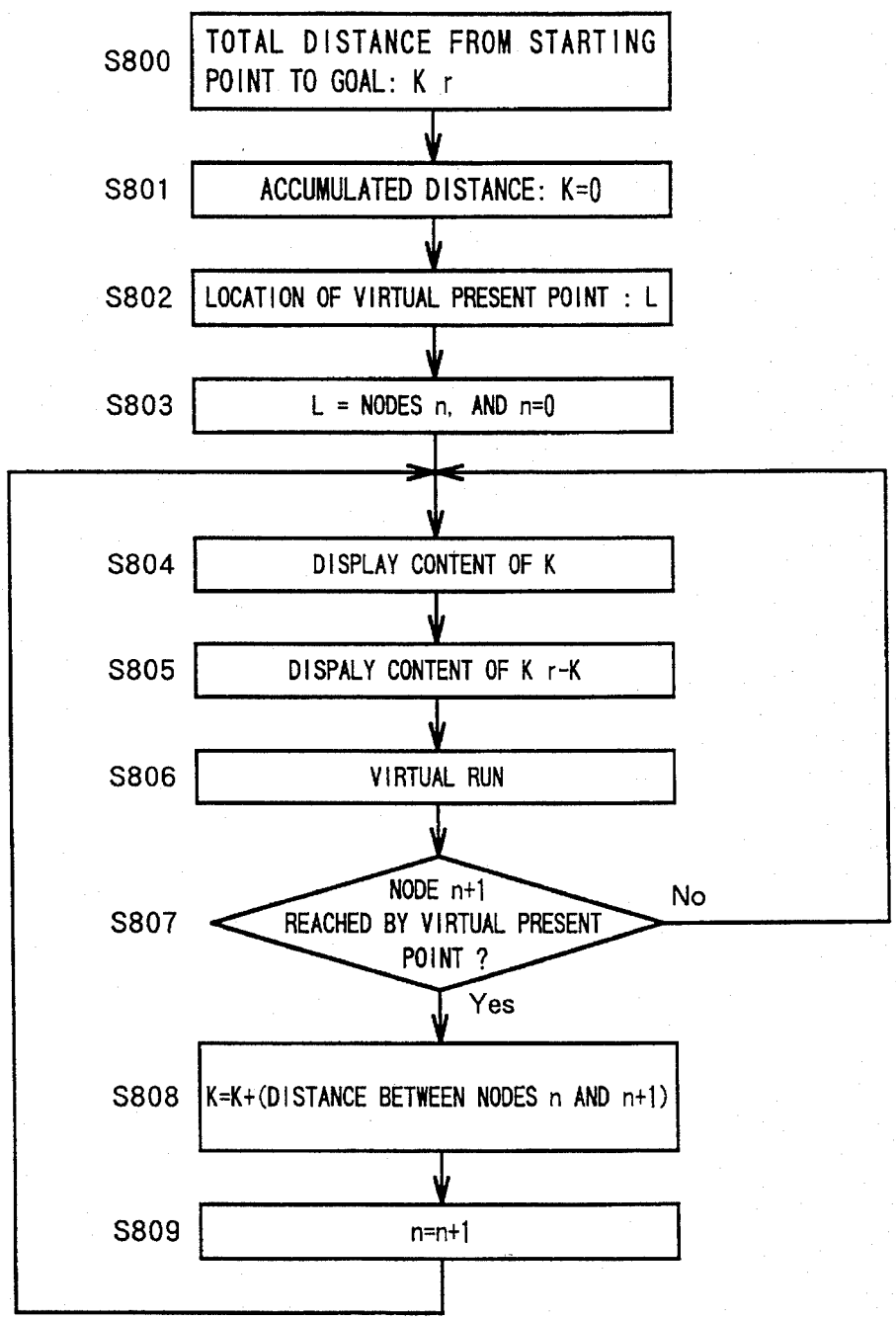
FIG. 45 is a flow chart of a subroutine for display of running distance and remaining distance.

FIG. 45 shows a routine for display of covered distance and remaining distance. The present function is to display the covered distance from the starting point to the virtual vehicle position on the route and the remaining distance from the virtual vehicle position to the destination when the virtual run is executed by scrolling the map with the vehicle position being fixed on the map display screen.

In FIG. 45, the total distance Kr from the starting point to the destination, the accumulated distance K=0 and the location L of the virtual present position are set (at S800, S801 and S802). Then, the inter-node accumulated distance obtained by the operations of FIG. 38, that is, the distance K covered from the starting point is displayed (at S804), and the remaining distance (Kr−K), i.e., the difference between the total distance and the covered distance, is determined and displayed (at S805) to continue the virtual run (at S806). It is then decided (at S807) whether or not the virtual present location has reached the node n+1. If this answer is NO, the routine is returned to Step S804, so that information including the covered distance and the remaining distance is continuously displayed.

When the virtual present location reaches the node n+1, the covered distance K is determined by the following Equation (at S808):

$$K=K+(\text{distance between the nodes } n \text{ and } n+1).$$

Then, the node is updated (n=n+1) (at S809), and the routine is returned to Step S804, at which the covered distance and the remaining distance are updated.

The present invention also allows for the following modifications:

(1) In the foregoing embodiment, the means for setting the route between two set points allows the route between the two points to be searched by the system so that the virtual running function may be realized along the designed route. However, the setting of the route between the two points could be determined by designating the points or roads in advance by the user. Moreover, the route can be determined by following the road as displayed on the displayed map screen.

(2) The foregoing embodiment has been described as scrolling the virtual run screen downward from the top, but can be modified to scroll the same upward from the bottom. Moreover, an inverting function can be added to switch the scrolling direction from the downward direction to the upward direction so that the scrolling directions may be switched at the option of the user.

(3) The foregoing embodiment has been described as a map display device which can be utilized as a navigation system, but the present invention can also be embodied as a system operable only in the virtual run mode by separating out the navigation function. In this modification, the route information designed by the map display means is stored in a memory medium such as an IC card or a floppy disk which may be read by a navigation system installed on a vehicle and thereby used for route guidance.

(4) The present invention can also be used to allow the user to take a simulated journey on the home TV set, by combining it with picture data for generating a computer graphic screen or a photograph.

Here will be described an embodiment of the navigation system in which a detour point is set for a set route to thereby determine a route passing the detour point on the set route and returning to the set original route from the detour point.

Figure 46:
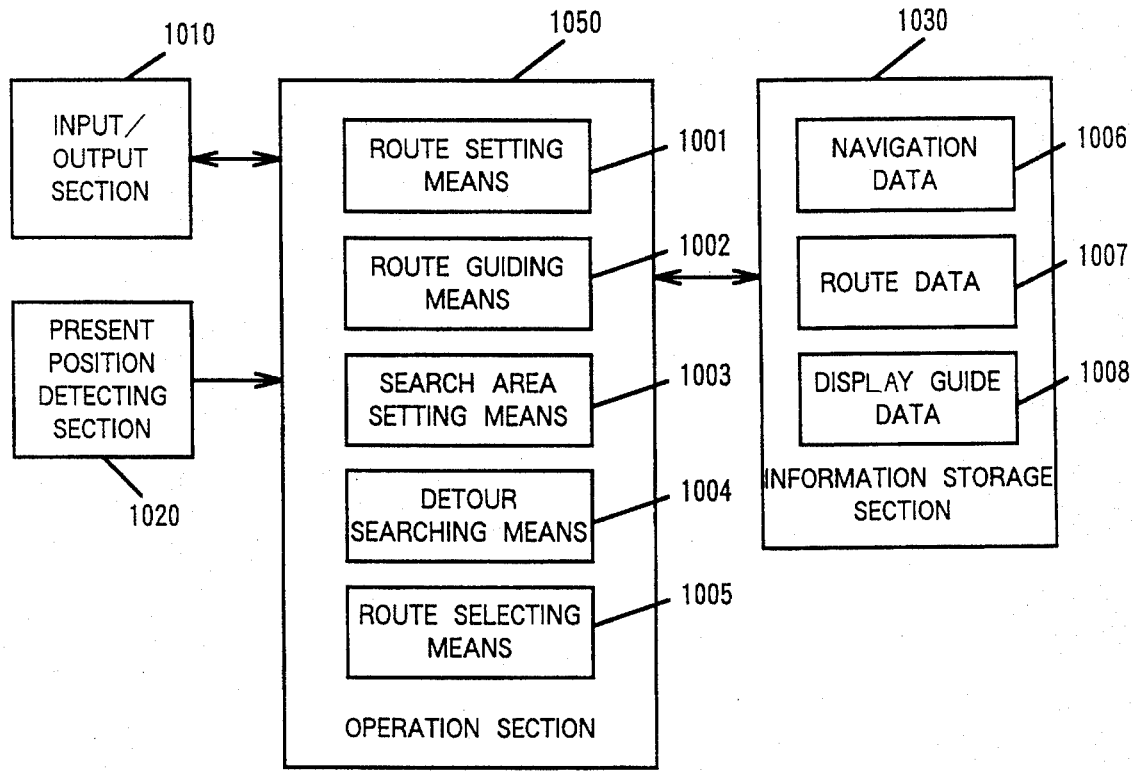
FIG. 46 is a block diagram of one embodiment of a navigation system to which is applied the map display system of the present invention.
Figure 47:
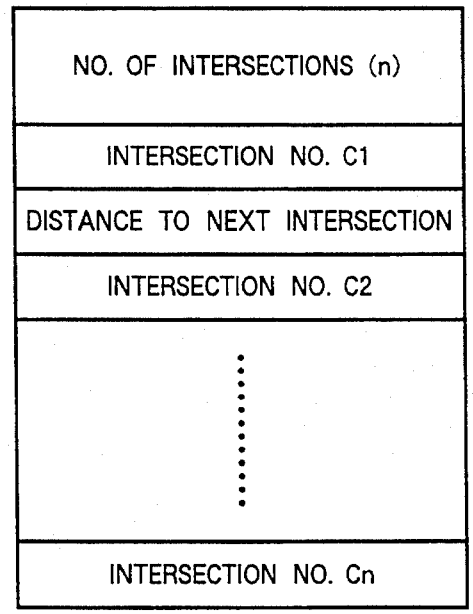
FIG. 47 is a diagram showing one example of organization of the route data stored with the information relating to an intersection array for a designed route.
Figure 48:
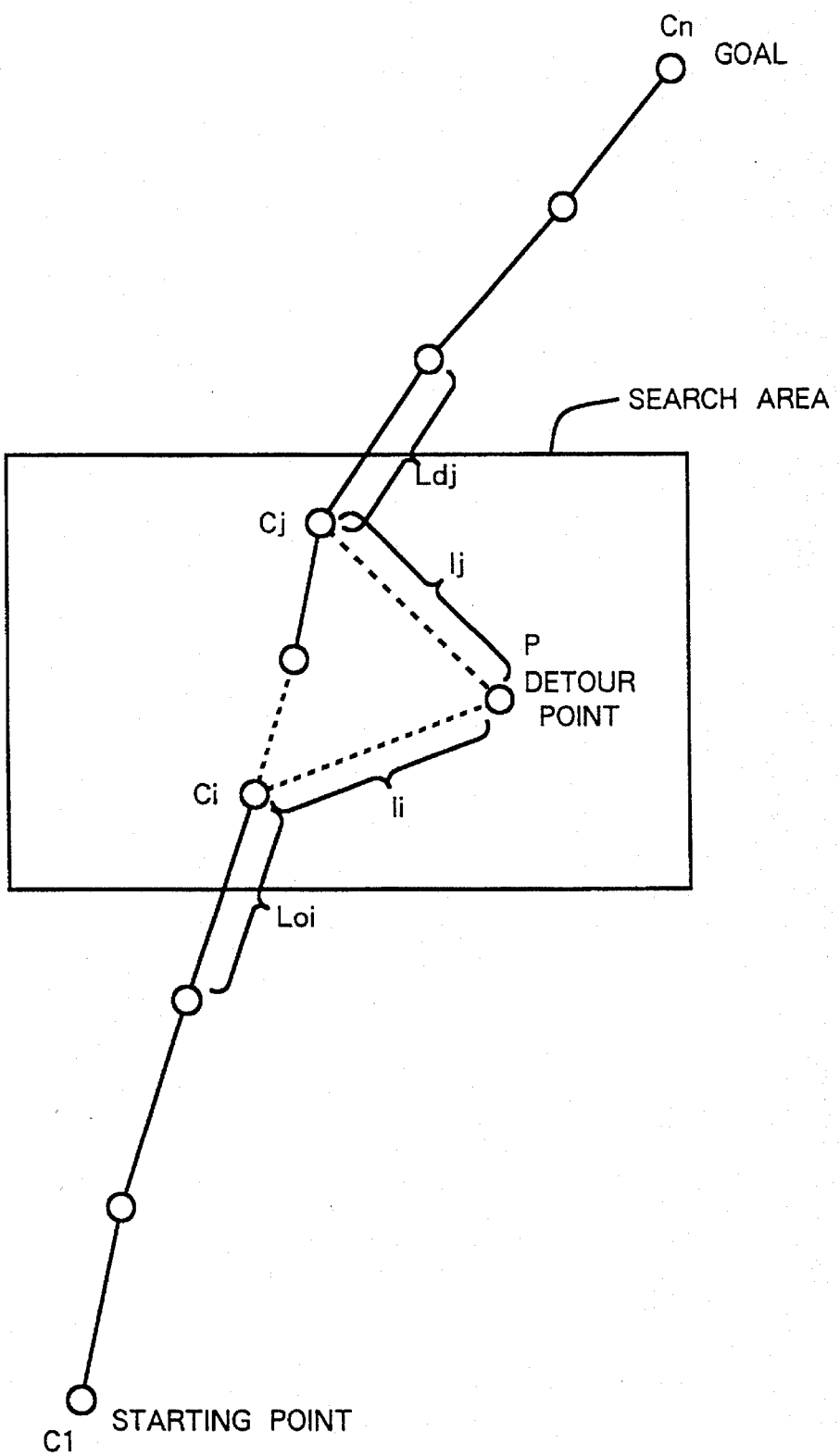
FIG. 48 is a diagram showing an example of a search area for setting a detour in the designed route.

In FIG. 46, an input/output section 1010 is equipped with a display, a speaker, a touch panel and a button switch for inputting/outputting route guidance information. A present position detecting section 1020 detects the present position of the user's vehicle by using various sensors and the GPS receiver. An information storage section 1030 stores navigation data 1006 including the map data necessary for calculating the route, calculated route data 1007 and display guide data 1008 necessary for the guidance. An operation section 1050 includes route setting means 1001, route guiding means 1002, search area setting means 1003, detour searching means 1004 and route selecting means 1005, and executes a route setting operation, a display guiding operation for route guidance and controls the entire system. By inputting the present location or the staring point and the destination from the touch panel or the button switch of the input/output section 1010, moreover, the route is set by the route setting means 1001 of the operation section 1050 to produce the route data 1007, and the route guidance is given by the display or speaker of the input/output section 1010 with display of the route by the route guide means 1002. The route data 1007 obtained by setting the route is stored and includes data for the number of intersections between the starting point and the destination, the identifying Nos. of the individual intersections, and an intersection array for the route, for example, as shown in FIG. 47. The navigation system of the present embodiment allows changing of the first-set route by designating a detour point P, as shown in FIG. 48, for the first-set route. For this operation, there are provided the search area setting means, the detour searching means 1004 and the route selecting means 1005. The search area setting means 1003 sets the search area from the detour point P, as shown in FIG. 48, when the detour point P is designated by the input/output section 1010; the detour searching means 1004 executes the route search to the detour point for each of intersections Ci to Cj in the search area set by the search area setting means 1003; and the route selecting means 1005 selects that route which passes through the detour point P and which has the shortest distance (Loi+li+Ij+Ldj) in the search area. Moreover, the route selecting means 1005 allows selection of that route which has only the intersections ahead of the present location, in case when present location is in the area.

Next, specific construction of the individual portions of the navigation system having the detour searching function according to the present embodiment will be described with reverence to FIGS. 49–51.

Figure 49:
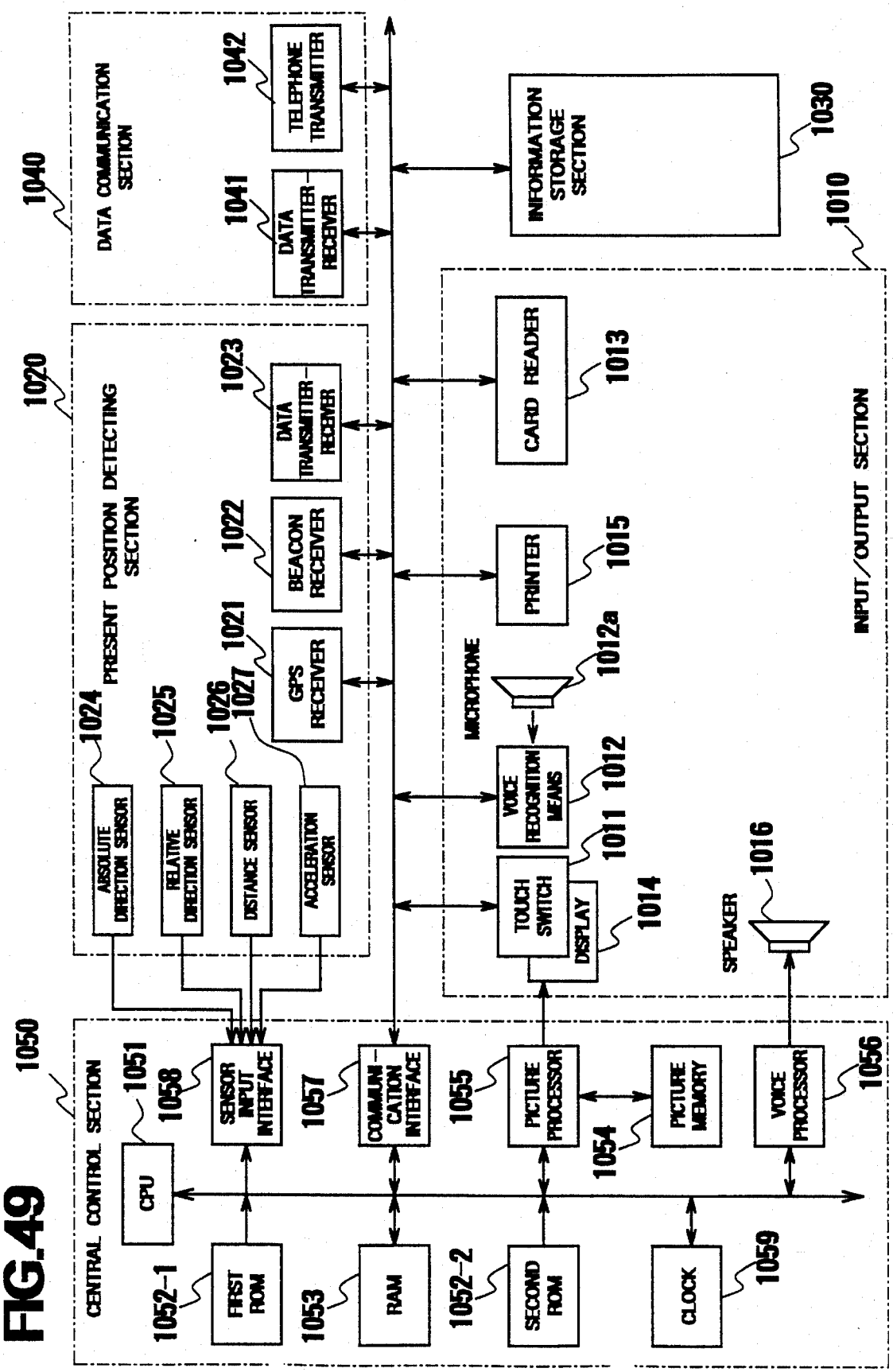
FIG. 49 is a block diagram showing one example of a navigation system having a detour searching function.

In FIG. 49, the input/output section 1010 functions to receive input of the destination and to instruct the operation section (central control section) 1050 of the navigation in accordance with input from the user and to output the processed data or the data received by data communication to the printer so that the guide information may be spoken and/or displayed in the screen as the drivers require. In order to realize these functions, the input section is equipped with: a touch switch 1011 for inputting the destination in terms of a telephone No. or coordinates and for requesting route guidance; a voice recognizer 1012; and a card reader 1013 for reading out the data recorded in an IC card or magnetic card. Moreover, the output section is equipped with a display 1014 for displaying the input data on a screen and for displaying the route guidance automatically on the screen upon request of the driver, a printer 1015 for outputting and printing the data processed by the operation section (central control section) 1050, the data stored in the information storage section 1030 and the communication data transmitted from the information center, and a speaker 1016 for outputting the route guidance in voice form.

The display 1014 is a color CRT or a color liquid crystal display for displaying in color all the screens necessary for navigation such as the route setting screen, the section map screen and the intersection map screen, based upon the map data and the guide data processed by the operation section 1050, and for displaying buttons for setting the route guidance on the screen, and for guiding the route and switching the screens. Especially, information for an intersection to be passed, such as the name of the intersection to be passed, is temporarily popped up in color on the section map screen.

This display is disposed in the instrument panel in the vicinity of the driver's seat so that the driver is allowed to confirm the present location of his vehicle and to learn the route ahead by observing the section map. Moreover, the display 1014 is equipped with the touch switch 1011 corresponding to the display of the function buttons so that the aforementioned operations may be operated on the basis of input signals generated by touching the buttons. The input signal generating means thus constructed of the touch panel and the push button switches constitute the input section.

The voice recognizer 1012 constitutes the input signal generating means for producing the signals to be processed by the operation section (central control section) 1050 after it has recognized the coordinate information input by voice through a microphone 1012a by the user.

The present position detecting section 1020 is equipped with: a GPS receiver 1021 making use of the global navigation system (GPS); a beacon receiver 1022; a data transmitter/receiver 1023 for receiving correcting GPS signals, making use of a cellular phone or a FM multiplex signal; an absolute direction sensor 1024 in the form of a geomagnetic sensor, for example; a relative direction sensor 1025 in the form of a wheel sensor or a steering sensor, for example; a distance sensor 1026 for detecting the covered distance from the r.p.m. of the wheels; and an accelerator sensor 1027.

The information storage section 1030 is a data base containing stored data necessary for route guidance, such as map data, intersection data, node data, road data, photographic data, destination data, the guide point data, the detailed destination data, road name data, branch point data, address data, display guide data, voice guide data and route data.

The data communication section 1040 is equipped with: a data transmitter/receiver 1041 for transmitting/receiving data with an external information center stored with massive route guiding information, to provide the information upon request of the user, and for transmitting/receiving the data to input the point coordinates by using the destination information which is stored in advance in the information storage media (i.e., the digital data storage means) such as an electronic notebook or IC card by the user; and a telephone transmitter 1042 for automatic communication by telephone transmission to acquire information regarding the vicinity of a point by designating the point and to communicate with the destination after the destination has been set.

The operation section (central control section) 1050 is equipped with: a CPU 1051 for executing the arithmetic operations; a first ROM 1052-1 stored with the programs for the route search, the programs for the display control necessary for route guidance and the voice output control necessary for voice guidance, and the data necessary for operating the programs; a RAM 1053 for temporarily storing the guidance information for the designed route and the data being processed; a second ROM 1052-2 stored with the display information data necessary for route guidance and the map display; a picture memory 1054 stored with the picture data to be used for the screen display; a picture processor 1055 for retrieving the picture data from the picture memory on the basis of the display control signal coming from the CPU 1051, for processing the picture data graphically and for outputting the processed data to the display; a voice processor 1056 for synthesizing the voice, phrase, sentence and sound, which is read out of the information storage section 1030 on the basis of the voice output control signal coming from the CPU, to convert it into analog signals and to output the analog signals to the speaker; a communication interface 1057 for transferring the input/output data through communications; a sensor input interface 1058 for retrieving the sensor signals of the present position detecting section; and a clock 1059 for supplying the date and time as internal diagnostic information. The driver can select either the screen display or the voice output for route guidance.

The routine for operation of the navigation system which is provided with the detour searching function according to the present embodiment, as shown in FIG. 49, will now be described with reference to FIG. 50.

Figure 50:
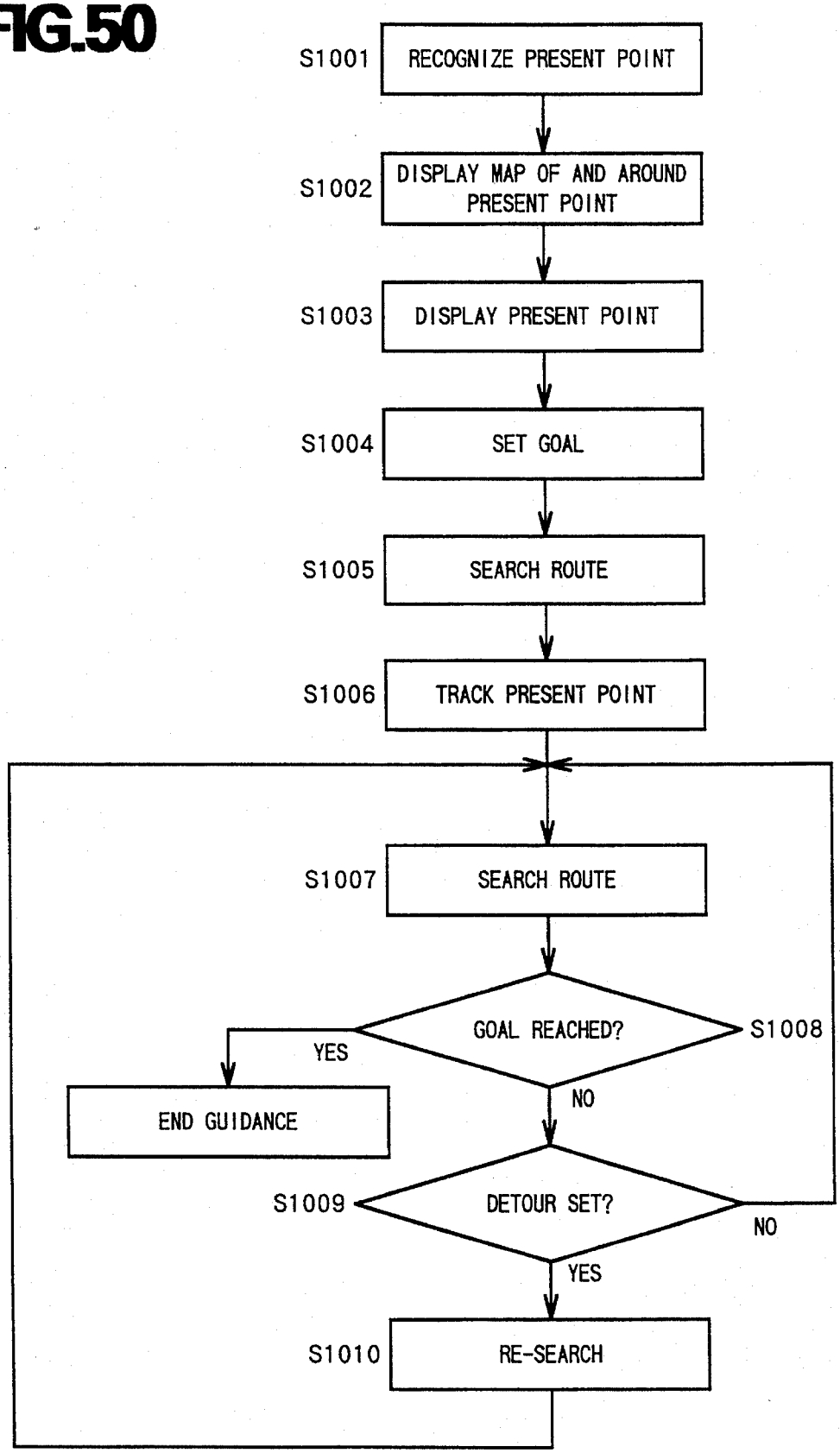
FIG. 50 is a flow chart of an operating routine of a route guidance navigation system.

When the program of the route guidance system is started by the CPU 1051, the map of and around the present position is displayed by recognition of the present position by the present position detecting section 1020, as shown in FIG. 50, and the name and so on of the present position are displayed at steps S1001 to S1003. Next, the vicinity map is extracted from the place name index and the national map to set the destination (goal), and the route from the present position to the destination is searched (at steps S1004 and S1005). At Step S1005, the route from the present position to the destination may be designated on the displayed map or set by another method.

When the route is determined, the route guidance is repeated until the destination is reached, while tracing the present position by the present position detecting section 1020 (at Steps S1006 to S1009). In case an input is made for setting a detour before the destination is reached, the search area is set for re-search so that the route guidance is likewise repeated until the destination is reached (at Steps S1006 to S1010).

The route data obtained by the aforementioned route searching operation (of Step S1005) is composed of a list of n number of intersections, the individual intersection Nos. and the distances to the next intersection. On the basis of this route data, the intersections are indicated by circles, and the roads joining the intersections are indicated by lines to thereby illustrate the detour point P and the search area, as shown in FIG. 48. Loi designates a distance between an intersection, which precedes entry of the route into the search area from the side of the starting point, and Ci designates the next intersection (i.e., an entrance intersection) which is located in the search area, and LDj designates the distance between an intersection (i.e., an exit intersection), which is located before the route leaves the search area, and the next intersection which is located at the side of the destination and outside of the search area. Moreover, the distance of the route, which is searched from the entrance intersection Ci in the search area to the detour point P, is designated as li, and the distance of the route, which is searched from the detour point P to the exit intersection Cj, is designated as Ij.

Figure 51:
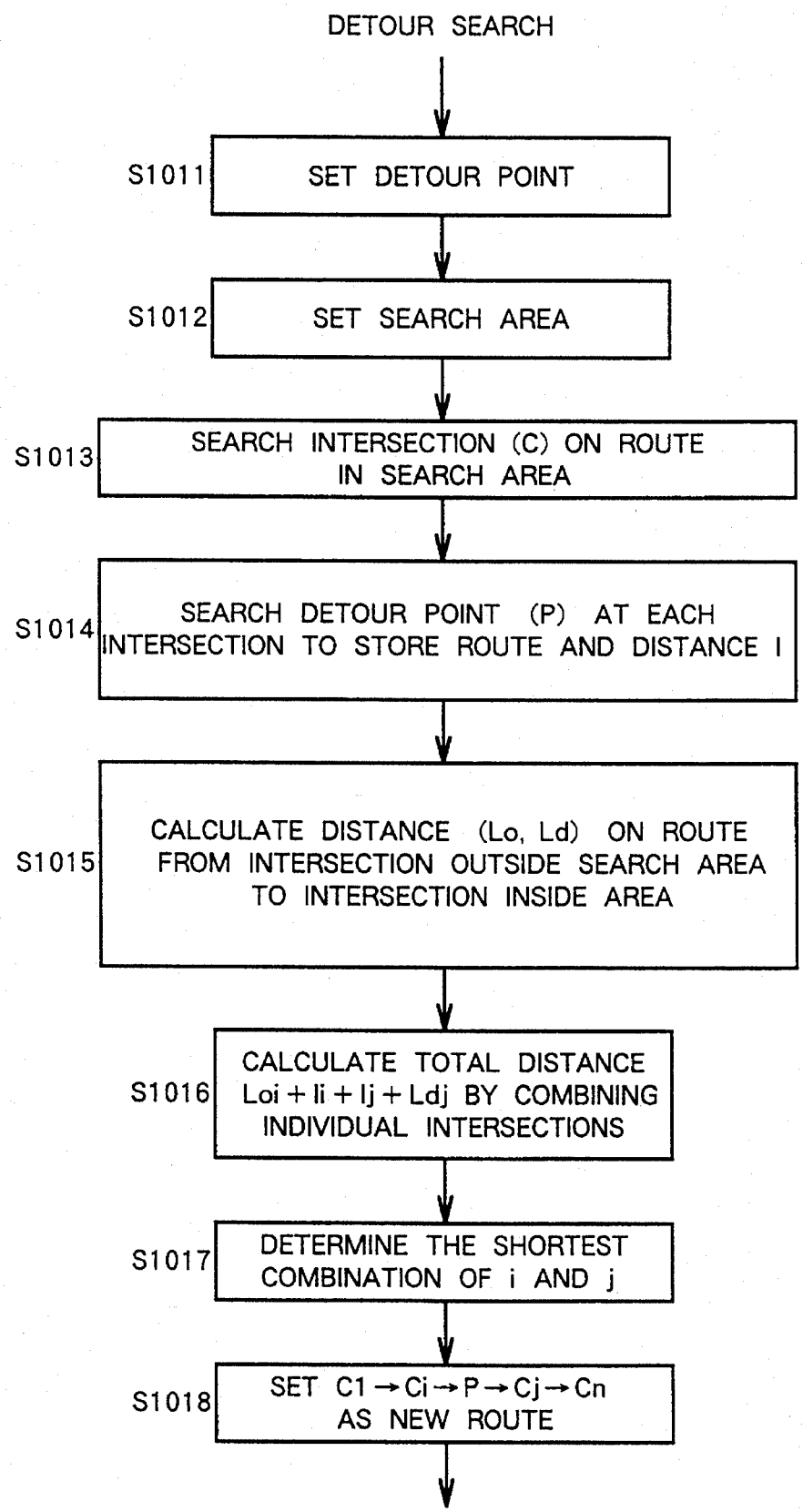
FIG. 51 is a flow chart of a detour searching routine.

The detour search (of Step S1010) of this case, in which the detour point is set, is executed by the routine shown in FIG. 51.

Specifically, the detour point P is first set, and the search area is then set (at Steps S1011 and S1012) by designating the intersections and an arbitrary area on the route and by calculating the distances between the detour point and the intersections on the route. Next, the intersections on the route in the search area are searched, and a search is made up to the detour point P for each of the intersections so that the routes and their distances li and Ij are stored (at Steps S1013 and S1014). Moreover, the distances Loi and Ldj on the routes from the intersection outside of the search area to the intersection inside of the area are calculated (at Step S1015), and their sum of Loi+li+Ij+Ldj is calculated (at Step S1016) to determine such a combination of i and j (i≦j) as to give the shortest total distance (at Step S1017). Thus, the route C1→Ci→P→Cj→Cn is set as the new route (at Step S1018).

A method of setting the search area will now be described with reference to FIGS. 52–54.

Figure 52A:
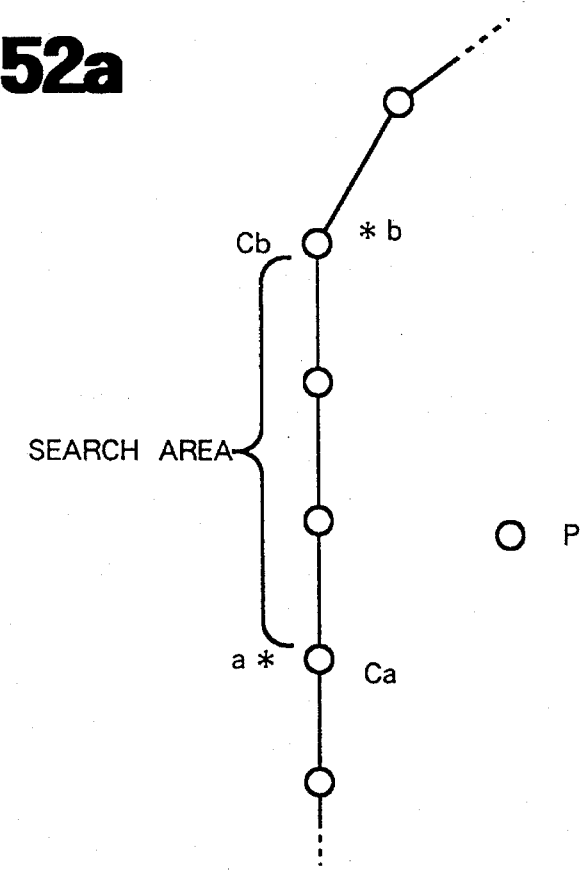
FIG. 52a is a diagram illustrating a search area defined by designated points and closest intersections thereto on the route.
Figure 52B:
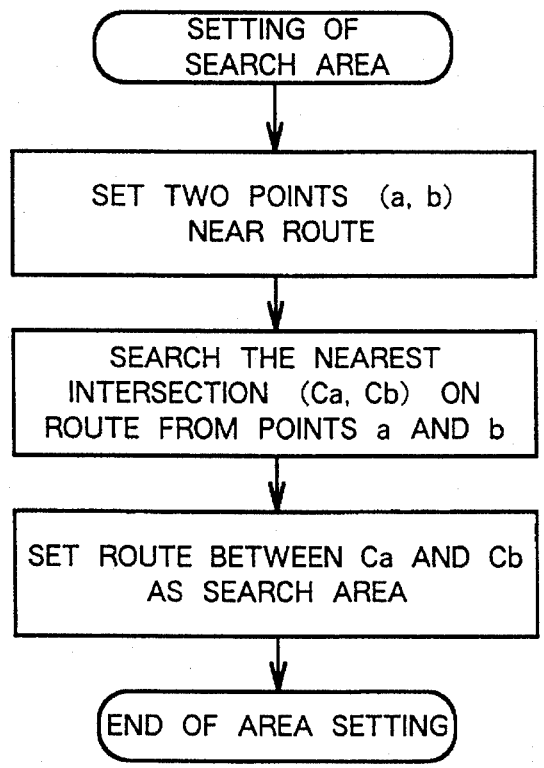
Figure 53A:
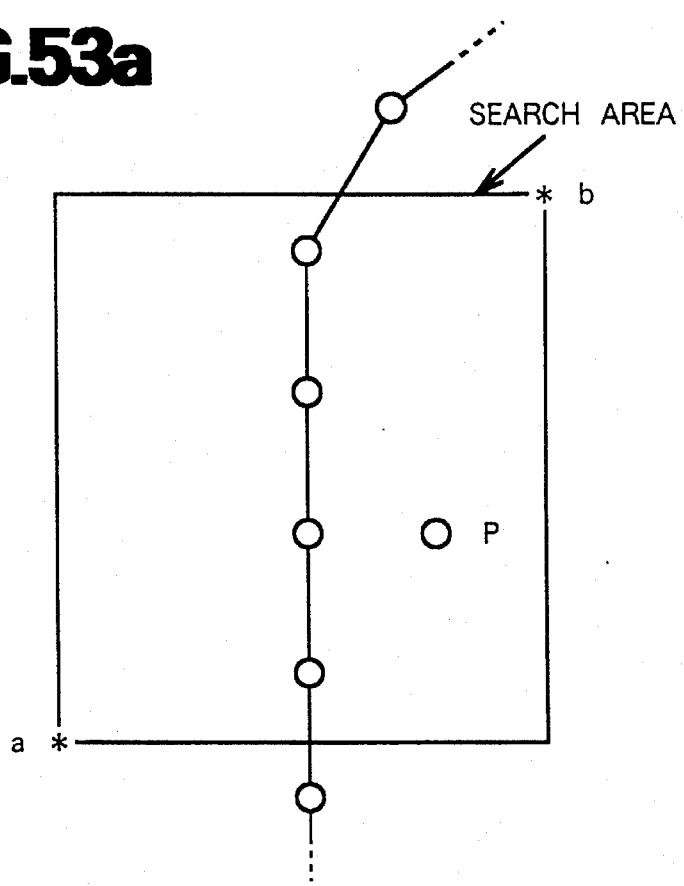
FIG. 53a is a diagram illustrating a search area defined by designation of an arbitrary area.
Figure 53B:
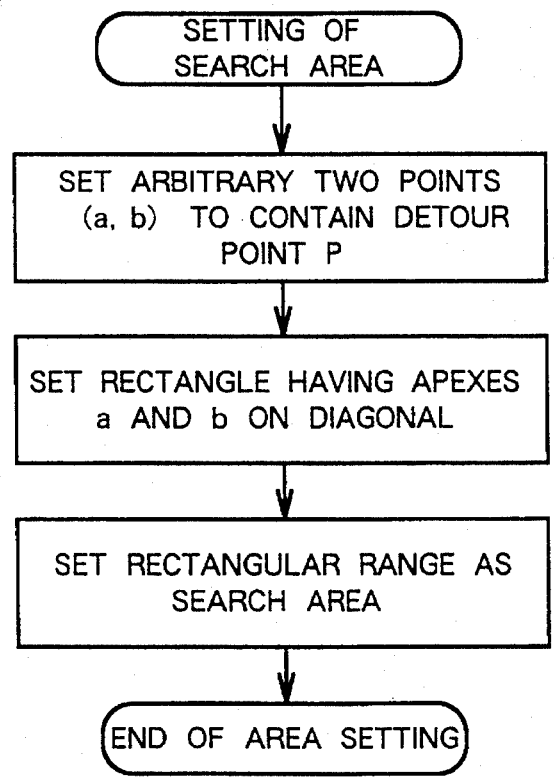
Figure 54A:
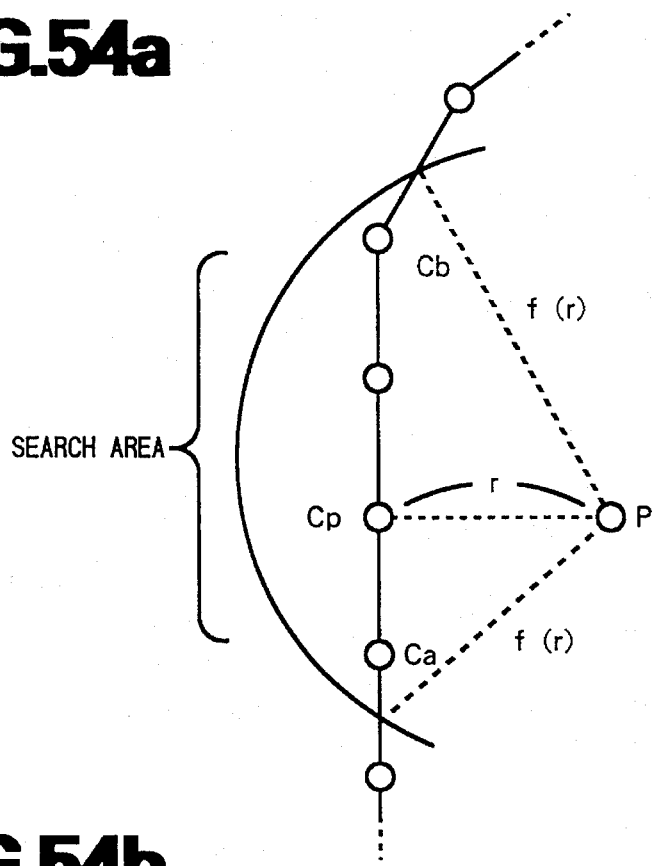
FIG. 54a is a diagram explaining the automatic setting of the search area.
Figure 54B:
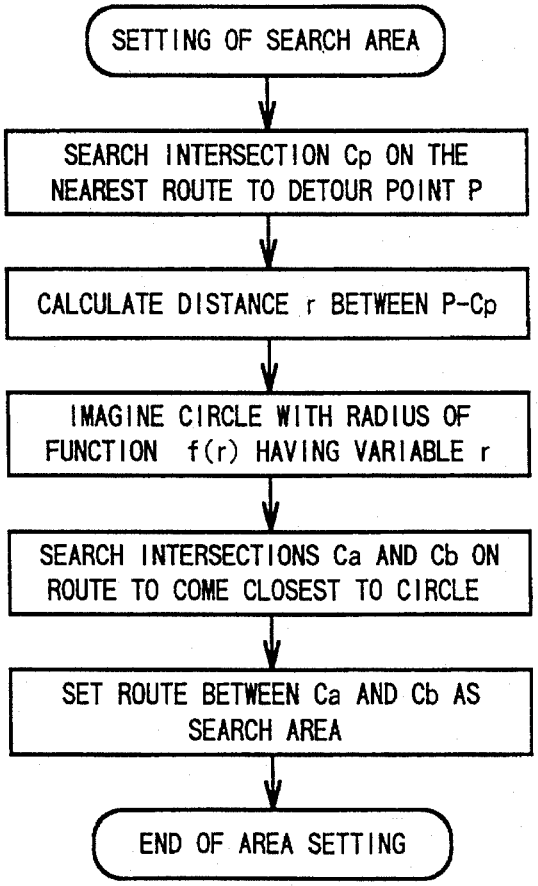

When intersections on the route are to be utilized in setting the search area in the operation of Step S1012, two points a and b in the vicinity of the route are set, as shown in FIGS. 52a and 52b, intersections Ca and Cb on the route nearest from the two points a and b are located by the search to set the intermediate route as the search area. When an arbitrary area is to be designated, on the other hand, arbitrary two points a and b are set to include the detour point P, as shown in FIGS. 53a and 53b, within a rectangle having as apexes of a diagonal, those two points a and b, with the area inside of the rectangle set as the search area. In automatic setting without designation of either intersections or the areas, as in the aforementioned cases, the intersection Cp on the route which is the nearest by a straight distance r to the detour point P is located by a search, as shown in FIGS. 54a and 54b. Then, imagining a circle having a radius expressed by a function f(r), using the distance r between the point P and the point Cp as a variable, the intersections Ca and Cb on the route which are nearest to the circuit around the detour point P are located by search to set the intermediate route as the search area.

Figure 55:
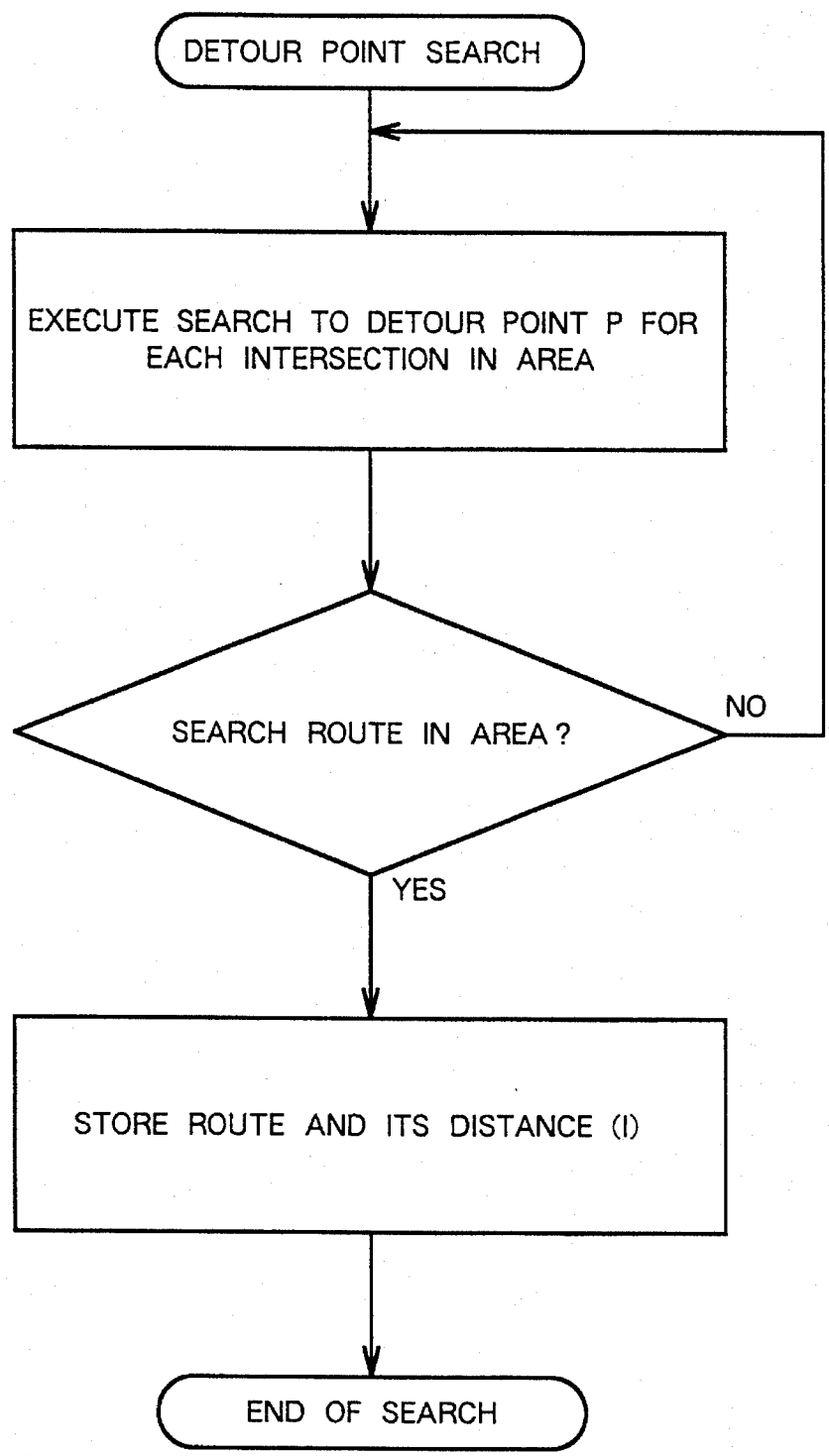
FIG. 55 is a flow chart of a subroutine for searching for a detour point.
Figure 56:
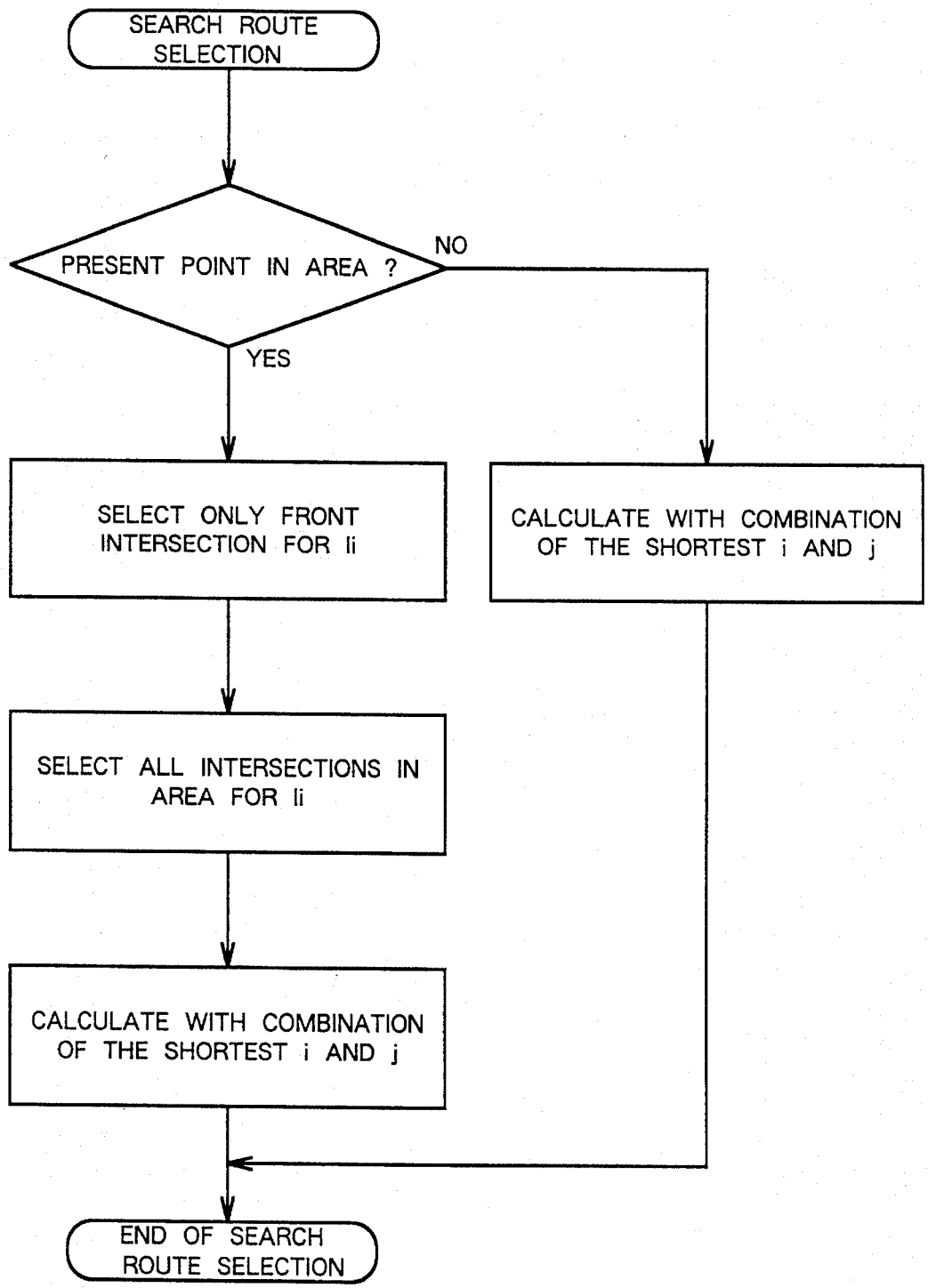
FIG. 56 is a flow chart of one example of a subroutine for selecting designing a route.

FIG. 55 is a flowchart of the subroutine for searching to modify a route to include a detour point. In the search for the detour point to be executed at Step S1014, the route to go out of the area need not be set in the case where the search area is two-dimensionally set, as has been described with reference to FIG. 53. As shown in FIG. 55, however, a search to the detour point P is performed for each intersection in the area while examining whether or not the search route is within the area, as shown in FIG. 55, and the route and its distance I are stored. In the selection of the search route to be executed at Step S1017, whether or not the present location is within the search area is examined, as shown in FIG. 56, in case the vehicle is running with route guidance. If the present location is not in the search area, the combination of i and j for the shortest total distance, as has been described with reference to FIG. 51, is determined as is. If the present location is in the search area, on the other hand, the combination of i and j for the shortest total distance may be determined by selecting only the intersections ahead for li and by selecting all the intersections in the search area for Ij.

Figure 57:
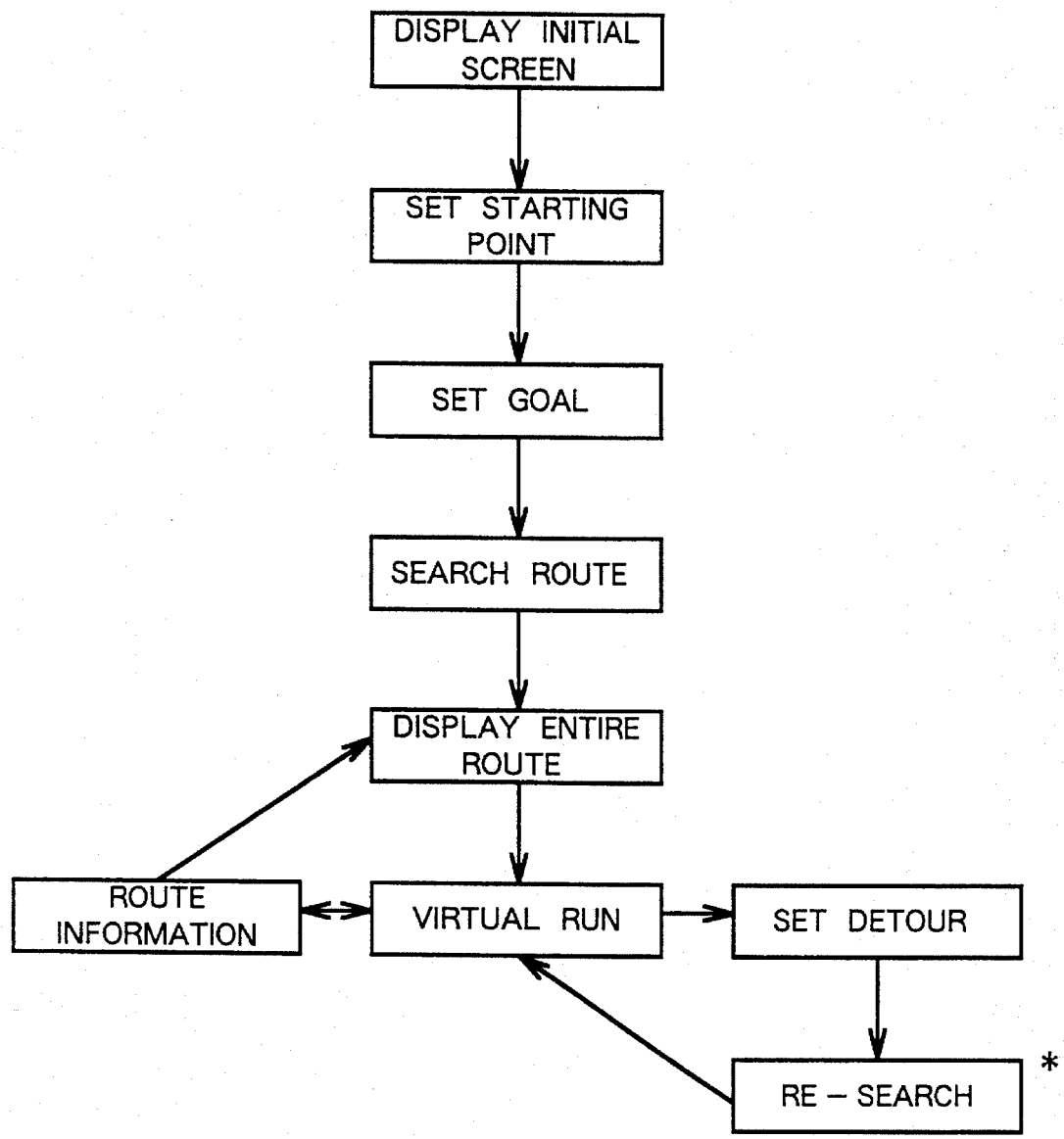
FIG. 57 is a flow chart of a routine for display of a virtual run including a detour search.

FIG. 57 is a flow chart for a routine including the detour search in the virtual running mode. When the virtual running is started, the starting point and the destination are first set from the initial screen display to search the route between them. When the route is set, the entire route is displayed, and the virtual run is then started along the route. If the detour setting comes midway, the detour search is executed like before, and the virtual run is continued along the corrected new route.

The navigation system having the detour searching function according to the embodiment thus far described comprises: stored route data including the information concerning the intersection array of a set route; search area setting means for setting the search area from a detour point by designating said detour point; detour searching means for executing the route search passing through said detour point for returning to an intersection in a search area set by said search area setting means, for each of the intersections in said search area; and route selecting means for selecting the route passing through the detour point on the basis of said search results, whereby the route search in the case of a detour can be accomplished within a short time period. In case, moreover, the present position is present in the search area, what is selected is the route to be joined to the intersection, in which the route toward the detour point is present ahead of said present position, so that the route can be easily changed even while running along the first set route or even in case a place to be called comes to mind.

In case, moreover, the first set route fails to match the desire of the user, as in case a route to be followed is present in the district but is not desired, the route can be changed to the desired one by designating a point on the road as the detour. Even in case the user makes an ambiguous desire "to pass around here", the route can be changed to a desired one by designating the central portion of that area. As the method of confirming the set route, there is the virtual run mode, and the route can also be automatically changed in this case by setting the detour so that the information such as the covered distance, the elapsed time period and the toll can be updated and confirmed. As a result, the route can be partially changed while exploring the first set route so that another route according to the intention of the user can be easily set in a short time period.

In the navigation system of the prior art, as disclosed in Japanese Patent Laid-Open No. 3899/1990, for example, a desired transit point or the like can be set as the condition for executing the search. However, if the transit point is later added to the designed route or if the route is partially changed, the route search is executed again from the start thereby to make the simple addition of a transit point or a partial change without a re-execution of the route search substantially impossible. While running on the designed route, it is likewise impossible to set a new detour or to change the route, without the route from the present location to the destination being newly searched again. When the re-searched route fails to match the desire of the user, the transit point could be set again to again search the route, but the route search has to be done over from the beginning. In any event, redoing and entire route search takes a long time. Still worse, there arises a problem that the initial route may be absolutely changed depending upon the first route, the road situations and the detour point. The present embodiment of the navigation system with its aforementioned detour searching functions can solve the above-specified problem so that it can change the route by only a partial search even in case a detour is designated for the first set route.

In the embodiment of the navigation system having the aforementioned detour searching function, the search area is automatically set by setting a circle which has its radius equal to a function of the distance between the detour point and the nearest intersection on the route, but the search area may also be set by searching the intersections on the route while using the distance from the nearest intersection as a criterion. Moreover, the aforementioned embodiment discloses the method for determining the shortest route as the method of searching the route passing through the detour point. However, the optimum road may be determined by using the Dijkstra method from not only the data such as the road and intersection information stored in the information storage section but also various information such as distance information, average degree of business travel on the road and the number of lanes of the road.

Figure 58:
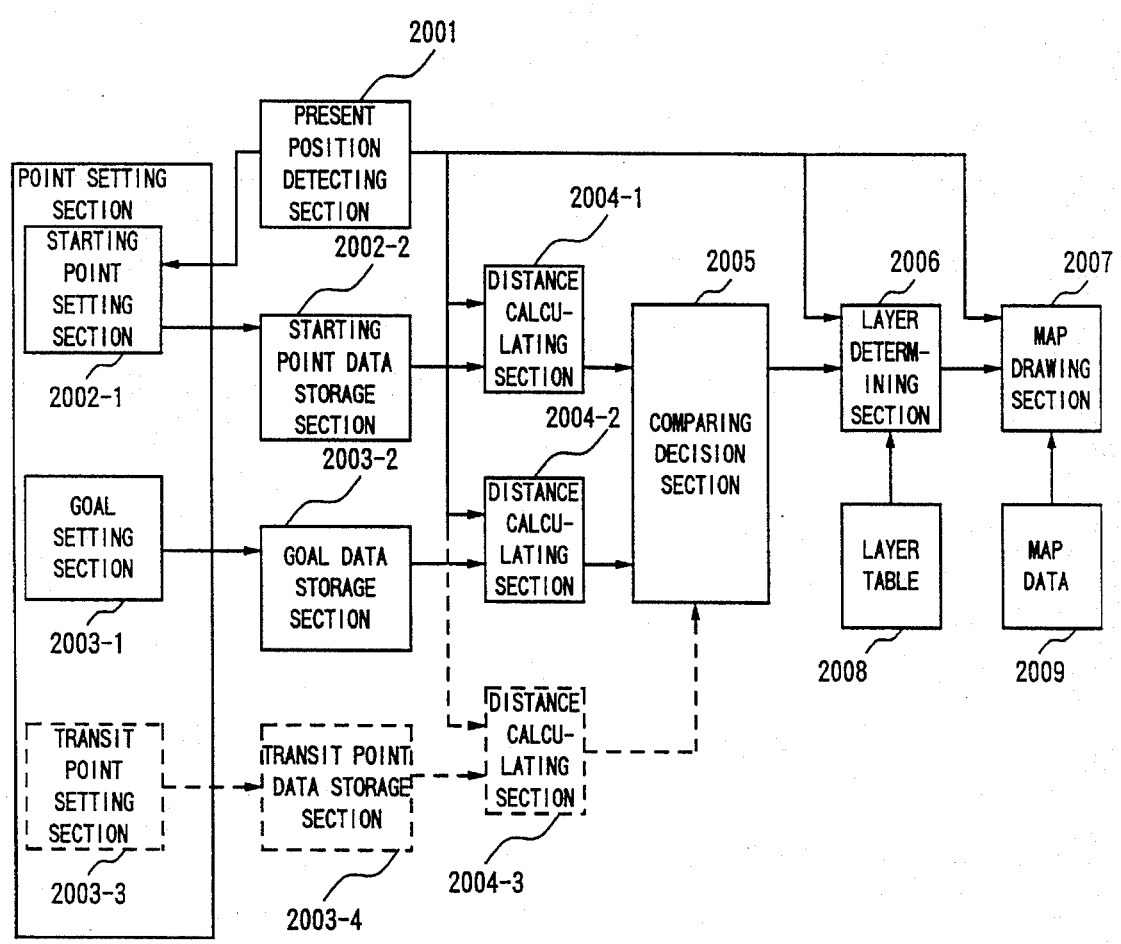
FIG. 58 is a block diagram showing one embodiment of a navigation system to which the map display system of the present invention may be applied.

Here will be described an embodiment of the navigation system for displaying a more detailed map for a point closer to the set point when a map is to be displayed by reference to FIGS. 58 and 59. In FIG. 58, a present position detecting section 2001 detects the present position by using a variety of sensors, as will be described in the following, to output at least the coordinates of the present position and the type of the road of the present position. A starting point setting section 2002-1 sets the present position, which is initially output by the present position detecting section 2001, as the starting point and stores the starting point data coordinates in a starting point data storage section 2002-2. A destination (goal) setting section 2003-1 is arbitrarily set by the user by a later-described input section (or point setting section) and stores the set destination as destination data coordinates in a goal data storage section 2003-2. A transit point setting section 2003-3 may also be operated by the user and stores set transit point data coordinates in a transit point data storage section 2003-4. Distance calculating sections 2004-1, 2004-2 and 2004-3 calculate distances on the basis of the present position coordinates detected by the present position detecting section 2001 and the individual coordinates stored in the starting point data storage section 2002-2, the destination data storage section 2003-2 and the transit point data storage section 2003-4. A comparing decision section 2005 compares and decides the lengths of the individual distances and selects the shortest distance.

A layer table 2008 has numbered layers, FIG. 59b, each containing a distance and a road type (kind) wherein a layer number can be chosen either by the distance or the road type. A layer determining section 2006 determines the chosen layer from the shortest distance information from the comparing decision section 2005 by reference to the layer table 2008, or, when the layer number corresponding to the road type information from the present position detecting section 2001 is larger than the layer number chosen by the shortest distance information, then the layer determining section 2006 determines the chosen layer from the road type information from the present position detecting section 2001. In short, the layer determining section 2006 determines the lower-ranked layer (i.e., higher numbered layer) of (1) the layer corresponding to the distance information from the comparing decision section 2005 and (2) the layer corresponding to the road type information from the present position detecting section 2001.

Road data 2009 is stored, as shown in FIG. 59a, as road information together with node information, the road type and the layer number for each road. A map drawing section 2007 reads the road information from the road data 2009 and draws a display of the roads joined at the nodes such that the roads of a rank equal to or higher than that of the lowest ranked layer determined by the layer determining section 2006 are displayed in an emphasized manner. Moreover, the map drawing section 2007 may change the scale of the displayed map in accordance with the determined layer. In this way, a scale can be selected according to the amount of road information that can be viewed with clarity. Moreover, the names of intersections may be displayed on the screen for intersections within a range forward and backward of the present position by several tens meters when the road data 2009 includes such intersection names. Passage through an intersection can be confirmed by detecting the present position. Also, the name of the road being followed may be displayed as "NATIONAL ROAD NO. 19", for example.

An example of the construction of the road data having the layer structure to be used as the map drawing data in the aforementioned map drawing section 2007 is shown in FIG. 59a. This road data has, as the information of each road, the number of nodes forming the road, the road type, the layer No. and the coordinates of each of the actual nodes. In layer table of FIG. 59b, each layer No. has a corresponding listed distance form which the lowest ranked layer is determined based upon the shortest of the distance between the starting point and the present location and the distance between the present location and the destination. The distances in the table are such that the highest ranked layer 0 has the longest distance (100 Km) and the lower ranked layers have progressively shorter distances until the layer 7 has the shortest distance (1 Km). The layer 0 is assigned to an expressway; the layer 1 is assigned to an urban expressway; the layer 2 is assigned to a toll road; the layer 3 is assigned to a national road; the layer 4 is assigned to a prefectural road; the layer 5 is assigned to a local major road; the layer 6 is assigned to a general road; and the layer 7 is assigned to a general road including a lane. Thus, the layers of higher rank correspond to the roads necessary for running the longer distances. However, these layer Nos. are not determined exclusively by the road types but also by considering the types of roads to be joined to that road and are stored in the information storage section 1030. In case the road to be travelled from a national road to an interchange with an expressway is a general road, for example, the general road has to be displayed so that the driver may use the road information as route guidance to travel on the general road to the expressway interchange from the national road, and the road to be travelled has to be given the same layer No. as that of the national road even if it is a general road. On the other hand, even a toll road is given the same layer No. as that of a general road if it is travelled only when it leads to a near destination or is blinded, such as a toll road or a skyline around a pleasure resort. Thus, the layer No. is decided also by the relationship of a road with its joining roads and is stored in advance in the map data. In this way, the method of deciding the layer No. of a road may be optimized when the route search is performed in advance by an arbitrary combination of the starting point and the destination so that the layer No. in the map data may be decided on the basis of the search results.

The layer No. of the road to be displayed is decided according to the distances between the starting point and the present position and between the present position and the destination and by considering the layer No. of the road being followed. If, therefore, the distance between the present position and the destination exceeds 100 Km, the road of layer 0 is displayed in the emphasized manner. In case, however, a road of layer 3 is being followed at present, roads having layer numbers of 3 or lower are displayed in the emphasized manner. Moreover, more roads are sequentially added and displayed in the emphasized manner because more detailed roads are required as the destination is approached, for example, the roads of layer 4 are added when the destination is within the range of 20 Km, the roads of layer 5 are added within the range of 5 Km, the roads of layer 6 are added within the range of 2 Km, and the roads of layer 7 are added within the range of 1 Km.

Figure 64:
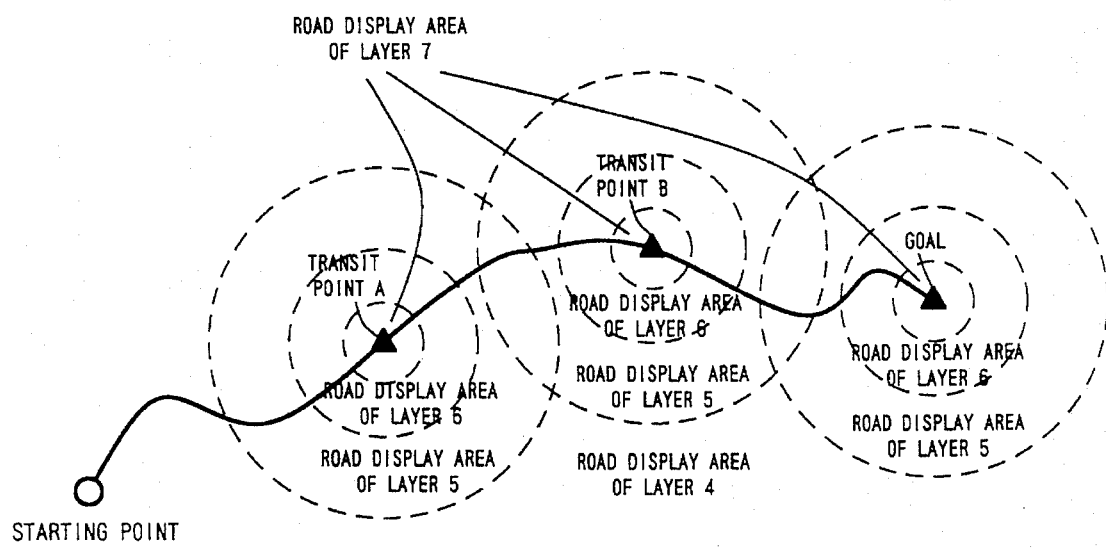
FIG. 64 is a diagram showing an example of the layered display area which is determined by the distances between the starting point, a transit point and the destination.

In the aforementioned embodiment, in case a plurality of transit points or destinations are set, as shown in FIG. 64, the layer of a lower rank is determined by the shortest distance of the distance to the transit point A from the present position, and the distance to the transit point B from the present position. At an intermediate position between the transit points A and B, in which the layers set by the transit points A and B overlap, the layer of the shorter one of the distances between the present position of the vehicle and the points A and B is adopted. If the vehicle is positioned closer to the transit point B, the display is made according to the layer set at the transit point B. In the overlapping portion of the layers determined by the transit points A and B, on the other hand, the layer at the lower rank at the point A or B may be adopted independently of the distances between the present position and the points A and B.

By thus interchanging the layers according to the distances, the roads to be emphasized and displayed are determined to make it easy for the driver to view what road is followed to the destination. The reason why the layer No. of the road to be displayed on the screen is determined not only by the distance between the present location and the destination but also by the layer No. of the road being actually followed, is the necessity for displaying a detailed road having a lower rank so that the vehicle may return to a major road such as a national road when when the vehicle strays off the major road onto a road which is not displayed in the emphasized manner on the screen.

Figure 60:
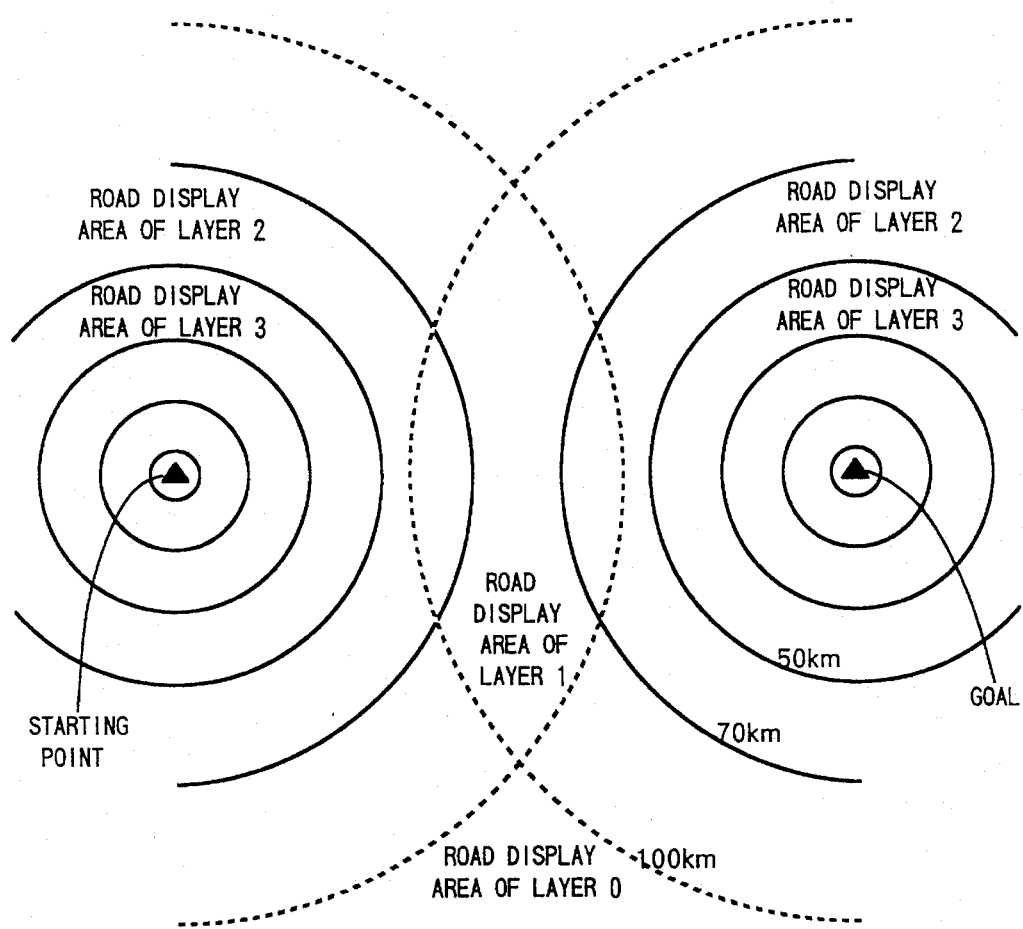
FIG. 60 is a diagram showing an example of a layer display area which is determined in accordance with the distance between the starting point and the destination.
Figure 61C:
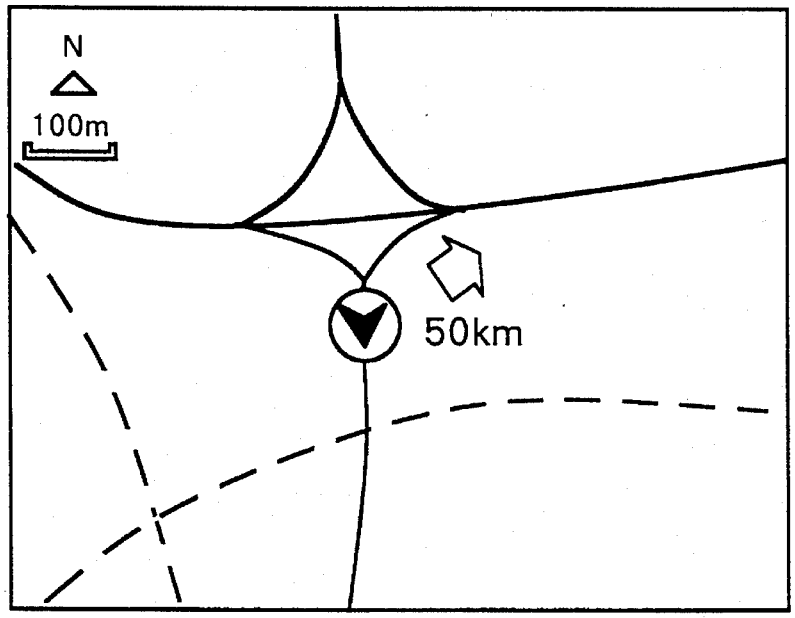
Figure 61D:
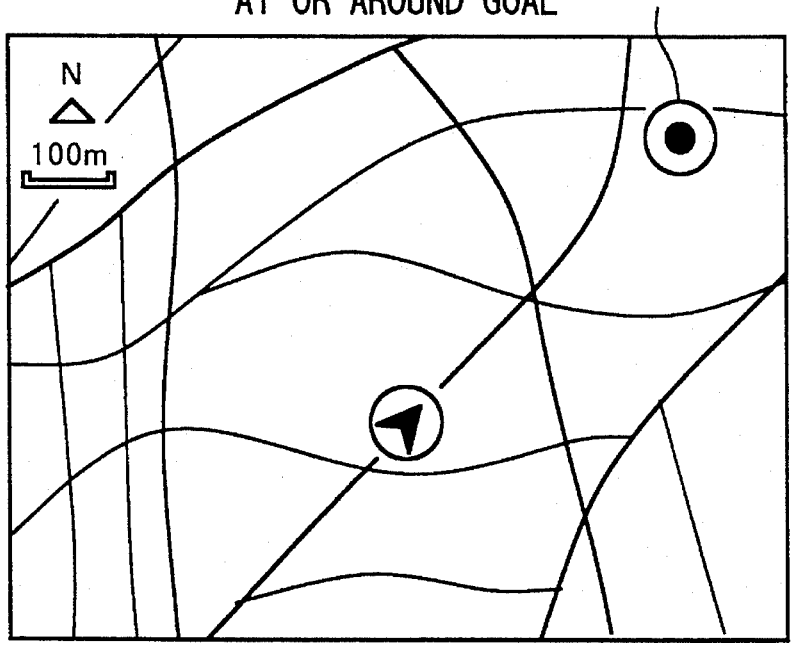

FIG. 60 is a diagram showing an example of the layer display area which is determined from the distance relation between a starting point and a destination, and FIGS. 61a–61d presents diagrams showing examples of the screen display to be changed according to the run from the starting point to the destination. While travelling from the starting point to the destination, the roads of layer 7 and lower layer numbers are emphasized at the starting point, but only roads of higher rank are emphasized as the present point moves further from the starting point. When the present position is over 70 Km and less than 100 Km from the starting point, roads of the layer 1 are emphasized, but the rank of the road layer being emphasized drops down to the next lower rank, layer 2, if the distance to the destination becomes less than 70 Km. An example of the emphasized display state of layer 7 (all the roads) while in the vicinity of the starting point is shown in FIG. 61a. Moreover, an example of the emphasized display of the roads up to the layer 3 at a point of 50 Km to the destination is shown in FIG. 61b. An example of the state in which the roads up to the layer 5 are emphasized and displayed because travel on a road of layer 4 is eminent, is shown in FIG. 61c. An example of the state, in which all the roads up to the layer 7 are displayed while in the vicinity of the destination, is shown in FIG. 61d.

Figure 62:
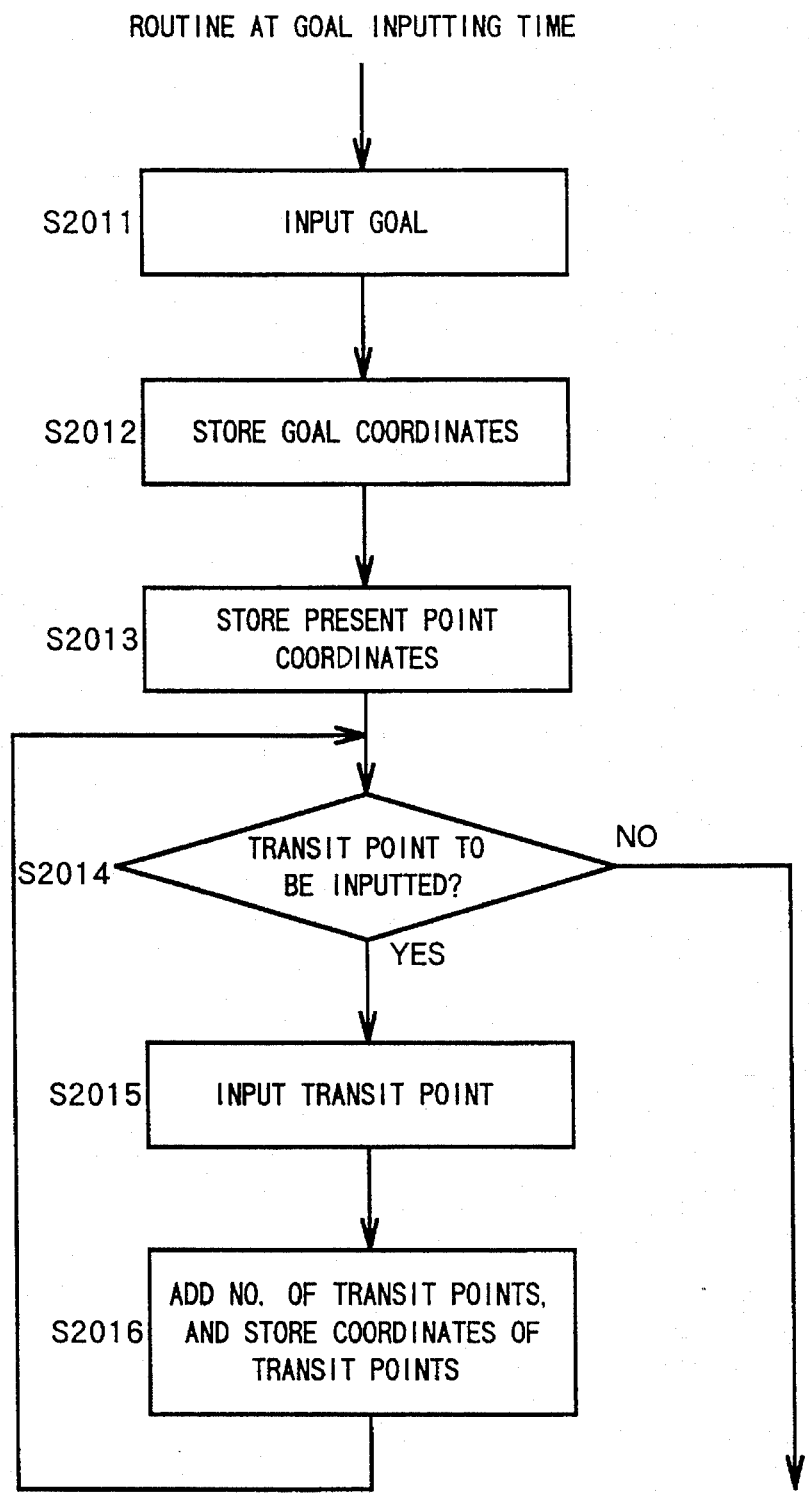
FIG. 62 is a flow chart of a destination input routine.

Here will be described the entire construction and the processing flow of the navigation system according to the embodiment of FIGS. 62 and 63. In execution of the routine of the navigation system in the CPU 51 of FIG. 49, the destination (goal) is input first, as shown in FIG. 62, and the coordinates of the destination and the coordinates of the present location are stored (at Steps S2011 to S2013). When a transit point is input, the number and coordinates of the transit point are stored in Steps S2014 to S2016.

Figure 63:
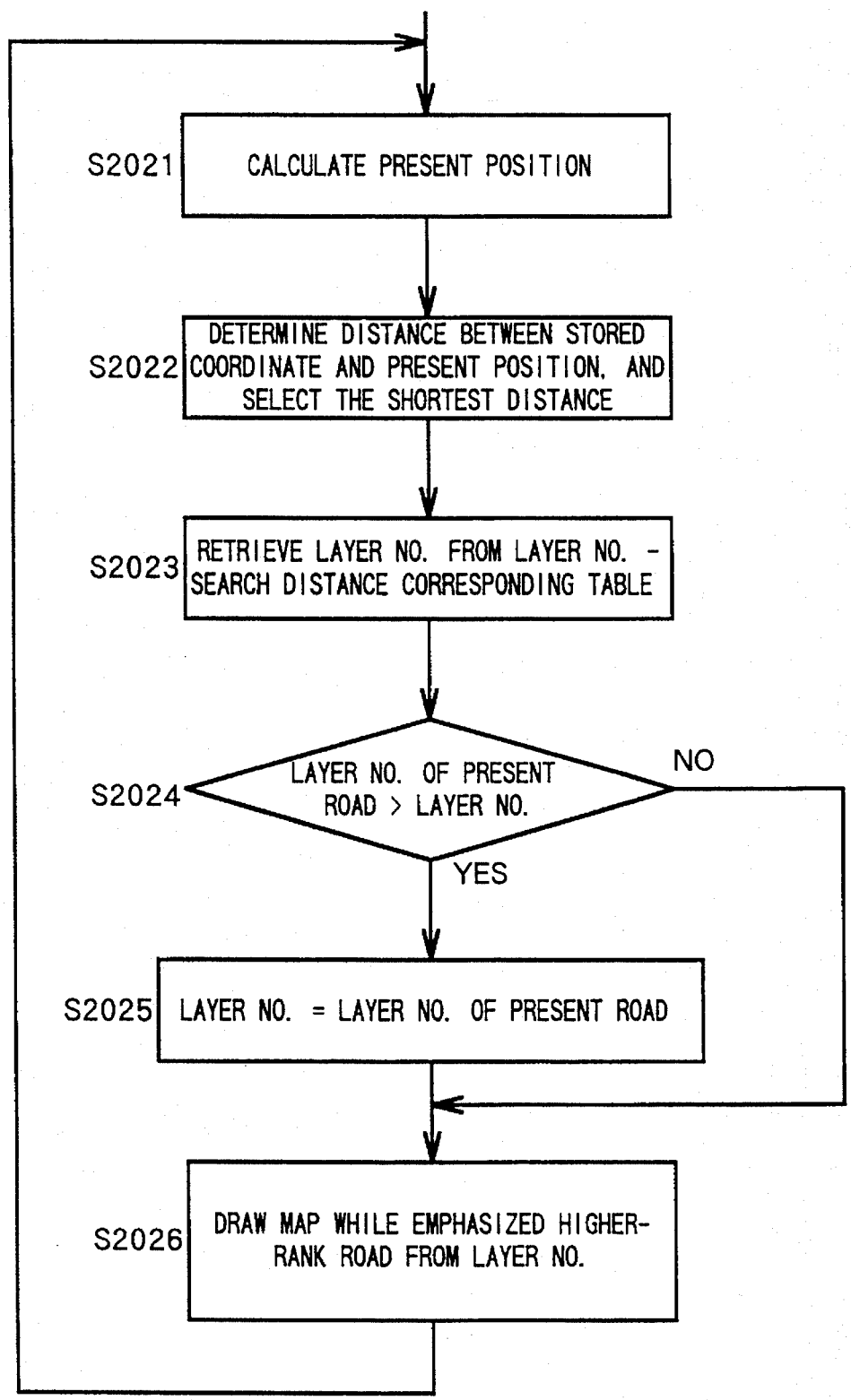
FIG. 63 is a flow chart of a routine for processing map data during running.

At the running time, moreover, the present position is calculated, as shown in Step 2021 of FIG. 63, and the distances from the coordinates of the destination and any stored transit points to the present position are determined to select the shortest distance (at Steps S2021 and S2022). On the basis of this shortest distance, the layer No. is determined from the layer table, step S2023, and is compared with the layer No. of the road of the present position (at Steps S2023 and S2024). In case the layer No. of the present road is higher, the map is drawn while emphasizing the roads having layer Nos. of higher rank than that of the present road (Steps S2025 and 2026). In case the determined layer No. is higher (lower rank), the map is drawn while emphasizing the roads at higher ranks than that of the layer No. (at Step S2026).

According to the foregoing embodiment of the navigation system for displaying a more detailed map as a set point is approached, the map data is classified in the layer structure so that roads of different ranks are automatically emphasized according to the distances from the starting point, the destination and the inputted transit points. As a result, even in case a plurality of points are set, a detailed map can be displayed when close to each of the set points whereas a coarse map can be displayed when between the individual points, depending upon the distances. Thus, there can be attained an advantage that the driver can easily acquire the necessary detailed map information to change the route from the present position in the map display when the traffic is cut off or in a snarl.

Specifically, in the map display system as disclosed in Japanese Patent Laid-Open No. 130412/1990, for example, the degree of detail of the map in an area to be displayed in the screen is changed by recognizing the type of road, on which is displayed the present position of a vehicle, and by controlling the reading of the display elements of the map according to the type of the recognized road. In case, however, a plurality of transit points other than the destination are set and located on major trunk roads, such as national roads, the degree of detail of the map being displayed is coarse showing only the trunk roads so that the reduced scales of the map have to be called for when detailed information of the regions of the transit points is desired. In case, moreover, the technique as disclosed in the map display system of Japanese Patent Laid-Open No. 206710/1984 is applied to the system capable of inputting a plurality of points such as the transit points and the destination, a reduced scale and road display level are decided according to the distance from the present location of the vehicle to a next transit point so that a wide map and a coarse road map are displayed just after passing a transit point. As a result, there arises a disadvantage that little information is displayed in case the driver wishes to change his future course from the displayed maps.

The aforementioned embodiment of the navigation system for displaying a more detailed map as a set point is approached solves the above problem by also providing the driver detailed map information after passing the set point, even in case a plurality of points such as the starting point, the transit points and the destination are set, and providing only the necessary map information at positions spaced from the set points.

While the foregoing embodiment describes the display of roads at higher rank than the determined layer in the emphasized manner along with non-emphasized roads of lower rank, the roads of the higher rank may be displayed exclusively leaving out the layers of lower rank. Alternatively, the hues and color densities of the roads displayed may be changed with the layers. Moreover, although the emphasized layers are determined according to the shorter one of the distances between the starting point and the present location and between the present location and the destination, the emphasized layers may be determined only according to the distance between the present location and the destination and the road on which the vehicle is located. In case the driver strays from the route, the present road being travelled is recognized so that roads at higher rank than that of the layer of the present road are displayed or displayed in the emphasized manner. If the proper name of an intersection can be searched and displayed by referring to the place name from the road data or the intersection data, the present position can be confirmed from the name of the intersection on the map, and the present position can be easily corrected by viewing the name of the intersection being passed.

Moreover, the navigation system according to the foregoing embodiment can be made so simple as to display the present position of the vehicle and the distance or direction to the destination or the transit points by setting the destination and the transit points or if it searches the route to the set destination and transit points and guides the driver along the designed route.

What is claimed is:

1. A vehicle navigation apparatus for setting a route and then for selectively performing actual route guidance while traveling along the route or performing a virtual route guidance by simulating route guidance along the route, comprising:

data storage means in which map information is stored;

point setting means for setting at least two set route points on a map derived from the stored map information;

route setting means for determining a route on the map between the at least two set route points;

means for selecting an actual route guidance mode or a virtual route guidance mode;

actual vehicle location means responsive to selection of said actual route guidance mode for determining an actual present position of a vehicle;

simulated vehicle location means responsive to selection of said virtual route guidance mode for determining a simulated present position on the route;

said simulated vehicle location means including means for setting a rate of movement of the simulated present position along the route; and route information output means for outputting vehicle navigational display information including said actual present position when said actual guidance mode is selected and said simulated present position when the virtual route guidance mode is selected.

2. A vehicle navigation apparatus as in claim 1 wherein said data storage means includes road speed data; and said means for setting the rate of movement uses the road speed data corresponding to the present position to set the rate of movement.

3. A vehicle navigation apparatus as in claim 2 wherein said means for setting the rate of movement includes means for multiplying the road speed data by a multiplication factor greater than one to increase the rate of movement.

4. A vehicle navigation apparatus as in claim 3 including means for manually setting the multiplication factor.

5. A vehicle navigation apparatus as in claim 1 including manual means for stepping the simulated present position along the route by the rate of movement.

6. A vehicle navigation apparatus as in claim 5 wherein said means for setting the rate of movement includes manual means for setting a magnitude of step.

7. A vehicle navigation apparatus as in claim 6 wherein said data storage means includes road distance data; and said manual means for setting a magnitude of step sets a magnitude of distance.

8. A vehicle navigation apparatus as in claim 6 wherein said data storage means includes road distance data and road speed data; and said manual means for setting a magnitude of step sets a magnitude of time.

9. A vehicle navigation apparatus as in claim 1 including means for stepping the simulated present position along the route; and wherein said data storage means includes road node data; and said means for setting the rate of movement sets a step magnitude based upon the road node data.

10. A vehicle navigation apparatus for setting a route and then for selectively performing actual route guidance while traveling along the route or performing a virtual route guidance by simulating route guidance along the route, comprising:

data storage means in which map information is stored;

point setting means for setting at least two set route points on a map derived from the stored map information;

route setting means for determining a route on the map between the at least two set route points;

means for selecting an actual route guidance mode or a virtual route guidance mode;

actual vehicle location means responsive to selection of said actual route guidance mode for determining an actual present position of a vehicle;

simulated vehicle location means responsive to selection of said virtual route guidance mode for determining a simulated present position on the route;

display means for displaying at least a portion of the map with at least a portion of the route with a marker indicating said actual present position when said actual guidance mode is selected and said simulated present position when the virtual route guidance mode is selected;

movement setting means for determining a rate of movement of the simulated present position along the route; and scroll control means for providing movement of the displayed at least portion of the map relative to said marker in accordance with movement of said actual present position when said actual guidance mode is selected and in accordance with the rate of movement determined by said movement setting means when the virtual route guidance mode is selected.

11. A vehicle navigation apparatus as in claim 10 wherein said scroll control means holds said marker stationary and moves the map on the display means.

12. A vehicle navigation apparatus as in claim 10 further comprising calculation means for calculating a time period required for travel between the at least two set route points, and wherein said display means displays the calculated time period.

13. A vehicle navigation apparatus as in claim 10 further comprising input means for inputting a starting time; and calculation means for calculating an elapsed time period for travel from a start location to the present position based on the starting time; and wherein said display means displays the elapsed time period.

14. A vehicle navigation apparatus for setting a route and then for performing a virtual route guidance by simulating route guidance along the route, comprising:

data storage means in which map information is stored;

point setting means for setting at least two set route points on a map derived from the stored map information;

route setting means for determining a route on the map between the at least two set route points;

simulated vehicle location means for determining a simulated present position on the route;

movement setting means for determining a rate of movement of the simulated present position along the route;

route information output means for outputting vehicle navigational display information including at least a portion of said map and said simulated present position; and scroll control means for providing movement of at least portion of the map relative to said simulated present position in said outputted navigation display information in accordance with the rate of movement determined by said movement setting means.

15. A vehicle navigation system as in claim 14 wherein said outputted navigation display information includes a remaining distance to a destination from the simulated present position.

16. A vehicle navigation system as in claim 14 wherein said outputted navigation display information includes road names of the route.

17. A vehicle navigation system as in claim 14 wherein said outputted navigation display information includes major point names on the route.

18. A vehicle navigation system as in claim 14 wherein said outputted navigation display information includes a distance between major points.

19. A vehicle navigation system as in claim 14 wherein said outputted navigation display information includes scheduled times of arrival at major points on the route.

* * * * *

UNITED STATES PATENT AND TRADEMARK OFFICE
CERTIFICATE OF CORRECTION

PATENT NO. : 5,612,881
DATED : March 18, 1997
INVENTOR(S) : MOROTO et al

It is certified that error appears in the above-indentified patent and that said Letters Patent is hereby corrected as shown below:

Col. 1, line 13, after "route to the" insert --destination--.

Col. 8, line 39, delete "bus" and insert --base--.

Col. 14, line 21, delete "strolling" and insert --scrolling--.

Col. 16, line 40, after "or" insert --not--.

Col. 17, line 55, delete "controlling" and insert --scrolling--.

Signed and Sealed this

Twenty-first Day of April, 1998

Attest:

BRUCE LEHMAN

*Attesting Officer*     *Commissioner of Patents and Trademarks*